US009567003B2

(12) United States Patent
Kageyama

(10) Patent No.: US 9,567,003 B2
(45) Date of Patent: Feb. 14, 2017

(54) STEERING CONTROL DEVICE

(71) Applicant: NISSAN MOTOR CO., LTD., Yokohama-shi, Kanagawa (JP)

(72) Inventor: Yusuke Kageyama, Isehara (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/437,894

(22) PCT Filed: Oct. 28, 2013

(86) PCT No.: PCT/JP2013/006362
§ 371 (c)(1),
(2) Date: Apr. 23, 2015

(87) PCT Pub. No.: WO2014/073180
PCT Pub. Date: May 15, 2014

(65) Prior Publication Data
US 2015/0291210 A1 Oct. 15, 2015

(30) Foreign Application Priority Data

Nov. 7, 2012 (JP) ................................. 2012-245583
Nov. 7, 2012 (JP) ................................. 2012-245584
Nov. 7, 2012 (JP) ................................. 2012-245585

(51) Int. Cl.
*A01B 69/00* (2006.01)
*B62D 6/00* (2006.01)
(Continued)

(52) U.S. Cl.
CPC ............ *B62D 6/003* (2013.01); *B60T 8/1755* (2013.01); *B60W 10/196* (2013.01); *B60W 10/20* (2013.01);
(Continued)

(58) Field of Classification Search
CPC ...................................................... B62D 5/04
See application file for complete search history.

(56) References Cited

U.S. PATENT DOCUMENTS 6,076,033 A 6/2000 Hamada et al.
6,415,215 B1 7/2002 Nishizaki et al.
(Continued)

FOREIGN PATENT DOCUMENTS

DE 10109580 A1 8/2001
JP 01111538 A 4/1989
(Continued)

*Primary Examiner* — Imran Mustafa
(74) *Attorney, Agent, or Firm* — Young Basile Hanlon & MacFarlane, P.C.

(57) ABSTRACT

A steering control device suppresses response delay to stabilize a behavior of a vehicle during turning braking. The steering control device includes a steer-by-wire system that controls an actuator that detects displacement of a steering angle when a steering wheel is steered and operates a turning mechanism that turns a turning wheel separated from the steering wheel based on a detection result; a vehicle yaw angle detector; a steering angle detector; a turning state detector that detects a turning state of the vehicle based on the yaw angle; a braking state detector that detects a braking state of the vehicle; and a yaw angle controller that controls the actuator to suppress a yaw angle deviation before and after braking when the turning state of the vehicle is detected by the turning state detector and when the braking state of the vehicle is detected by the braking state detector.

8 Claims, 38 Drawing Sheets

(51) Int. Cl.
*B62D 11/00* (2006.01)
*B62D 12/00* (2006.01)
*B63G 8/20* (2006.01)
*B63H 25/04* (2006.01)
*G05D 1/00* (2006.01)
*G06F 1/00* (2006.01)
*G06F 7/00* (2006.01)
*G06F 17/00* (2006.01)
*B62D 5/04* (2006.01)
*B60T 8/1755* (2006.01)
*B60W 10/196* (2012.01)
*B60W 10/20* (2006.01)
*B60W 30/045* (2012.01)
*B62D 6/02* (2006.01)
*B62D 6/08* (2006.01)

(52) U.S. Cl.
CPC .............. *B60W 30/045* (2013.01); *B62D 5/04* (2013.01); *B62D 6/02* (2013.01); *B62D 6/08* (2013.01); *B60T 2260/02* (2013.01); *B60W 2520/14* (2013.01); *B60W 2710/18* (2013.01); *B60W 2710/20* (2013.01); *B60W 2720/14* (2013.01)

(56) References Cited

U.S. PATENT DOCUMENTS

| | | | |
|---|---|---|---|
| 2004/0158375 A1* | 8/2004 | Tsutsumi | B62D 7/159 701/41 |
| 2005/0080532 A1 | 4/2005 | Kato et al. | |
| 2006/0217867 A1 | 9/2006 | Ono et al. | |
| 2007/0265752 A1 | 11/2007 | Hayama et al. | |
| 2008/0319613 A1* | 12/2008 | Mikuriya | B62D 6/003 701/42 |
| 2011/0125368 A1* | 5/2011 | Yokota | B60T 8/17554 701/41 |
| 2014/0008141 A1 | 1/2014 | Kageyama et al. | |

FOREIGN PATENT DOCUMENTS

| | | |
|---|---|---|
| JP | 09086203 A | 3/1997 |
| JP | 10062311 A | 3/1998 |
| JP | 2005112285 A | 4/2005 |
| JP | 2005324655 A | 11/2005 |
| JP | 2006069498 A | 3/2006 |
| JP | 2006264561 A | 10/2006 |
| JP | 2007022326 A | 2/2007 |
| JP | 2007062412 A | 3/2007 |
| JP | 2007237840 A | 9/2007 |
| JP | 2007302053 A | 11/2007 |
| JP | 2008030591 A | 2/2008 |
| JP | 2009269427 A | 11/2009 |
| JP | 2010095153 A | 4/2010 |
| JP | 2011207313 A | 10/2011 |
| JP | 2012192841 A | 10/2012 |

* cited by examiner

CHANGE IN LOCUS OF CONTACT SURFACE CENTER

VEHICLE WIDTH DIRECTION POSITION

STEERING CONTROL DEVICE

CROSS REFERENCE TO RELATED APPLICATIONS

The present application claims priority to Japanese Patent Application Nos. 2012-245583, filed Nov. 7, 2012, 2012-245584, filed Nov. 7, 2012, 2012-245585, filed Nov. 7, 2012, each incorporated herein in its entirety.

TECHNICAL FIELD

The present invention relates to a steering control device of a vehicle that controls a yaw angle during turning while braking (turning braking) of the vehicle.

BACKGROUND

In the related art, a steering control device of a vehicle that employs a steer-by-wire (SBW) system in which mechanical connection between a steering wheel and turning wheels is separated has been proposed.

The vehicle that employs the steer-by-wire system includes an actuator capable of adjusting a steering torque for turning the turning wheels based on a steering input to the steering wheel. The actuator needs to maintain a stable behavior of the vehicle according to a steering state of the steering wheel.

For example, JP 2008-30591 A discloses a technique that calculates a braking force of each wheel based on a deviation between a target yaw angle calculated based on a steering angle and an actual value, and controls the braking force of each wheel based on the calculated braking force to stabilize the behavior of the vehicle, in the steer-by-wire control system.

However, in the related art technique disclosed in JP 2008-30591 A, the behavior of the vehicle during turning braking is stabilized by controlling the braking force of each wheel in the steer-by-wire control system, but it is necessary to control a braking pressure of an actuator that generates the braking force for stabilizing the behavior of the vehicle by controlling the braking force of each wheel, which causes response delay in a pressure control system.

SUMMARY

An object of the invention is to provide a technique that suppresses the response delay to perform appropriate stabilization of the behavior of the vehicle with a steering control device during turning braking.

In order to solve the above-mentioned problem, a steering control device according to the invention controls an actuator capable of controlling a yaw angle of a vehicle with responsiveness higher than that of a hydraulic pressure control to suppress a yaw angle deviation before and after braking or acceleration when a braking state or an acceleration state of the vehicle during turning traveling is detected. Thus, a yaw angle change during turning braking is eliminated while enhancing a responsiveness characteristic of a yaw angle control of the vehicle. Thus, it is possible to enhance a response characteristic for stabilizing the behavior of the vehicle.

According to the invention, since the yaw angle change before and after braking is eliminated by the actuator capable of controlling the yaw angle of the vehicle with responsiveness higher than that of the hydraulic pressure control to suppress the yaw angle deviation before and after braking or acceleration during turning braking or turning acceleration of the vehicle, it is possible to suppress response delay to rapidly and appropriately stabilize the behavior of the vehicle.

DETAILED DESCRIPTION OF THE EMBODIMENTS

Hereinafter, embodiments of an automobile to which the invention is applied will be described with reference to the drawings.

First Embodiment (Overall Configuration)

Figure 1:
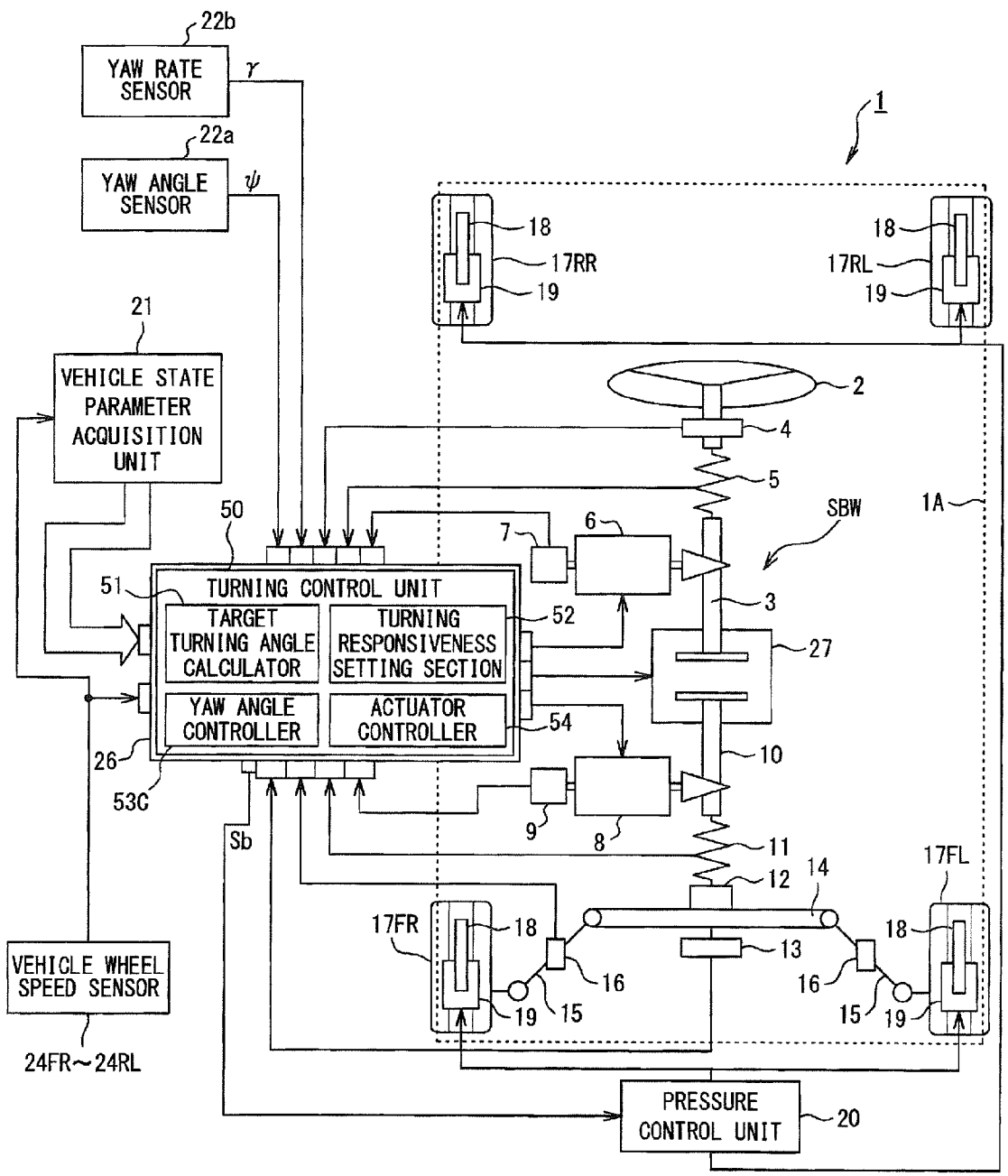
FIG. 1 is a configuration diagram schematically illustrating an automobile according to a first embodiment of the invention.

FIG. 1 is a diagram schematically illustrating a configuration of a vehicle 1 according to a first embodiment of the invention. In FIG. 1, the vehicle 1 includes a vehicle body 1A, a steering wheel 2, an input-side steering shaft 3, a steering angle sensor 4 which is a steering angle detector, a steering torque sensor 5, a steering reaction force actuator 6, and a steering reaction force actuator angle sensor 7. Further, the vehicle 1 includes a turning actuator 8; a turning actuator angle sensor 9; an output-side steering shaft 10; a turning torque sensor 11; a pinion gear 12, a pinion angle sensor 13, a rack shaft 14, tie rods 15, and tie rod shaft force sensors 16 that form a turning mechanism; and vehicle wheels 17FR, 17FL, 17RR, and 17RL.

Further, the vehicle 1 includes a brake disk 18, a wheel cylinder 19, a pressure control unit 20, a vehicle state parameter acquisition unit 21, vehicle wheel speed sensors 24FR, 24FL, 24RR, and 24RL, a control/drive circuit unit 26, and a mechanical backup 27.

The steering wheel 2 is configured to rotate integrally with the input-side steering shaft 3, and transmits a steering input from a driver to the input-side steering shaft 3.

The input-side steering shaft 3 is provided with the steering reaction force actuator 6, and is supplied with a steering reaction force from the steering reaction force actuator 6 with respect to the steering input that is input through the steering wheel 2.

The steering angle sensor 4 is provided in the input-side steering shaft 3, and detects a rotational angle (i.e., a steering angle input to the steering wheel 2 by the driver) of the input-side steering shaft 3. Further, the steering angle sensor 4 outputs the detected rotational angle of the input-side steering shaft 3 to the control/drive circuit unit 26.

The steering torque sensor 5 is mounted in the input-side steering shaft 3, and detects a rotational torque (i.e., a steering torque input to the steering wheel 2) of the input-side steering shaft 3. Further, the steering torque sensor 5 outputs the detected rotational torque of the input-side steering shaft 3 to the control/drive circuit unit 26.

The steering reaction force actuator 6 is configured so that a gear that rotates integrally with a motor shaft is engaged with a gear formed on a part of the input-side steering shaft 3, and applies the reaction force with respect to the rotation of the input-side steering shaft 3 based on the steering wheel 2, according to an instruction of the control/drive circuit unit 26.

The steering reaction force actuator angle sensor 7 detects a rotational angle (i.e., a rotational angle based on the steering input transmitted to the steering reaction force actuator 6) of the steering reaction force actuator 6, and outputs the detected rotational angle to the control/drive circuit unit 26.

The turning actuator 8 is configured so that a gear that rotates integrally with a motor shaft is engaged with a part of the output-side steering shaft 10, and rotates the output-side steering shaft 10 according to an instruction of the control/drive circuit unit 26.

The turning actuator angle sensor 9 detects a rotational angle (i.e., a rotational angle for turning output from the turning actuator 8) of the turning actuator 8, and outputs the detected rotational angle to the control/drive circuit unit 26.

The output-side steering shaft 10 is provided with the turning actuator 8, and transmits the rotation input from the turning actuator 8 to the pinion gear 12.

The turning torque sensor 11 is mounted in the output-side steering shaft 10, and detects a rotational torque (i.e., a turning torque of the vehicle wheels 17FR and 17FL through the rack shaft 14) of the output-side steering shaft 10. Further, the turning torque sensor 11 outputs the detected rotational torque of the output-side steering shaft 10 to the control/drive circuit unit 26.

The pinion gear 12 is engaged with a rack gear formed in the rack shaft 14, and transmits the rotation input from the output-side steering shaft 10 to the rack shaft 14.

The pinion angle sensor 13 detects a rotational angle (i.e., the turning angle of the vehicle wheels 17FR and 17FL output through the rack shaft 14) of the pinion gear 12, and outputs the detected rotational angle of the pinion gear 12 to the control/drive circuit unit 26.

The rack shaft 14 includes a spur teeth engaged with the pinion gear 12, and converts the rotation of the pinion gear 12 into a linear motion in a vehicle width direction.

The tie rods 15 connect opposite end portions of the rack shaft 14 to knuckle arms of the vehicle wheels 17FR and 17FL through ball joints, respectively.

The tie rod shaft force sensors 16 are mounted in the tie rods 15 mounted to the opposite end portions of the rack shaft 14, respectively, and detect a shaft force acting on the tie rods 15. Further, the tie rod shaft force sensors 16 output the detected shaft force of the tie rods 15 to the control/drive circuit unit 26.

The vehicle wheels 17FR, 17FL, 17RR, and 17RL are configured so that a tire is mounted to a tire wheel, and are mounted in the vehicle body 1A through a suspension device 1B. Here, in the front wheels (turning wheels 17FR and 17FL), the knuckle arms swing by the tie rods 15, and thus, directions of the turning wheels 17FR and 17FL with respect to the vehicle body 1A are changed.

Further, a yaw angle sensor 22a that detects a yaw angle $\psi$ of the vehicle 1 is provided in the vehicle 1, and the yaw angle $\psi$ detected by the yaw angle sensor 22a is output to the control/drive circuit unit 26. Further, a yaw rate sensor 22b that detects a yaw rate $\gamma$ of the vehicle 1 is provided in the vehicle 1, and the yaw rate $\gamma$ detected by the yaw rate sensor 22b is output to the control/drive circuit unit 26.

The vehicle state parameter acquisition unit 21 acquires a vehicle velocity V based on pulse signals indicating rotational speeds of the wheels output from the vehicle wheel speed sensors 24FR, 24FL, 24RR, and 24RL. Further, the vehicle state parameter acquisition unit 21 acquires a slip rate of each wheel based on the vehicle velocity V and the rotational speed of each vehicle wheel. In addition, the vehicle state parameter acquisition unit 21 outputs the acquired parameters to the control/drive circuit unit 26.

The vehicle wheel speed sensors 24FR, 24FL, 24RR, and 24RL output the pulse signals indicating the rotational speeds of the vehicle wheels to the vehicle state parameter acquisition unit 21 and the control/drive circuit unit 26.

The control/drive circuit unit 26 controls the entirety of the vehicle 1, and outputs various control signals to the steering reaction force actuator 6, the turning actuator 8, a mechanical backup 27, or the like with respect to the steering reaction force of the input-side steering shaft 3, the turning angle of the front wheels, or connection of the mechanical backup 27, based on the signals input from the sensors mounted in the respective units.

Further, the control/drive circuit unit 26 converts the detection values output from the respective sensors into values suitable for a desired purpose. For example, the control/drive circuit unit 26 converts a rotational angle detected by the steering reaction force actuator angle sensor 7 into a steering angle $\theta s$, converts a rotational angle detected by the turning actuator angle sensor 9 into a turning angle $\delta d$ of the turning wheels 17FR and 17FL, or converts a rotational angle of the pinion gear 12 detected by the pinion angle sensor 13 into an actual turning angle $\delta r$ of the turning wheels 17FR and 17FL.

The control/drive circuit unit 26 may monitor the rotational angle of the input-side steering shaft 3 detected by the steering angle sensor 4, the rotational angle of the steering reaction force actuator 6 detected by the steering reaction force actuator angle sensor 7, the rotational angle of the turning actuator 8 detected by the turning actuator angle sensor 9, and the rotational angle of the pinion gear 12 detected by the pinion angle sensor 13, and may detect the occurrence of failure in a steering system based on the relationship therebetween. Further, if the failure in the steering system is detected, the control/drive circuit unit 26 outputs an instruction signal for connecting the input-side steering shaft 3 and the output-side steering shaft 10 to the mechanical backup 27.

The mechanical backup 27 is a mechanism that connects the input-side steering shaft 3 and the output-side steering shaft 10 according to an instruction of the control/drive circuit unit 26 and secures force transmission from the input-side steering shaft 3 to the output-side steering shaft 10. Here, in a normal state, the mechanical backup 27 is given an instruction for maintaining disconnection of the input-side steering shaft 3 and the output-side steering shaft 10 from the control/drive circuit unit 26. Further, when it is necessary to perform a steering operation without through the steering angle sensor 4, the steering torque sensor 5, the turning actuator 8, and the like due to the occurrence of failure in the steering system, an instruction for connecting the input-side steering shaft 3 and the output-side steering shaft 10 is input to the mechanical backup 27.

The mechanical backup 27 may include a cable type steering mechanism, an electromagnetic clutch mechanism, or the like, for example.

(Suspension Configuration)

Figure 2:
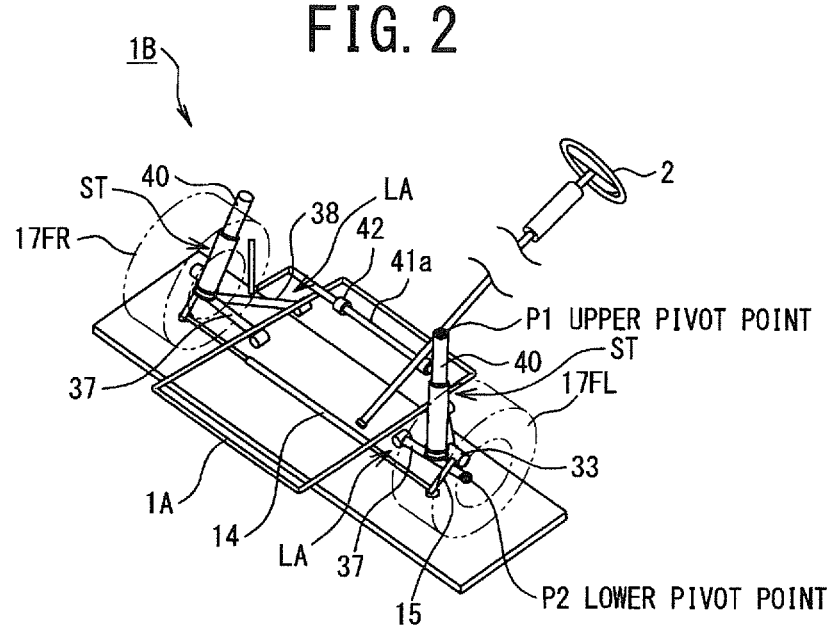
FIG. 2 is a perspective view schematically illustrating a configuration of a suspension device.
Figure 3:
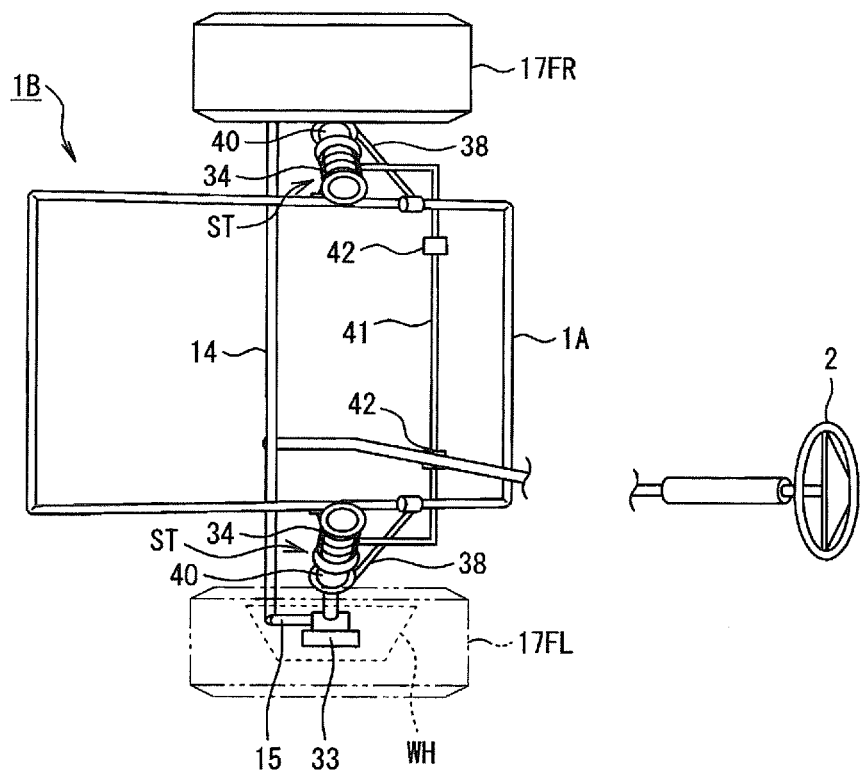
FIG. 3 is a plan view schematically illustrating a configuration of a suspension device.
Figure 4A:
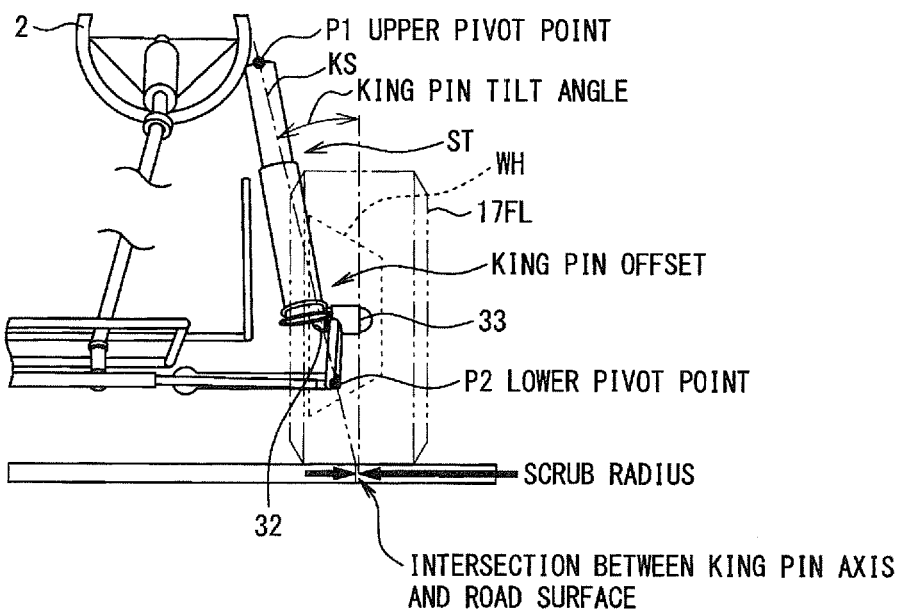
FIG. 4 is a partial front view and a partial side view schematically illustrating a configuration of a suspension device.
Figure 4B:
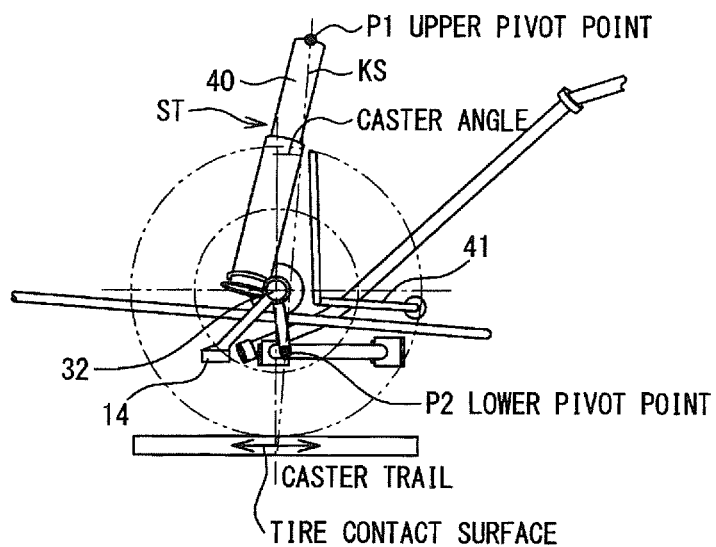

FIG. 2 is a perspective view schematically illustrating a configuration of a suspension device 1B according to the first embodiment. FIG. 3 is a plan view schematically illustrating the configuration of the suspension device 1B in FIG. 2. FIG. 4(a) and FIG. 4(b) are a partial front view and a partial side view schematically illustrating the configuration of the suspension device 1B in FIG. 2.

As shown in FIGS. 2 to 4, the suspension device 1B includes an axle carrier 33 including an axle 32 that suspends the vehicle wheels 17FR and 17FL mounted in a wheel hub WH and rotatably supports the vehicle wheels 17FR and 17FL, plural link members that are arranged in a vehicle body width direction from a support section on a vehicle body side and are connected to the axle carrier 33, and a spring member 34 such as a coil spring.

The plural link members include a first link (first link member) 37 and a second link (second link member) 38 which are lower link members; the tie rod (tie rod member) 15; and a strut (a spring member 34 and a shock absorber 40). In the present embodiment, the suspension device 1B is a strut type suspension. Here, an upper end of a strut ST in which the spring member 34 is integrated with the shock absorber 40 is connected to the support section on the vehicle body side disposed above the axle 32 (hereinafter, the upper end of the strut is appropriately referred to as an "upper pivot point P1"). The first link 37 and the second link 38 that form a lower arm connects the support section on the vehicle body side disposed under the axle 32 to a lower end of the axle carrier 33. The lower arm is supported on the vehicle body side at two locations and is connected on the side of the axle 32 at one location, which forms an "A" shape (hereinafter, a connection section between the lower arm and the axle member 33 is appropriately referred to as a "lower pivot point P2").

Further, a stabilizer 41 is connected between outer cylinders of the right and left shock absorbers 40. The stabilizer 41 is rotatably supported by a bracket 42, in which a linear portion 41a on a vehicle rear side is fixed to a member on the vehicle body side.

The tie rod 15 is disposed under the axle 32 to connect the rack shaft 14 to the axle member 33. The rack shaft 14 receives the rotational force (steering force) from the steering wheel 2, and generates a shaft force for turning. Accordingly, the shaft force in the vehicle width direction is applied to the axle member 33 according to the rotation of the steering wheel 2 by the tie rod 15, and the turning wheels 17FR and 17FL are turned through the axle member 33.

In the present embodiment, in a state where the steering wheel 2 is at a neutral position, i.e., the turning wheels 17FL and 17FR are in a straight traveling state, a king pin axis KS that connects the upper pivot point P1 to the lower pivot point P2 of the suspension device 1B is set so that a road surface contact point of the king pin axis KS is disposed in a tire contact surface. Further, the king pin axis KS is set so that a caster trail is disposed in the tire contact surface.

More specifically, in the suspension device 1B according to the present embodiment, the king pin axis KS is set so that a caster angle is set to a value close to zero and the caster trail comes close to zero. Thus, it is possible to reduce a tire twisting torque during turning, and to reduce moment around the king pin axis KS. Further, a scrub radius is set to have a positive scrub which is equal to or greater than zero. Thus, the caster trail corresponding to the scrub radius occurs with respect to a tire side slip angle during turning, and thus, it is possible to secure straightness.

Figure 5:
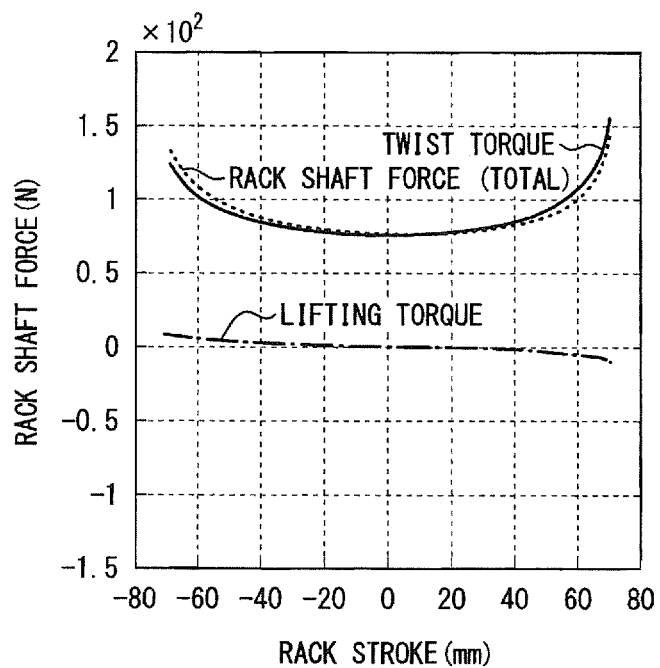
FIG. 5 is a diagram illustrating the relationship between a rack stroke and a rack shaft force during turning.

FIG. 5 is a diagram illustrating an analysis result of the rack shaft force in the suspension device 1B according to the present embodiment.

A solid line shown in FIG. 5 represents a rack shaft force characteristic when the caster angle is set to 0 degrees, the caster trail is set to 0 mm, and the scrub radius is set to +10 mm, in the suspension structure shown in FIGS. 2 to 4.

In FIG. 5, as a suspension structure of the same type as that of the suspension device 1B, a comparative example (broken line) when the king pin axis KS is set to be suitable for a structure in which the steer-by-wire type steering device is not provided is also shown.

As shown in FIG. 5, according to the inspection result, based on the above setting, the rack shaft force can be reduced by about 30%, compared with the comparative example.

Figure 6:
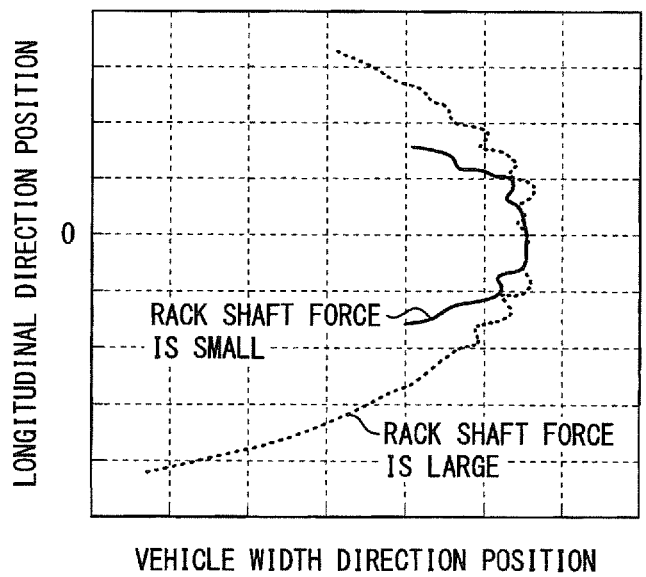
FIG. 6 is a diagram illustrating a locus of a tire contact surface center during turning.

In this way, if the caster angle is set to 0 degree, a suspension rigidity can be enhanced, and if the caster trail is set to 0 mm, as indicated by reference numeral 3 in FIG. 6, the road surface contact point of the king pin axis KS matches a tire contact central point of the tire contact surface, thereby making it possible to enhance a lateral force reduction effect.

(Securing of Straightness Due to Positive Scrub)

Figure 10:
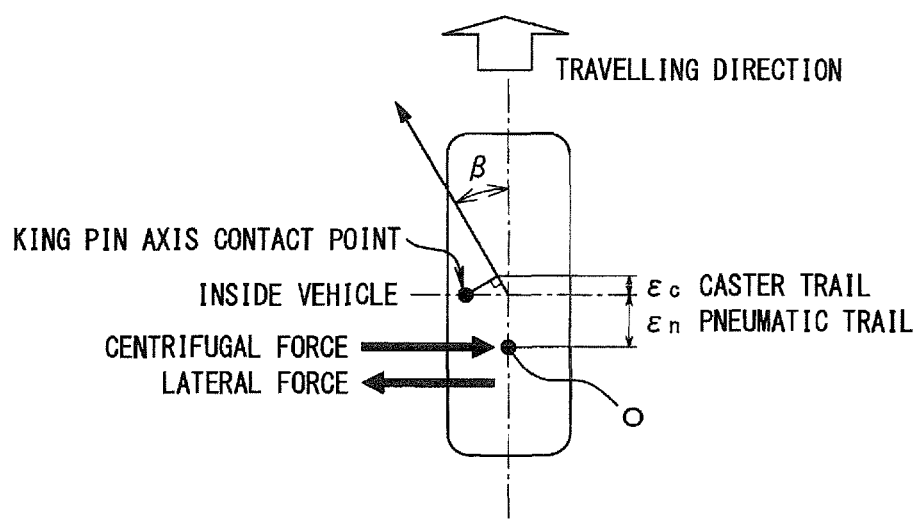
FIG. 10 is a conceptual diagram illustrating a self aligning torque in the case of a positive scrub.

FIG. 10 is a conceptual diagram illustrating a self aligning torque in the case of the positive scrub.

As shown in FIG. 10, a restoring force (self aligning torque) acting on a tire increases in proportion to the sum of a caster trail and a pneumatic trail.

Here, in the case of the positive scrub, a distance $\epsilon c$ (see FIG. 10) from a wheel center determined by the position of a foot of a perpendicular line that extends from the contact point of the king pin axis to a straight line passing through the tire contact center in a direction of a side slip angle $\beta$ of the tire may be considered as the caster trail.

Accordingly, as the scrub radius of the positive scrub increases, the restoring force acting on the tire during turning increases.

In the present embodiment, the influence on the straightness as the caster angle comes close to zero is reduced by using the positive scrub. Further, since the steer-by-wire type is employed, it is possible to finally secure desired straightness by the turning actuator 8.

(Design Example of Suspension)

In the configuration of the suspension device 1B shown in FIGS. 2 to 4, according to the inspection result, when the king pin tilt angle is set to 13.8 degrees, the caster trail is set to 0 mm, the scrub radius is set to 5.4 mm (positive scrub), the caster angle is 5.2 degrees, and a king pin offset at the height of the wheel center is set to 86 mm, it is possible to reduce the rack shaft force by about 30%.

In the design values, since the suspension lower link moves to the vehicle rear side during braking, and at this time, the lower end of the king pin also moves to the vehicle rear side, the caster angle is set to have a specific backward tilt. That is, when the caster angle is equal to or smaller than 0 degrees (when the king pin axis is forwardly tilted), since the rack moment during turning braking increases, the rack shaft force increases. Accordingly, the position of the king pin is determined as described above.

That is, the king pin lower pivot point (including a virtual pivot) is disposed on the rear side of the wheel center, and the king pin upper pivot point (including a virtual pivot) is disposed on the rear side of the lower pivot point.

(Action of Suspension)

Next, an action of the suspension device 1B according to the present embodiment will be described.

In the suspension device 1B according to the present embodiment, in at least the neutral position of the steering wheel 2, the road surface contact point of the king pin axis KS is set to be disposed in the tire contact surface. Further, the caster trail is set to be disposed in the tire contact surface.

For example, the king pin axis KS is set so that the caster angle is 0 degree, the caster trail is 0 mm, the scrub radius is a positive scrub of 0 mm or greater. Further, the king pin tilt angle is set to a range of a smaller angle (for example, 15 degrees or smaller) within a range where the scrub radius can be set to the positive scrub.

With this suspension geometry, a locus of the tire contact surface center during turning becomes small, and thus, it is possible to reduce the tire twisting torque.

Thus, it is possible to reduce the rack shaft force, and thus, it is possible to reduce the moment around the king pin axis KS. Thus, it is possible to reduce an output of the turning actuator 8. Further, it is possible to control the direction of the vehicle wheels with a small force. That is, it is possible to enhance the controllability and stability.

Further, as the caster angle is set to 0 degrees and the caster trail is set to 0 mm, there is a possibility that the influence on the straightness occurs in the suspension structure, but by setting the scrub radius to the positive scrub, the influence is reduced. In addition, the straightness is secured in parallel to the control through the turning actuator 8. That is, it is possible to enhance the controllability and stability.

Further, as the king pin tilt angle is limited to a specific range (15 degrees or smaller), it is possible to prevent a driver from feeling heaviness in the steering operation due to the turning in the turning actuator 8. In addition, with respect to kickback from the road surface due to an external force, it is possible to confront the external force by the turning actuator 8, and thus, it is possible to prevent the influence on the driver. That is, it is possible to enhance the controllability and stability.

Hereinafter, the suspension geometry in the suspension device 1B will be described in detail.

(Analysis of Rack Shaft Force Components)

FIG. 5 is a diagram illustrating the relationship between a rack stroke and a rack shaft force during turning.

As shown in FIG. 5, rack shaft force components mainly include a tire twisting torque, and a vehicle wheel raising torque, in which the tire twisting torque is dominant.

Accordingly, by reducing the tire twisting torque, it is possible to reduce the rack shaft force.

(Minimization of Tire Twisting Torque)

FIG. 6 is a diagram illustrating the locus of the tire contact surface center during turning.

In FIG. 6, a case where a movement quantity of the tire contact surface center during turning is large and a case where the movement quantity is small are shown.

From the analysis results of the rack shaft force components, in order to reduce the rack shaft force, it is effective to minimize the tire twisting torque during turning.

In order to minimize the tire twisting torque during turning, as shown in FIG. 6, it is preferable to reduce change in the locus of the tire contact surface center.

That is, by matching the tire contact surface center with the king pin ground point, it is possible to minimize the tire twisting torque.

Specifically, as described later, it is effective to set the caster trail to 0 mm, and the scrub radius to a positive scrub of 0 mm or larger.

(Influences of King Pin Tilt Angle)

Figure 7:
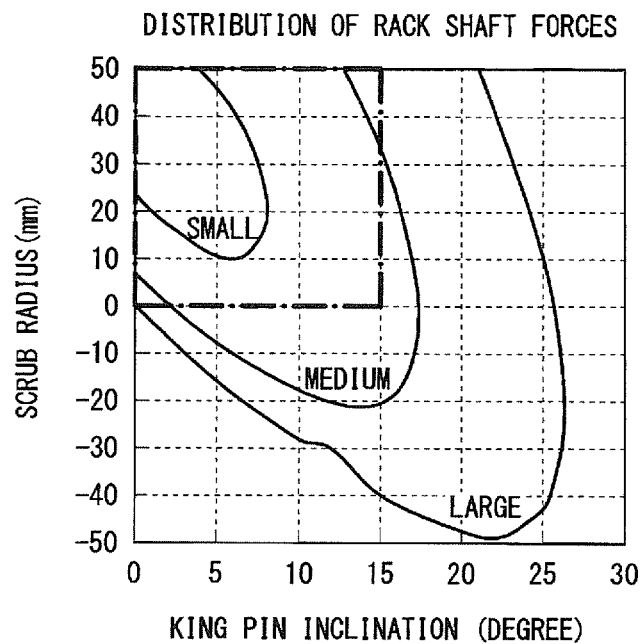
FIG. 7 is an isoline map illustrating an example of distribution of rack shaft forces in a coordinate where a king pin tilt angle and a scrub radius are used as axes.

FIG. 7 is an isoline map illustrating an example of distribution of rack shaft forces in coordinates where a king pin tilt angle and a scrub radius are used as axes.

In FIG. 7, isolines in three cases where the rack shaft force is small, medium, and large are shown as an example.

With respect to the input of the tire twisting torque, as the king pin tilt angle increases, its rotational moment increases, and the rack shaft force increases. Accordingly, it is preferable to set the king pin tilt angle to be smaller than a specific value, and for example, if the king pin tilt angle is equal to or smaller than 15 degrees from the relationship with the scrub radius, it is possible to reduce the rack shaft force to a desired level.

An area surrounded by a single dot chain line (boundary line) in FIG. 7 represents an area where the king pin tilt angle is smaller than 15 degrees at which a lateral force can be estimated as a value exceeding a friction limit and where the scrub radius is equal to or larger than 0 mm from the viewpoint of the tire twisting torque, in a turning limit area. In the present embodiment, the area (in a direction in which the king pin tilt angle is smaller than 15 degrees in a transverse axis, and in a direction in which the scrub radius is larger than zero in a longitudinal axis) is assumed as an area suitable for setting.

Specifically, when determining the scrub radius and the king pin tilt angle, for example, by approximating the isolines indicating the distribution of the rack shaft forces shown in FIG. 7 as $n^{th}$-order curves (n is an integer of 2 or greater), it is possible to employ a value determined by the position of an inflection point (or peak value) of the $n^{th}$-order curves from the area surrounded by the single dot chain line.

(Minimization Example of Rack Shaft Force)

Figure 8:
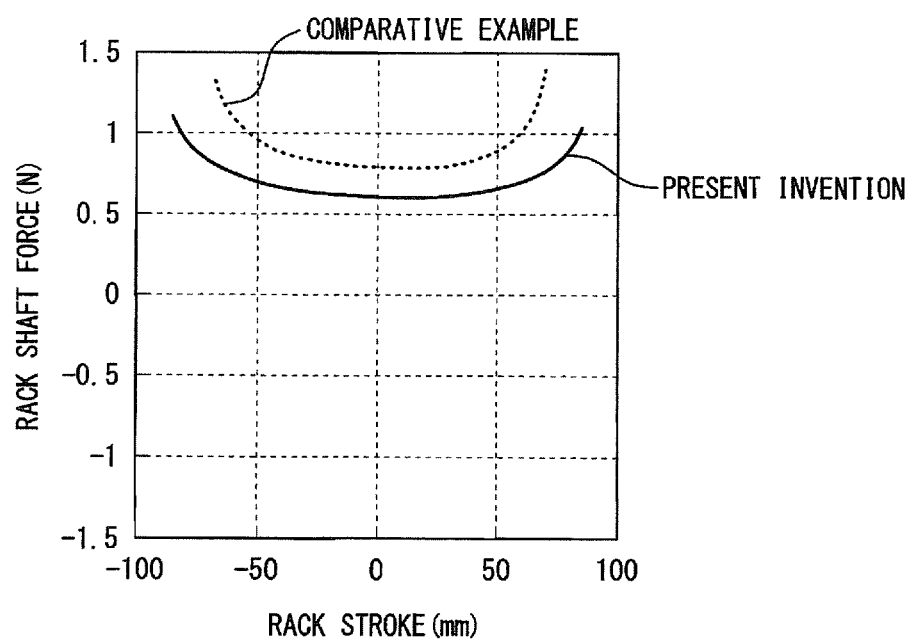
FIG. 8 is a diagram illustrating an analysis result of a rack shaft force in a suspension device 1B.

FIG. 8 is a diagram illustrating an analysis result of the rack shaft force in the suspension device 1B according to the present embodiment.

A solid line shown in FIG. 8 represents a rack shaft force characteristic when the caster angle is set to 0 degree, the caster trail is set to 0 mm, and the scrub radius is set to +10 mm, in the suspension structure shown in FIGS. 2 to 4.

In FIG. 8, as a suspension structure of the same type as that of the suspension device 1B, a comparative example (broken line) when the king pin axis KS is set to be suitable for a structure in which the steer-by-wire type steering device is not provided is also shown.

As shown in FIG. 8, according to the inspection result, based on the above setting, the rack shaft force can be reduced by about 30%, compared with the comparative example.

Figure 9:
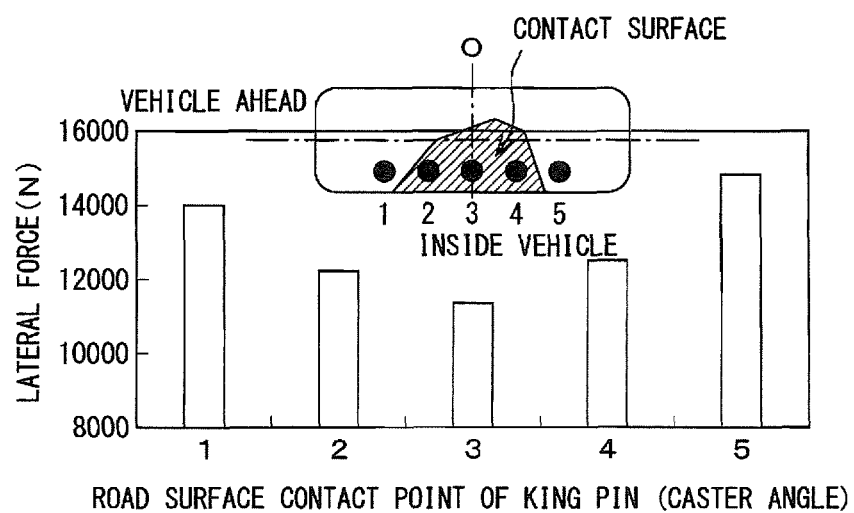
FIG. 9 is a graph illustrating the relationship between a road surface contact point of a king pin axis and a lateral force.

In this way, if the caster angle is set to 0 degree, the suspension rigidity can be enhanced, and if the caster trail is set to 0 mm, as indicated by reference numeral 3 in FIG. 9 indicating the relationship between the road surface contact point of the king pin axis KS and the lateral force, the road surface contact point of the king pin axis KS matches the tire contact central point (force application point) O of the tire contact surface, thereby making it possible to enhance a lateral force reduction effect.

Even when the contact point of the king pin axis KS in the tire contact surface including the tire contact central point (force application point) O is disposed at positions indicated by reference numerals 2 and 4, it is possible to reduce the lateral force compared with a case where the contact point of the king pin axis KS is disposed at a position deviated from the tire contact surface in a longitudinal direction as indicated by reference numerals 1 and 5. Particularly, when the contact point of the king pin axis KS is disposed on the vehicle ahead side with reference to the tire contact central point (force application point), it is possible to make the lateral force smaller compared with a case where the contact point of the king pin axis KS is disposed on the vehicle rear side with reference to the tire contact central point (force application point).

(Securing of Straightness by Positive Scrub)

FIG. 10 is a conceptual diagram illustrating a self aligning torque in the case of a positive scrub. In FIG. 10, if a centrifugal force toward the outside of the turning of the vehicle acts on the tire contact central point (landing point) O during turning, a lateral force that is directed toward the turning center is generated to confront the centrifugal force. Here, β represents the side slip angle.

As shown in FIG. 10, the restoring force (self aligning torque) acting on the tire increases in proportion to the sum of the caster trail and the pneumatic trail.

Here, in the case of the positive scrub, the distance εc (see FIG. 10) from the wheel center determined by the position of the foot of the perpendicular line that extends from the contact point of the king pin axis to the straight line passing through the tire center in the direction of the side slip angle β of the tire may be considered as the caster trail.

Accordingly, as the scrub radius of the positive scrub increases, the restoring force acting on the tire during turning increases.

In the present embodiment, the influence on the straightness as the caster angle comes close to zero is reduced by using the positive scrub.

(Design Example of Suspension)

According to the present application, in the configuration of the suspension device 1B shown in FIGS. 2 to 4, according to the review result, it is confirmed that when the king pin tilt angle is set to 13.8 degrees, the caster trail is set to 0 mm, the scrub radius is set to 5.4 mm (positive scrub), the caster angle is set to 5.2 degrees, and the king pin offset at the height of the wheel center is set to 86 mm, the rack shaft force can be reduced by about 30%.

In the design values, since the suspension lower link moves to the vehicle rear side during braking, and at this time, the lower end of the king pin also moves to the vehicle rear side, the caster angle is set to have a specific backward tilt. That is, when the caster angle is equal to or smaller than 0 degrees (when the king pin axis KS is forwardly tilted), since the rack moment during turning braking increases, the rack shaft force increases. Accordingly, the position of the king pin axis KS is determined as described above.

That is, the king pin lower pivot point (including a virtual pivot) is disposed on the rear side of the wheel center, and the king pin upper pivot point (including a virtual pivot) is disposed on the front side of the lower pivot point.

(Turning Control)

Next, a steering responsiveness control in the control/drive circuit unit 26 for controlling the turning actuator 8 will be described with reference to FIGS. 11 to 15.

That is, as described above, a steering torque Ts of the input-side steering shaft 3 detected by the torque sensor 5, a vehicle velocity V acquired by the vehicle state parameter acquisition unit 21, and a rotational angle θmi of the actuator 6 detected by the steering reaction force actuator angle sensor 7 are input to the control/drive circuit unit 26.

Figure 11:
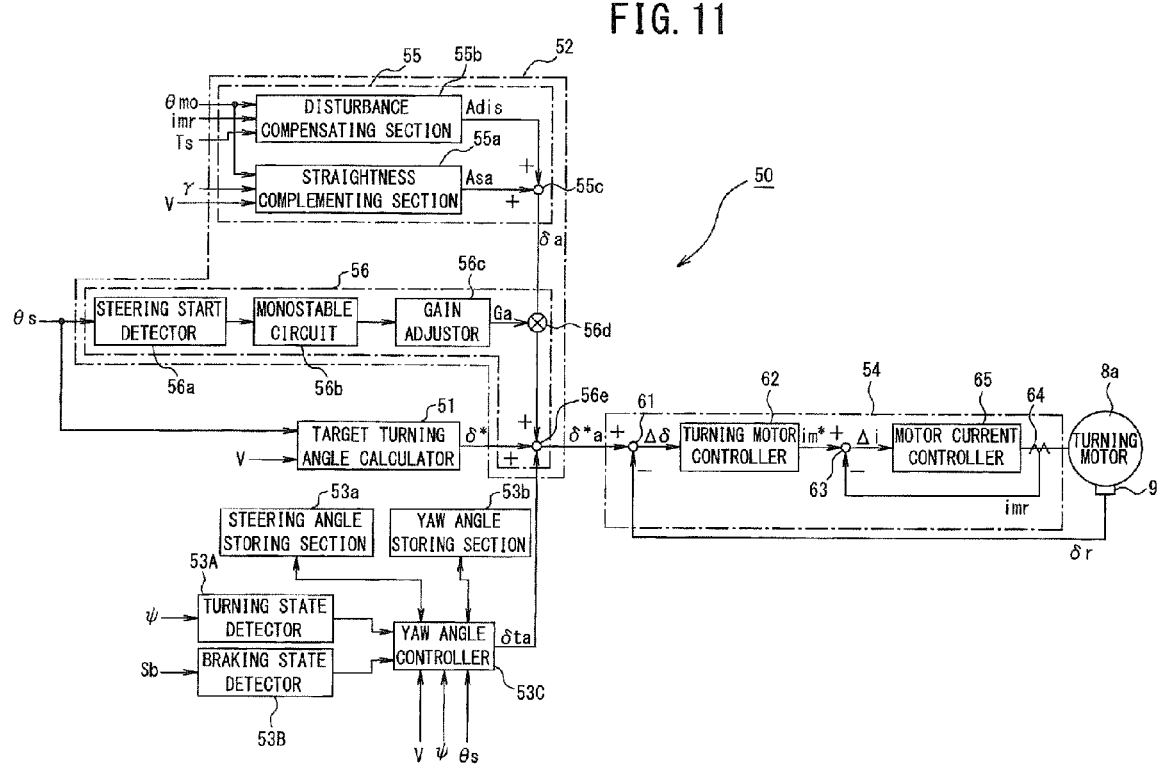
FIG. 11 is a block diagram illustrating a specific configuration of a yaw angle controller.

A turning control unit 50 shown in FIG. 11 is provided in the control/drive circuit unit 26. The turning control unit 50 includes a target turning angle calculator 51, a turning responsiveness setting section 52, a turning state detector 53A, a braking state detector 53B, a yaw angle controller 53C, and an actuator controller 54.

The target turning angle calculator 51 receives inputs of the vehicle velocity V and the rotational angle θmi, and calculates a target turning angle δ* for driving the turning actuator 8 based on the inputs.

The turning responsiveness setting section 52 includes a straightness securing section 55 and a delay controller 56.

The straightness securing section 55 includes a straightness complementing section 55a and a disturbance compensating section 55b.

The straightness complementing section 55a calculates a self aligning torque Tsa, based on a vehicle velocity V, an actual turning angle δr of the turning wheels 17FR and 17FL calculated based on a pinion angle detected by the pinion angle sensor 13, and a yaw rate γ detected by the yaw rate sensor 22b, by an operation of the following formula (1), and multiplies the calculated self aligning torque Tsa by a predetermined gain Ksa to calculate a self aligning torque control value Asa (=Ksa·Tsa) which is a straightness correcting value.

[Formula 1]

$$Tsa = 2 \cdot \varepsilon \cdot Kf\left(\frac{\beta + Lf}{V}\right)\gamma - \delta r \qquad (1)$$

$$\beta = \frac{B}{A} \cdot \frac{Lf}{L} \cdot \delta r$$

$$A = 1 - \left(\frac{m}{2L^2}\right)\left(\frac{Lf \cdot Kf - Lr \cdot Kr}{Kf + Kr}\right)V^2$$

$$B = 1 - \left(\frac{m}{L}\right)\left(\frac{Lf}{Lr \cdot Kr}\right)V^2$$

Here, εc represents a caster trail, Kf represents a cornering power per one front wheel, β represents a gravity central point slip angle, Lf represents an axial distance between a gravity central point and the front wheel, Kr represents a cornering power per one rear wheel, Lr represents an axial distance between the gravity central point and the rear wheel, m represents a mass of the vehicle, and L represents an axial distance between the front wheel and the rear wheel.

In Formula (1), by setting caster trail E to a value obtained by subtracting a caster trail εc2 set in the present embodiment from a caster trail εc0 set in a normal suspension device, it is possible to calculate the self aligning torque Tsa to be complemented which is in short supply in the suspension device 1B to be applied to the invention.

The self aligning torque Tsa is not limited to the calculation using Formula (1), and may be calculated by providing a lateral acceleration sensor that detects the lateral acceleration Gy of the vehicle, by calculating a lateral force Fy based on the lateral acceleration Gy of the vehicle and the yaw rate γ of the vehicle, based on a motion equation of the vehicle, and based on a differential value of a yaw rate γ and a lateral acceleration Gy, and by multiplying the lateral force Fy by the pneumatic trail εn.

Further, the self aligning torque Tsa may be calculated based on the steering angle θs detected by the steering angle sensor 4 and the vehicle velocity V, with reference to a control map obtained by measuring the relationship between the steering angle θs of the steering wheel 2 and the self aligning torque Tsa using the vehicle velocity V as a parameter, or by calculating the relationship by a simulation.

Further, when the turning wheels 17FR and 17FL are used as drive wheels, a generated torque Th generated during turning due to a torque steer phenomenon based on a difference between rightward and leftward driving forces may be estimated, and the self aligning torque Tsa may be calculated by subtracting the generated torque Th from the steering torque Ts detected by the steering torque sensor 5. Similarly, the self aligning torque Tsa may be calculated based on a difference between braking forces of the right and left turning wheels 17FR and 17FL.

The disturbance compensating section 55b receives inputs of a steering torque Ts from the steering torque sensor 5, a rotational angle θmo from the turning actuator angle sensor 9, a motor current imr from a motor current detector 64, divides and estimates disturbance input to the vehicle for each frequency band, and calculates a disturbance compensating value Adis for suppressing the disturbance.

In the disturbance compensating section 55b, for example, as disclosed in JP 2007-237840 A, in a model in which a steering torque Ts which is a steering input from a driver and a turning input from the turning actuator 8 are used as control inputs and an actual steering state amount is used as a control amount, plural disturbance estimating sections that estimate disturbance based on a difference between a value obtained by passing the control inputs through a low pass filter and a value obtained by passing the control amount through a reverse characteristic of the model and the low pass filter. Each disturbance estimating section divides the disturbance for each of plural frequency bands by changing a cut-off frequency of the low pass filter.

Further, the disturbance compensating value Adis and the self aligning torque control value Asa calculated by the disturbance compensating section 55b and the straightness complementing section 55a are added by an adder 55c to calculate a straightness securing control value δa. The straightness securing control value δa is supplied to the delay controller 56.

As shown in FIG. 11, the delay controller 56 includes a steering start detector 56a, a monostable circuit 56b, a gain adjustor 56c, and a multiplier 56d.

The steering start detector 56a detects a timing when rightward steering or leftward steering is performed from a state where the neutral position is maintained based on the steering angle θs detected by the steering angle sensor 4, and outputs a steering start signal SS indicating a steering start from the neutral position to the monostable circuit 56b.

Further, the monostable circuit 56b outputs a control start delay signal that is in an ON state for a predetermined delay time τ (for example, 0.1 seconds) based on the steering start signal output from the steering start detector 56a to the gain adjustor 56c.

The gain adjustor 56c sets the control gain Ga to "0" when the control start delay signal is in the ON state, and sets the control gain Ga to "1" when the control start delay signal is in an OFF state, and then, outputs the set control gain Ga to the multiplier 56d.

The multiplier 56d receives an input of the straightness securing control value δa output from the straightness securing section 55, multiplies the straightness securing control value δa by the control gain Ga, and supplies the multiplication result to the adder 56e to which the target turning angle δ* from the target turning angle calculator 51 is input.

Accordingly, in the delay controller 56, when the steering starting state in which the rightward steering or leftward steering is performed from the state where the neutral position state is maintained is detected by the steering start detector 56a, the gain adjustor 56c sets the control gain Ga to be multiplied by the straightness securing control value δa to "0" so that the straightness securing control of adding the straightness securing control value δa calculated by the straightness securing section 55 to the target turning angle δ* is stopped for a predetermined time set by the monostable circuit 56b, for example, 0.1 seconds. Further, in the gain adjustor 56c, if the output signal of the monostable circuit 56b is reversed to an OFF state after the lapse of 0.1 seconds, the gain adjustor 56c sets the control gain Ga to "1" so that the straightness securing control for adding the straightness securing control value δa to the target turning angle δ* is started.

Further, when the steering of the steering wheel 2 is continued, since the delay controller 56 does not detect the steering start from the neutral position state by the steering start detector 56a, the output of the monostable circuit 56b maintains the OFF state, and thus, the gain adjustor 56c sets the control gain Ga to "1". Thus, the straightness securing control value δa calculated by the straightness securing section 55 is supplied to the adder 56e as it is. Accordingly, the straightness securing control value δa is added to the target turning angle δ*, so that the straightness securing control is performed.

Further, the turning state detector 53A receives an input of a yaw angle ψ detected by the yaw angle sensor 22a which is a yaw angle detector, and when the yaw angle ψ exceeds a predetermined setting angle NA, the turning state detector 53A determines that the vehicle is in the turning state. The braking state detector 53B receives an input of a braking instruction signal Sb output to the pressure control unit 20, and when the braking state instruction signal Sb is in an ON state, the braking state detector 53B determines that the vehicle is in the braking state.

Further, the yaw angle controller 53C receives inputs of the determination results of the turning state detector 53A and the braking state detector 53B, and receives inputs of the yaw angle ψ detected by the yaw angle sensor 22a, the steering angle θs detected by the steering angle sensor 4, and the vehicle velocity V calculated by the vehicle state parameter acquisition unit 21. When the vehicle enters the braking state during turning traveling, the yaw angle controller 53C executes a yaw angle control process so that the yaw angles before and after braking match each other.

Figure 12:
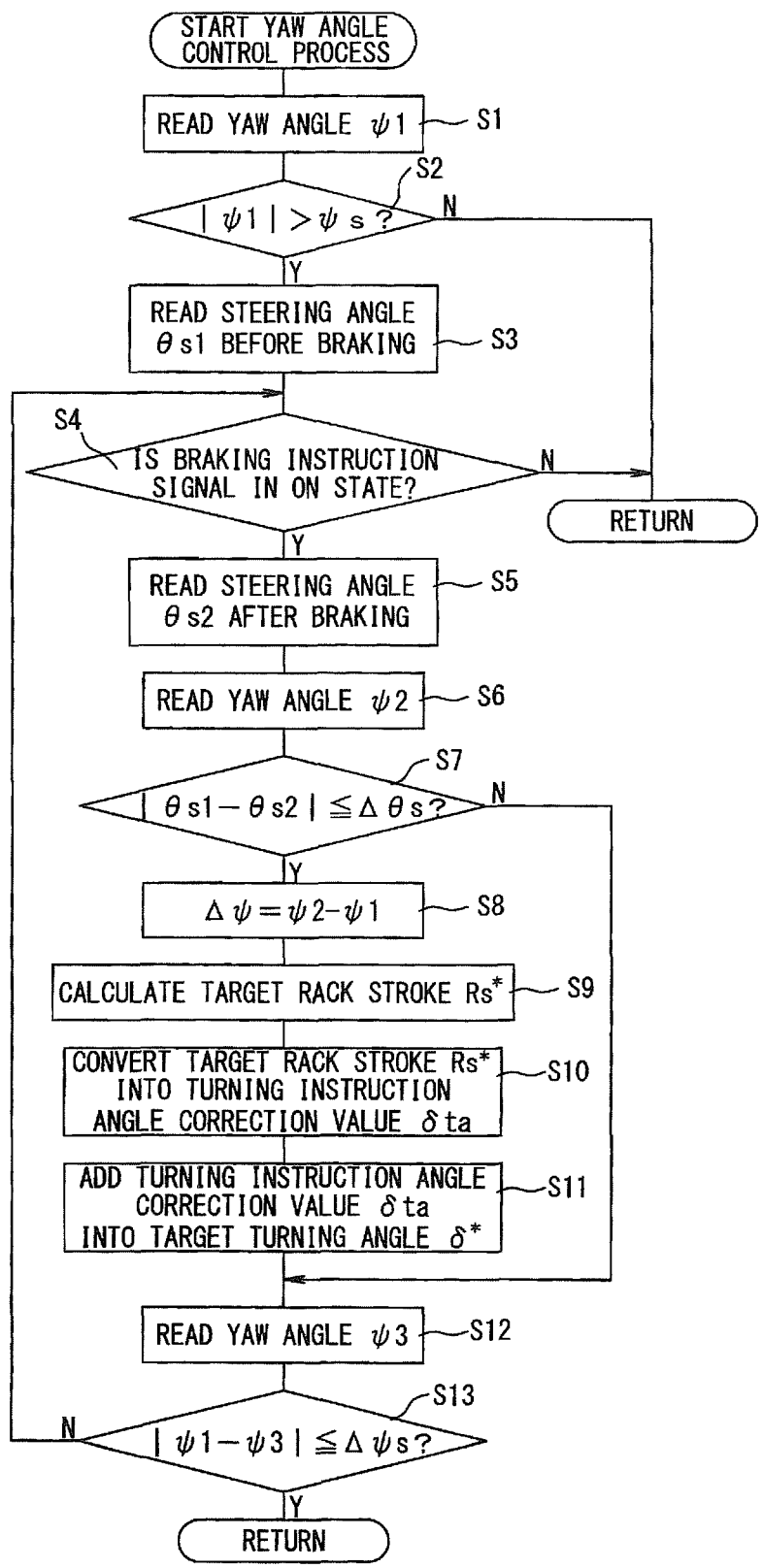
FIG. 12 is a flowchart illustrating an example of a procedure of a yaw angle control process according to the first embodiment.

The yaw angle control process is executed as a timer interruption process executed every predetermined time (for example, 1 μsec). The yaw angle control process is expressed as shown in FIG. 12, including the processes of the turning state detector 53A and the braking state detector 53B.

In the yaw angle control process, first, a yaw angle ψ1 detected by the yaw angle sensor 22a is read in step S1, and is stored in a yaw angle storing section 53a.

Then, the procedure progresses to step S2 to determine whether an absolute value of the read yaw angle ψ1 exceeds a threshold value NA close to zero so that the vehicle is in the turning state. When ψ1≤ψs, it is determined that the vehicle is not in the turning state, and the current timer interruption process is terminated to return to a predetermined main program.

On the other hand, when the determination result in S2 is ψ1>ψs, it is determined that the vehicle is in the turning state, the procedure progresses to step S3. Here, a steering angle θs1 detected by the steering angle sensor 4 is read and is stored in a steering angle storing section 53b, and then, the procedure progresses to step S4.

In step S4, it is determined whether the braking instruction signal Sb in the ON state indicating the braking state, for operating the wheel cylinder 19, is input from a braking device mounted in the control/drive circuit unit 26. When the braking instruction signal Sb is in the OFF state, it is determined that the vehicle is not in the braking state, and the current timer interruption process is terminated to return to the predetermined main program. Further, when the braking instruction signal Sb is in the ON state, it is determined that the vehicle is in the braking state, the procedure progresses to step S5.

In step S5, a steering angle θs2 after braking detected by the steering angle sensor 4 is read. Then, the procedure progresses to step S6 to read a braking yaw angle ψ2 detected by the yaw angle sensor 22a, and then, progresses to step S7.

In step S7, the steering angle θs1 before braking stored in the steering angle storing section 53b is read, and it is determined whether an absolute value of a value obtained by subtracting the steering angle θs2 after braking from the steering angle θs1 before braking is smaller than a steering angle θss close to zero. When |θs1−θs2|≤θss, it is determined that the vehicle is in a steering wheel holding state where a driver does not steer the steering wheel 2 in a turning increase direction or in a returning direction, and the procedure progresses to step S8.

In step S8, the yaw angle ψ1 before turning stored in the yaw angle storing section 53a is read and is subtracted from the yaw angle ψ2 after braking to calculate a yaw angle deviation Δψ(=ψ2−ψ1), and then, the procedure progresses to step S9.

Figure 13:
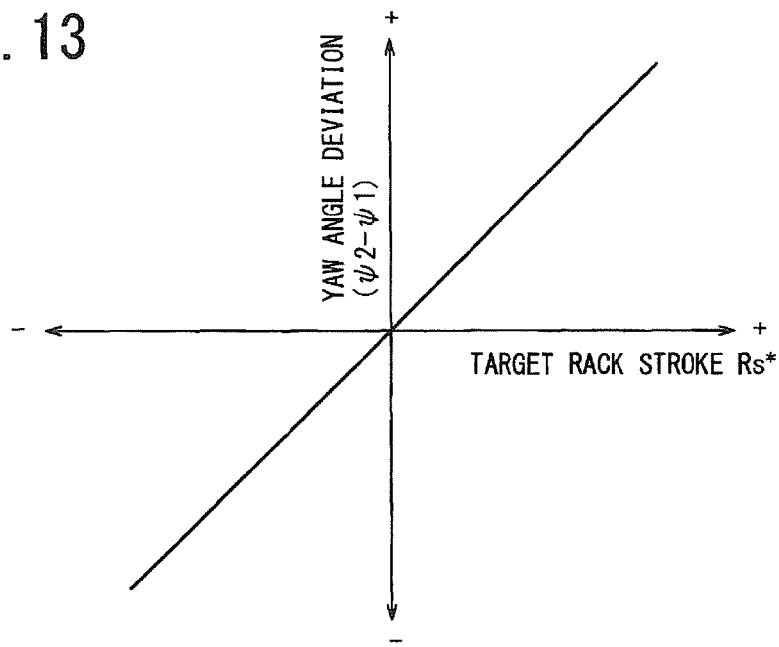
FIG. 13 is a characteristic line map illustrating a target rack stroke calculation map illustrating the relationship between a target rack stroke and a yaw angle deviation.

In step S9, a target rack stroke Rs* which is a target turning amount for generating a toe angle necessary for eliminating the yaw angle deviation Δψ is calculated based on the yaw angle deviation Δψ with reference to a target rack stroke calculation map shown in FIG. 13. Here, in the target rack stroke calculation map, as shown in FIG. 13, a transverse axis represents the target rack stroke Rs*, and a longitudinal axis represents the yaw angle deviation (ψ2−ψ1). Here, a characteristic line Lr where as the yaw angle deviation (ψ2−ψ1) increases in a positive direction from zero, the target rack stroke Rs* also increases in the positive direction, and as the yaw angle deviation Δψ increases in a negative direction from zero, the target rack stroke Rs* also increases in the negative direction is set.

Then, the procedure progresses to step S10 to convert the calculated target rack stroke Rs* into a turning angle correction value δta for the target turning angle δ* to be generated by the turning actuator 8. Then, the procedure progresses to step S11 to add the turning angle correction value δta to the target turning angle δ*, and then, the procedure progresses to step S12.

In step S12, a yaw angle ψ3 after yaw angle control detected by the yaw angle sensor 22a is read, and then, the procedure progresses to step S13 to read the yaw angle ψ1 during turning starting stored in the yaw angle storing section 53a. Further, it is determined whether an absolute value of a value obtained by subtracting the yaw angle ψ3 after yaw angle control from the yaw angle ψ1 during turning starting is smaller than a setting value Δψs close to zero. When the determination result is |ψ1−ψ3|≥Δψs, it is determined that the yaw angle deviation before and after turning braking is not eliminated, and the procedure returns to step S4. When the determination result is |ψ1−ψ3|<Δψs, it is determined that the yaw angle deviation before and after turning braking is eliminated, and the current timer interruption process is terminated to return to the predetermined main program.

Further, when the determination result in step S7 is |θs1−θs2|>θss, it is determined that the driver steers the steering wheel 2 in the turning increase direction or in the returning direction, and the procedure jumps to step S12 without performing the rack stroke control.

In the yaw angle control process in FIG. 12, the processes of steps S1 and S2 correspond to the turning state detector 53A, the process of step S4 corresponds to the braking state detector 53B, and the processes of step S1, step S3, and steps S5 to S13 correspond to the yaw angle controller 53C.

The actuator controller 54 includes a turning angle deviation calculator 61 that calculates a turning angle deviation Δδ, a turning motor controller 62, a current deviation calculator 63, and a motor current controller 65.

The turning angle deviation calculator 61 subtracts an actual turning angle δr based on a turning actuator angle output from the turning actuator angle sensor 9 from a target turning angle correction value δ*a output from the adder 56e to calculate the turning angle deviation Δδ, and outputs the calculated turning angle deviation Δδ to the turning motor controller 62.

The turning motor controller 62 calculates a drive instruction current im* of a turning motor 8a that forms the steering actuator 8 so that the input turning angle deviation Δδ becomes zero, and outputs the calculated drive instruction current im* to the current deviation calculator 63.

The current deviation calculator 63 subtracts a motor current imr output from the motor current detector 64 that detects a motor current supplied to the turning motor 8a that forms the turning actuator 8 from the input drive instruction current im* to calculate a current deviation Δi, and outputs the calculated current deviation Δi to the motor current controller 65.

The motor current controller 65 performs a feedback control so that the input current deviation Δi becomes zero, i.e., the actual motor current imr follows the drive instruction current im*, and outputs the turning motor drive current imr to the turning motor 8a.

(Operation of First Embodiment)

Next, an operation of the first embodiment will be described with reference to FIGS. 14 and 15.

Here, it is assumed that the steering wheel 2 maintains the neutral position for straight traveling.

In the straight traveling state, the target turning angle δ* calculated by the target turning angle calculator 51 becomes zero. Thus, the rack shaft 14 is controlled to maintain the neutral position by the turning motor 8a controlled by the actuator controller 54, so that the turning angles δr of the turning wheels 17FR and 17FL are controlled to become zero through the tie rods 15. Here, since the steering wheel 2 maintains the neutral position, the yaw angle ψ1 of the vehicle detected by the yaw angle sensor 22a is zero. Since the gravity central point side slip angle β becomes zero and the yaw rate γ also becomes zero as the turning angle δr becomes zero, the self aligning torque Tsa calculated according to Formula (1) by the straightness complementing section 55a becomes zero.

Since the disturbance compensating value Adis for suppressing the disturbance is calculated in the disturbance compensating section 55b, the disturbance compensating value Adis becomes zero when the disturbance does not occur.

Further, in the yaw angle controller 53C, since the vehicle is not in the turning state but is in the straight traveling state so that the yaw angle ψ1 is zero, it is not determined that the vehicle is in the turning traveling state. Thus, the rack stroke control for correcting the rack stroke is not performed, and the target turning angle correction value δ*a obtained by adding the correction values δa and δta to the target turning angle δ*a becomes zero.

Accordingly, the turning angle deviation Δδ output from the turning angle deviation calculator 61 of the actuator controller 54 also becomes zero, and the motor current instruction value im* output from the turning motor controller 62 also becomes zero. Thus, the motor current imt is not output from the motor current controller 65, and the turning motor 8a enters the stop state, and the rack shaft 14 maintains the neutral position, so that the turning angle δt of the turning wheels 17FR and 17FL is controlled to become "0".

In the straightness traveling state, if at least one of the turning wheels 17FR an 17FL is fit in a wheel track or passes on a manhole cover so that at least one of the turning wheels 17FR and 17FL is turned or a yaw angle is generated, the self aligning torque Tsa calculated by the straightness complementing section 55a increases. Here, when the king pin axis KS is set to pass through the tire contact surface in a state where the steering wheel 2 is at the neutral position as described in the suspension device 1B to improve the turning responsiveness, the self aligning torque Tsa generated by the suspension device 1B becomes insufficient.

However, in the present embodiment, since the self aligning torque is calculated based on the above-described Formula (1), by setting the caster trail εc in Formula (1) to the same value as that of a normal suspension device, it is possible to calculate a value corresponding to the caster trail εc as the calculated self aligning torque Tsa. Further, the calculated self aligning torque Tsa is multiplied by a gain Ksa to calculate a straightness correction value Asa, and the straightness correction value Asa is supplied to the delay controller 56.

Here, since the vehicle is in the straight traveling state, the delay controller 56 sets the gain Ga to "1" by the gain adjustor 56c without detecting the steering start by the steering start detector 56a, and thus, the straightness correction value Asa is supplied to the adder 56e as it is. Thus, as the target turning angle δ* is corrected by the straightness correction value Asa, the turning motor 8a that forms the turning actuator 8 is drive-controlled by the actuator controller 54 to generate a turning torque corresponding to the self aligning torque Tsa, and the generated turning torque is transmitted to the turning wheels 17FR and 17FL through the rack shaft 14 and the tie rods 15.

Thus, the self aligning torque Tsa is generated in the turning wheels 17FR and 17FL, so that the lack of the self aligning torque to the suspension device 1 is complemented to secure the straightness of the vehicle.

However, if a state where the straight traveling state where the steering wheel 2 maintains the neutral position is changed to a state where the steering wheel 2 is steered rightward (or leftward), the change from the straight traveling state to the turning state due to the steering is detected by the steering start detector 56a.

Thus, a control delay signal that is in an ON state for a predetermined time, for example, 0.1 seconds is output to the gain adjustor 56c from the monostable circuit 56b. Accordingly, the control gain Ga is set to "0" in the gain adjustor 56c while the control delay signal continues the ON state. Thus, the multiplication output that is output from the multiplier 56d becomes "0", and the output of the straightness securing control value δa to the adder 56e is stopped.

Figure 15A:
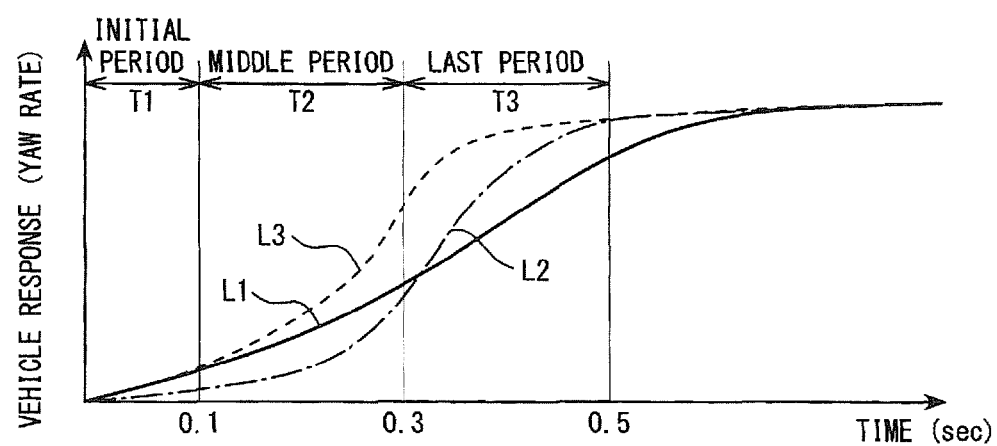
FIG. 15 is a diagram illustrating a turning response characteristic, in which (a) is a characteristic line map illustrating change in a response characteristic of a vehicle, and (b) is a diagram illustrating a switching timing of a control characteristic.
Figure 15B:
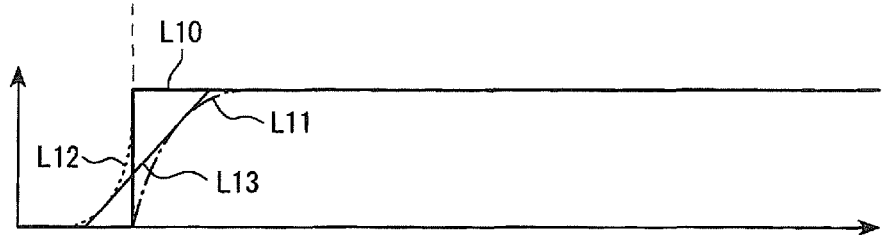

Accordingly, since the control gain Ga is set to "0" during an initial response period T1 of 0.1 seconds from a time point when the steering is started from the neutral position of the steering wheel 2, the multiplication output that is output from the multiplier 56d becomes "0", and the straightness securing control for the target turning angle δ* is stopped as indicated by a solid line in FIG. 15(b).

Thus, the steering angle θs detected by the steering angle sensor 4 is supplied to the target turning angle calculator 51, and the target turning angle δ* calculated by the target turning angle calculator 51 is supplied to the turning angle deviation calculator 61 as it is. Thus, the turning motor 8a is rotationally driven so as to match the target turning angle δ*. During this period, the straightness securing control in the straightness securing section 55 is stopped.

Accordingly, in the initial response period T1, the road surface contact point of the king pin axis KS is set to the contact central position in the contact surface of the tire, and the turning is started by the suspension device 1B in which the caster angle is set to zero.

Figure 14A:
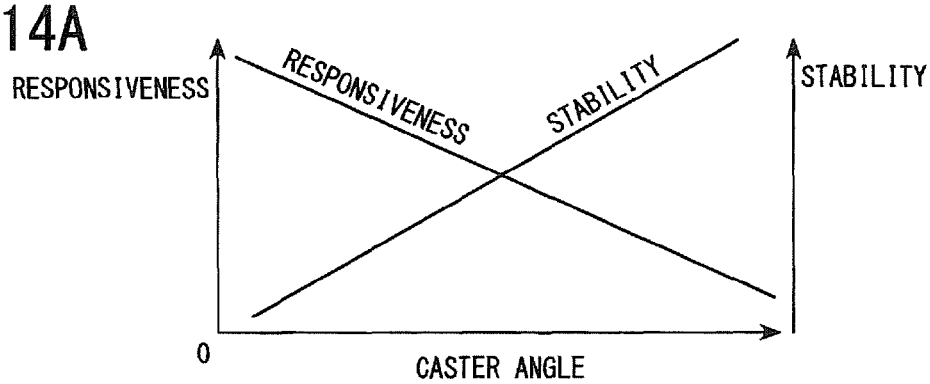
FIG. 14 is a diagram illustrating a characteristic of a suspension device, in which (a) is a diagram illustrating the relationship between a caster angle, and responsiveness and stability, and (b) is a diagram illustrating the relationship between a caster trail, and lateral force reduction and straightness.

Here, the caster angle of the suspension device 1B is set to zero. The relationship between the caster angle, the turning responsiveness, and the handling stability is in a state where the turning responsiveness is high when the caster angle is zero, as shown in FIG. 14(a), but in this case, the handling stability cannot be secured. That is, the steering responsiveness and the handling stability with respect to the caster angle have a trade-off relationship.

Thus, in the initial state where the steering is started from the neutral position, the straightness securing control due to the steer-by-wire control is not executed, and thus, the initial turning is provided by the suspension device 1B.

In the initial response period T1, as described above, since the suspension device 1B has the caster angle of 0 degrees and the high handling responsiveness, as indicated by a characteristic line L1 shown by a solid line in FIG. 15(a), it is possible to obtain a turning response characteristic (yaw rate) higher than a turning response characteristic (yaw rate) in a vehicle having a general steer-by-wire type steering system indicated by a characteristic line L2 shown by a single dot chain line. Here, since the turning angle is changed corresponding to a steering angle change due to the steering of the steering wheel 2 of the driver, the driver does not feel discomfort.

However, if the turning is continued in excess of the initial response period T1 only using the turning responsiveness based on the suspension device 1B, as indicated by a characteristic line L3 shown by a broken line in FIG. 15(a), the turning responsiveness of the vehicle due to the steering in a middle response period T2 and a last response period T3 becomes sensitive. Further, a rolling-in phenomenon of the vehicle toward the inside over the middle response period T2 to the last response period T3 increases.

Thus, in the above first embodiment, as shown in FIG. 15(b), for example, when 0.1 seconds elapse from the initial response period T1, the straightness securing control for the target turning angle δ* in the straightness securing section 55 formed by the straightness complementing section 55a and the disturbance compensating section 55b is started in a step form. Thus, it is possible to suppress the turning responsiveness of the vehicle due to the suspension device 1B to suppress staggering of the vehicle, and as indicated by a dotted line in FIG. 14(b), it is possible to complement the straightness of the suspension device 1B by the steer-by-wire control to secure the handling stability.

Then, for example, when 0.3 seconds elapse after the middle response period T2, the turning response characteristic is further suppressed compared with a general turning response characteristic of the vehicle by the straightness securing control in the straightness securing section 55, to thereby make it possible to obtain an under-steering tendency. Thus, as indicated by the characteristic line L1 shown by the solid line in FIG. 15(a), it is possible to enhance the handling stability, and to realize an ideal turning response characteristic of the vehicle indicated by the characteristic line L1.

In the turning traveling state of the vehicle, in the yaw angle controller 53C, in the above-described yaw angle control process in FIG. 12, the yaw angle ψ1 is read in step S1 and is stored in the yaw angle storing section 53a, and then, the procedure progresses to step S2, so that the vehicle is in the turning traveling state. Thus, the procedure progresses to step S3 to read the steering angle θs1 before braking and to store the steering angle θs1 before braking in the steering angle storing section 53b, and then, the processes up to the termination of the timer interruption process are repeated. Thus, the yaw angle ψ1 is updated and stored in the yaw angle storing section 53a, and the steering angle θs1 before braking is updated and stored in the steering angle storing section 53b.

In the turning traveling state, if the driver steps on a brake pedal, the braking device is operated so that the vehicle enters a braking state where a braking force is applied to the respective vehicle wheels 17FR, 17FL, 17RR, and 17RL. In this way, if the vehicle is in the braking state, a braking instruction signal Bc output from the control/drive circuit unit 26 is in the ON state.

Thus, in the yaw angle controller 53C, in the process of FIG. 12, the procedure progresses to step S5 from step S4 to read the steering angle θs2 after braking, and then, to read the yaw angle ψ2 after braking (step S6).

Further, when there is no change in the steering angles θs1 and θs2 before and after braking, it is determined that the vehicle is in the steering wheel holding state where the driver does not steer the steering wheel 2 in the turning increase direction or in the returning direction, and the procedure progresses to step S8 to subtract the yaw angle ψ1 before braking from the yaw angle ψ2 after braking to thereby calculate the yaw angle deviation Δψ(=ψ2−ψ4) before and after braking. Further, the target rack stroke Rs* for eliminating the yaw angle deviation Δψ is calculated based on the calculated yaw angle deviation Δψ with reference to the target rack stroke calculation map shown in FIG. 13 (step S9).

Further, the calculated target rack stroke Rs* is converted into the turning angle correction value δta for performing the yaw angle control corresponding to the target turning angle δ* (step S10). Then, the converted turning angle correction value δta is added to the target turning angle δ*, and the result is output to the actuator controller 54.

Thus, in the actuator controller 54, the turning actuator 8 is controlled so that a toe angle change for eliminating the yaw angle deviation Δψ before and after braking is given to the turning wheels 17FR and 17FL, the rack shaft 14 strokes by the target rack stroke Rs*, and the stroke is supplied to the turning wheels 17FR and 17FL through the tie rods 15.

Figure 16A:
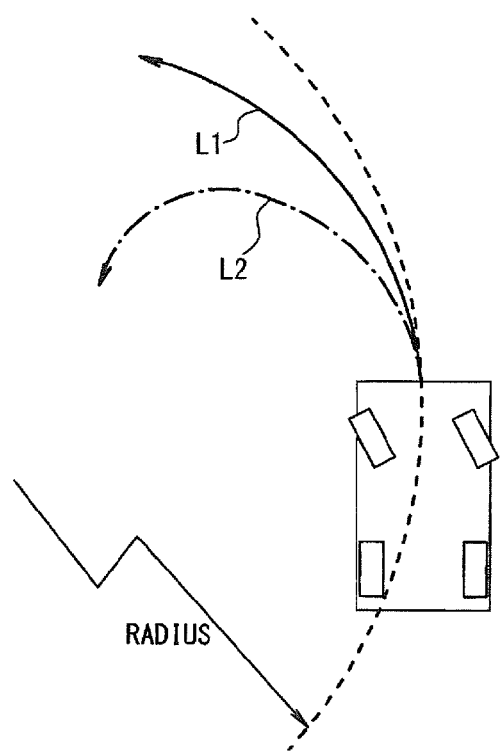
FIG. 16 is a diagram illustrating an operation of the first embodiment, in which (a) is a diagram illustrating a steering characteristic of a vehicle, and (b) is a diagram illustrating movement of the vehicle in a vehicle width direction.

Accordingly, the toe angle change toward the outside of the turning is performed so that the turning wheels 17FR and 17FL eliminate the yaw angle deviation Δψ, and the vehicle steering characteristic is controlled in an under-steering state as indicated by a curve L1 shown by a solid line in FIG. 16(a). Thus, in a state where the vehicle 1 travels and turns at a corner as shown in FIG. 16(b), even in the braking state, it is possible to suppress a movement amount in the vehicle width direction, and to maintain a travel lane for traveling.

Figure 16B:
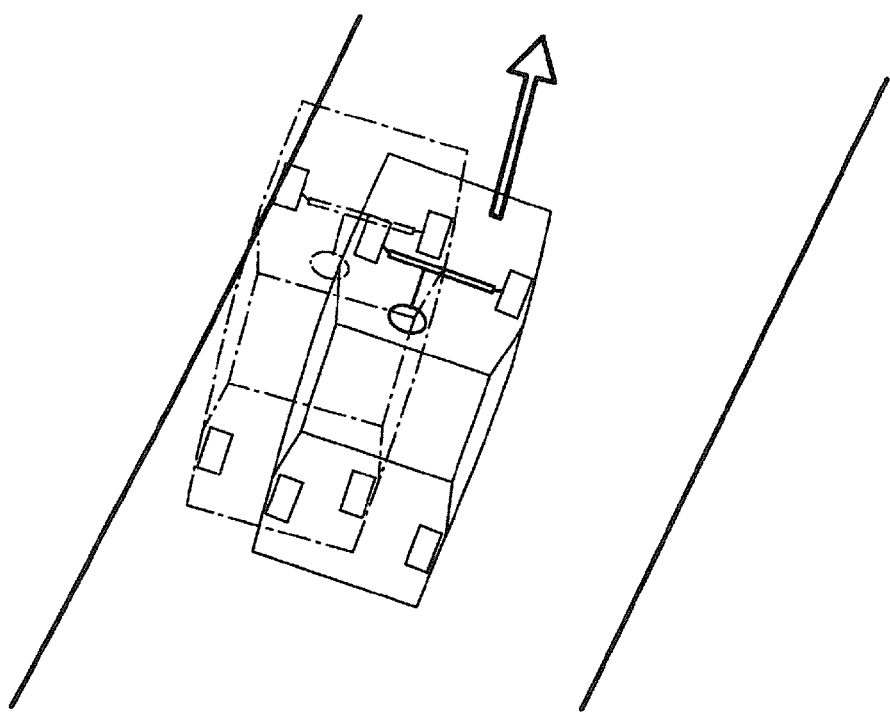

Then, when the yaw angle control is not performed, the yaw angle increases as indicated by a single dot chain line in FIG. 16(a) to show an over-steering characteristic, and the movement amount toward the inside of the turning in the vehicle width direction increases as indicated by a single dot chain line in FIG. 16(b), so that the vehicle moves toward an adjacent lane, which deteriorates the handling stability.

Further, in the present embodiment, since the rack stroke of the rack shaft 14 is controlled to cause the toe angle change as the turning actuator 8 is controlled, it is possible to control the vehicle to be in the under-steering state with high responsiveness during turning braking, and to enhance the handling stability, without causing response delay due to a hydraulic pressure control in a case where a braking pressure on an outer wheel side becomes larger than a braking pressure on an inner wheel side by the braking device to generate a yaw angle toward the outside of the turning, for example.

Further, it is possible to perform the yaw angle control during turning braking by the yaw angle controller 53C provided in the turning control unit 50 that forms the steer-by-wire system. Thus, in order to increase longitudinal force compliance steering to the under-steering by the front-side suspension device 1B, for example, it is not necessary to set the transverse link to be longer than the rack shaft in the vehicle width direction in a state where the transverse link and the rack shaft are arranged approximately in parallel. Further, as the suspension characteristic, it is not necessary to set a longitudinal force toe characteristic in which the front-side suspension device is in a longitudinal force toe-out state and the rear-side suspension device is in a longitudinal force toe-in state. Accordingly, it is possible to realize the front and rear suspension devices with a simple and light-weight configuration.

Then, the yaw angle ψ3 is read again, and the yaw angle control is continued until the yaw angle deviation between the yaw angle ψ3 and the yaw angle ψ1 before braking is equal to or greater than the setting value Δψs or the braking state is stopped.

In the turning braking state, if the absolute value of the steering angle deviation obtained by subtracting the steering angle θs2 after braking from the steering angle θs1 before braking exceeds the setting value Δθs as the driver steers the steering wheel 2, the procedure jumps from step S7 to step S12 to stop the yaw angle control for calculating the turning angle correction value δta. Thus, the influence on the steering of the steering wheel 2 such as counter-steering of the driver is prevented.

As described above, according to the vehicle steering apparatus according to the present embodiment, in the suspension device 1B, since the caster trail is set in the tire contact surface, it is possible to reduce the moment around the king pin axis KS.

Accordingly, in a first embodiment, similarly, it is possible to perform turning using a smaller rack shaft force, and to control the direction of the vehicle wheels using a small force, to thereby enhance the turning responsiveness.

In this way, in the first embodiment, by setting the king pin axis KS to pass through at least the inside of the tire contact surface, the suspension device 1B is configured to enhance the turning responsiveness is, and performs the straightness complementation and the disturbance compensation for controlling the turning characteristic by the straightness securing section 55 of the steer-by-wire system SBW to secure the straightness of the suspension device 1B.

Thus, when the rightward steering or leftward steering is performed from the state where the steering wheel 2 maintains the neutral position, in the initial response period T1, high responsiveness is secured using the high turning responsiveness of the suspension device 1B. Then, if the initial response period T1 elapses to enter the middle response period T2, it is necessary to set a high value on the handling stability compared with the turning responsiveness. Thus, by setting the control gain Ga to "1" by the gain adjustor 56c of the delay controller 56 in the steer-by-wire system SBW, the straightness securing control based on the straightness securing control value δa calculated by the straightness securing section 55 is started.

Thus, as the straightness securing control such as the turning angle control, the straightness complementation, and the disturbance compensation is started, the high turning responsiveness due to the suspension device 1B is controlled to secure the handling stability. Further, in the last response period T3, the turning responsiveness is further reduced to suppress the rolling-in phenomenon of the vehicle toward the inside, to thereby obtain the under-steering tendency. Thus, it is possible to suppress staggering of the vehicle, to thereby establish an ideal turning responsiveness control.

However, if the straight traveling state where the steering wheel 2 maintains the neutral position is changed to the state where the steering wheel 2 is steered rightward (or leftward), the change from the straight traveling state to the turning state due to the steering is detected by the steering start detector 56a. Thus, the gain Ga is set to "0" for 0.1 seconds by the gain adjustor 56c.

Thus, the correction control process for the turning instruction angle δ* is stopped during the initial response period of 0.1 seconds from the time point when the steering is started from the neutral position of the steering wheel 2, as shown in FIG. 15(b).

Accordingly, the rotational angle θmi of the actuator 6 is supplied to the target turning angle calculator 51, and the turning instruction angle δ* calculated in the target turning angle calculator 51 is supplied to the turning angle deviation calculator 61 as it is. Thus, the turning motor 8a is rotationally driven to match the turning instruction angle δ*. During this period, the turning angle correction process in the steer-by-wire control is stopped.

Accordingly, in the initial response period, the turning is started by the suspension device in which the road surface contact point of the king pin axis KS is set to the contact center position in the contact surface of the tire and the caster angle is set to zero.

Here, the caster angle of the suspension device is set to zero. The relationship between the caster angle, the steering responsiveness, and the handling stability is in a state where the steering responsiveness is high when the caster angle is zero, as shown in FIG. 14(a), but in this case, the handling stability cannot be secured. That is, the steering responsiveness and the handling stability with respect to the caster angle have the trade-off relationship.

Thus, in the initial state where the steering is started from the neutral position, the turning angle correction process due to the steer-by-wire control is not executed, and thus, the initial turning is provided by the suspension device.

In the initial period, as described above, since the suspension device has the caster angle of 0 and the high handling responsiveness, as indicated by the characteristic line L1 shown by the solid line in FIG. 15(a), it is possible to achieve a steering response characteristic (yaw angle) higher than a steering response characteristic (yaw angle) in a vehicle having a general steer-by-wire type steering system indicated by the characteristic line L2 shown by the single dot chain line. Here, since the turning angle is changed corresponding to the steering angle change due to the steering of the steering wheel 2 of the driver, the driver does not feel discomfort.

However, if the turning is continued in excess of the initial response period only using the steering responsiveness due to the suspension device, as indicated by the characteristic line L3 shown by the broken line in FIG. 15(a), the steering responsiveness of the vehicle due to the steering becomes sensitive in the middle and last periods. Further, the rolling-in phenomenon of the vehicle toward the inside over the middle period to the last period increases.

Figure 14B:
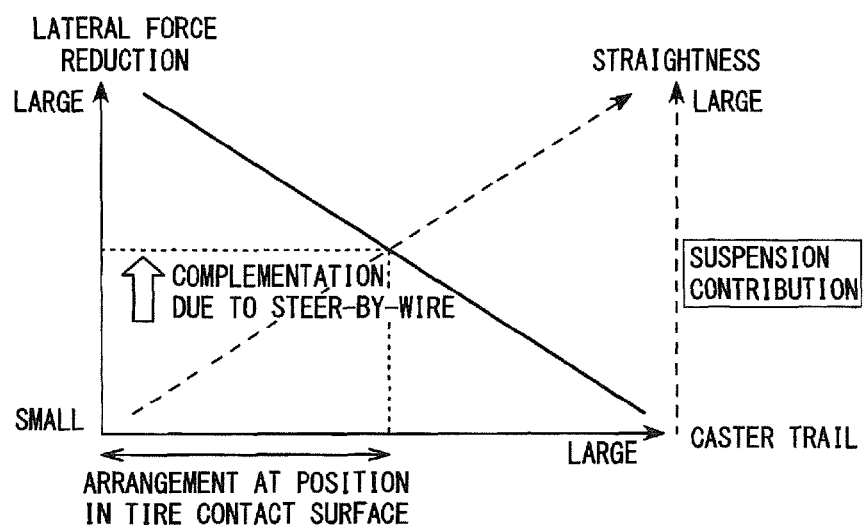

Thus, in the above first embodiment, as shown in FIG. 15(b), for example, when 0.1 seconds elapse after the initial period, the turning angle correction process for the turning instruction angle δ* due to the straightness complementing section 55a and the disturbance compensating section 55b is started in the step form. Thus, it is possible to suppress the steering responsiveness of the vehicle by the suspension device to suppress staggering of the vehicle. Further, as shown in FIG. 14(b), it is possible to complement the straightness by the steer-by-wire control, to thereby secure the handling stability. Then, for example, when 0.3 seconds elapse, the steering response characteristic is further suppressed compared with the general vehicle steering response characteristic, to thereby make it possible to obtain the under-steering tendency. Thus, as indicated by the characteristic line L1 shown by the solid line in FIG. 15(a), it is possible to enhance the handling stability, and to realize an ideal turning response characteristic of the vehicle as indicated by the characteristic line L1.

As described above, according to the vehicle steering apparatus according to the present embodiment, in the suspension device 1B, since the caster trail is set in the tire contact surface, it is possible to reduce the moment around the king pin axis KS.

Accordingly, it is possible to perform the turning with a small rack shaft force, and to control the direction of the vehicle with a small force, and thus, it is possible to enhance the steering responsiveness.

In this way, in the first embodiment, by setting the king pin axis KS to pass through at least the inside of the tire contact surface, the suspension device 1B is configured to enhance the turning responsiveness is, and performs the straightness complementation and the disturbance compensation for controlling the turning characteristic by the straightness securing section 55 of the steer-by-wire system SBW.

Thus, when the rightward steering or leftward steering is performed from the state where the steering wheel 2 maintains the neutral position, as the initial responsiveness, high responsiveness is secured using the high turning responsiveness of the suspension device. Then, if the initial period elapses to enter the middle period, it is necessary to set a high value on the handling stability compared with the steering responsiveness. Thus, as the control is started by the turning responsiveness setting section 52 of the steer-by-wire system SBW to perform the straightness complementing control, the high turning responsiveness due to the suspension device 1B is suppressed to secure the handling stability. Further, in the last period, the steering responsiveness is further reduced so as to suppress the rolling-in phenomenon of the vehicle toward the inside to obtain the under-steering tendency. Thus, it is possible to suppress staggering of the vehicle, to thereby establish an ideal steering responsiveness control.

Further, since the suspension device 1B according to the present embodiment is the strut type, it is possible to reduce the number of components, and to easily perform the setting of the king pin axis KS in the present embodiment.

In the present embodiment, the control/drive circuit unit 26 that includes the input-side steering shaft 3, the steering reaction force actuator 6, the steering reaction force actuator angle sensor 7, the turning actuator 8, the turning actuator angle sensor 9, the output-side steering shaft 10, and the turning control unit 50 form the steer-by-wire system SBW. Further, the vehicle wheels 17FR, 17FL, 17RR, and 17RL correspond to the tire wheel, the tire, and the wheel hub mechanism. In addition, the first link 37, the second link 38, and the shock absorber 40 correspond to the plural link members. Further, the lower arm is configured by the first link 37 and the second link 38, and the strut member ST is configured by the spring member 34 and the shock absorber 40.

Figure 17:
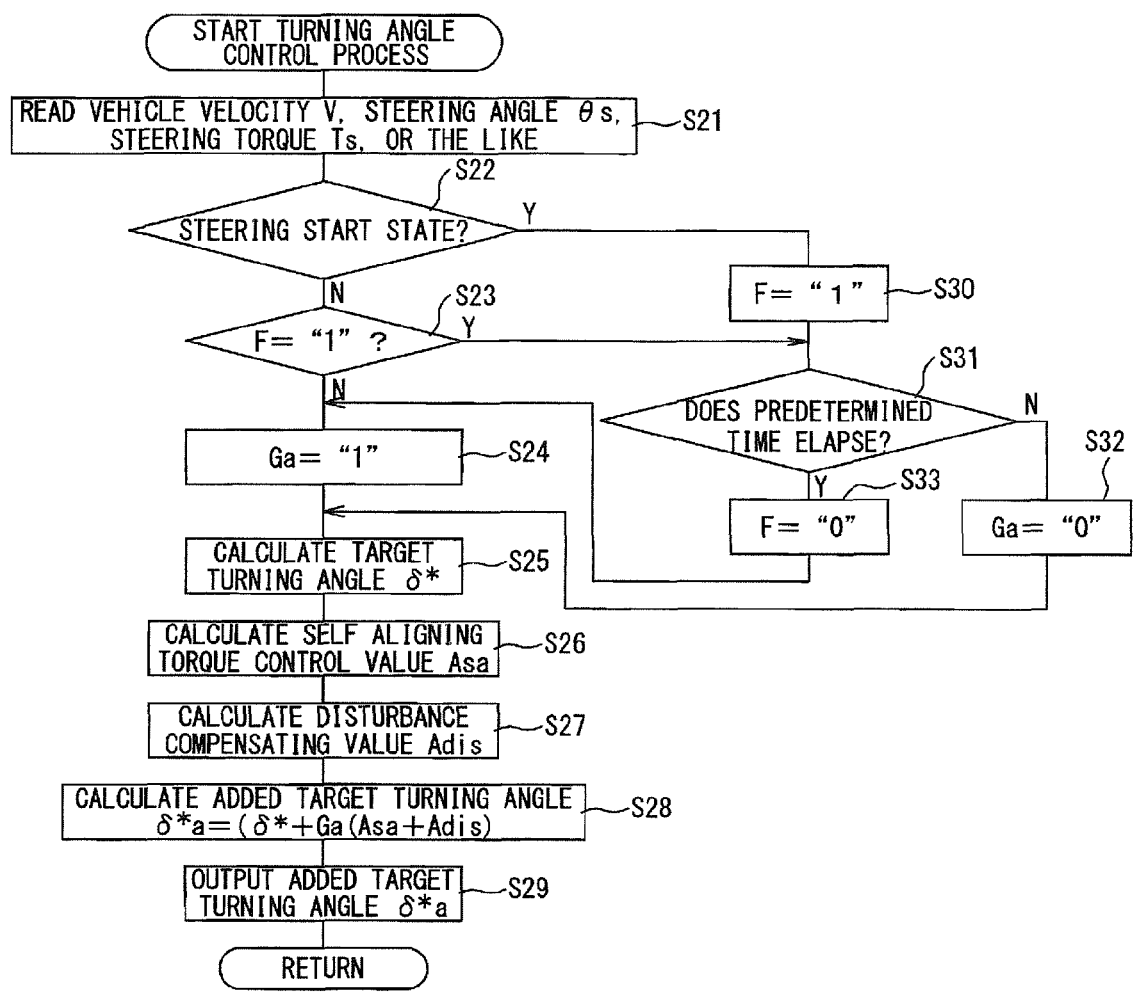
FIG. 17 is a flowchart illustrating an example of a steering control process.

In the first embodiment, a case where the turning control unit 50 is configured by hardware is described, but the invention is not limited to thereto, and for example, the target turning angle calculator 51 and the turning responsiveness setting section 52 may be configured by an operation processing device such as a microcomputer, and the turning control process shown in FIG. 17 may be executed by the operation processing device.

In the turning control process, as shown in FIG. 17, first, in step S21, data necessary for operation processing such as a vehicle V, a steering angle θs detected by the steering angle sensor 4, a rotational angle θmo detected by the steering actuator angle sensor 9, or a torque Ts detected by the steering torque sensor 5 is read. Then, the procedure progresses to step S22 to determine whether the vehicle is in a steering start state where the rightward steering or leftward steering is performed from the state where the steering wheel 2 maintains the neutral position based on the steering angle θs detected by the steering angle sensor 4, and when the vehicle is not in the steering start state, the procedure progresses to step S23.

In step S23, it is determined whether a control flag F indicating that the vehicle is in the steering start control state is set to "1", and when the control flag F is reset to "0", the procedure progresses to step S24 to set the control gain Ga to "1", and then, progresses to step S25.

In step S25, the target turning angle δ* is calculated based on the vehicle velocity V and the steering angle θs, similar to the above-described target turning angle calculator 51.

Then, the procedure progresses to step S26 to perform an operation of Formula (1) to calculate the self aligning torque Tsa, similar to the above-described straightness complementing section 55a, and multiplies the self aligning torque Tsa by the predetermined gain Ksa to calculate the self aligning torque control value Asa.

Then, the procedure progresses to step S27 to divide and estimate the disturbance input to the vehicle for each frequency band based on the motor rotational angle θmo from the turning actuator angle sensor 9, the steering torque Ts, and the motor current imr detected by the motor current detector 64, and calculates the disturbance compensating value Adis for suppressing the disturbance.

Then, the procedure progresses to step S28 to perform an operation of Formula (2) based on the target turning value δ*, the self aligning torque control value Asa, and the disturbance compensating value Adis to calculate an added target turning angle δ*a.

$$\delta^*a = \delta^* + Ga(Asa + Adis) \quad (2)$$

Then, the procedure progresses to step S29 to output the added target turning angle δ*a calculated in step S28 to the turning angle deviation calculator 61 in FIG. 11, and then, returns to step S21.

Further, when the determination result of step S22 indicates the steering start state, the procedure progresses to step S30 to set the control flag F to "1", and then, progresses to step S31. Further, when the determination result of step S23 indicates that the control flag F is set to "1", the procedure directly progresses to step S31.

In step S31, it is determined whether the predetermined delay time (for example, 0.1 seconds) elapses. Here, when the delay time does not elapse, the procedure progresses to step S32 to set the control gain Ga to "0", and then, progresses to step S25 to calculate the target turning angle δ*.

Further, when the determination result of step S31 indicates that the predetermined delay time (for example, 0.1 seconds) elapses, the procedure progresses to step S33 to reset the control flag F to "0", and then, progresses to step S24 to set the control gain Ga to "1".

In a turning control operation process shown in FIG. 17, similarly, when the vehicle is not in the steering start state where the rightward steering or leftward steering is started from the state where the steering wheel 2 maintains the neutral position, a straightness securing control for adding, to the target turning angle δ*, the straightness securing control value δa obtained by adding the self aligning torque control value Asa and the disturbance compensating value Adis to the target turning angle δ* is performed.

On the other hand, when the vehicle is in the steering start state where the rightward steering or leftward steering is started from the state where the steering wheel 2 maintains the neutral position, since the control gain Ga is set to "0" until the predetermined delay time elapses, the straightness securing control is stopped. Thus, only the target turning angle δ* is output to the turning angle deviation calculator 61, and thus, the turning motor 8a that forms the turning actuator 8 is rotationally driven. Thus, as the high turning responsiveness of the suspension device is set, it is possible to obtain high turning responsiveness as the initial turning responsiveness.

Then, if the delay time elapses, since the control gain Ga is set to "1", the turning motor 8a that forms the turning actuator 8 is rotationally driven by a value obtained by adding, to the target turning angle δ*, the straightness securing control value δa obtained by adding the compliance steering control value Ac, the self aligning torque control value Asa, and the disturbance compensating value Adis to the target turning angle δ*. Thus, it is possible to suppress the high turning responsiveness of the suspension device 1B to secure the straightness of the suspension device 1B, to thereby achieve an ideal turning response characteristic.

In the turning control process, similarly, in the vehicle straight traveling state, when the target turning angle δ* becomes zero and the disturbance does not occur, since the target turning angle δ* is directly supplied to the turning angle deviation calculator 61 shown in FIG. 11, the straightness is secured by the actuator controller 54 as described above.

In the process of FIG. 17, the process of step S25 corresponds to the target turning angle calculator 51, the process of step S26 corresponds to the straightness complementing section 55a, the processes of the steps S25 to S28 correspond to the straightness securing section 55, the processes of steps S22 to S24 and S30 to S33 correspond to the delay controller 56, and the processes of steps S22 to 33 correspond to the turning responsiveness setting section 52.

(Effects of First Embodiment)

(1) A steering control device includes a steer-by-wire system that controls an actuator that detects displacement of a steering angle when a steering wheel is steered and operates a turning mechanism that turns a turning wheel separated from the steering wheel based on a detection result; a yaw angle detector that detects a yaw angle of a vehicle; a steering angle detector that detects the steering angle of the steering wheel; a turning state detector that detects a turning state of the vehicle; a braking state detector that detects a braking state of the vehicle; and a yaw angle controller that controls the actuator to suppress a yaw angle deviation before and after braking when the turning state of the vehicle is detected by the turning state detector and when the braking state of the vehicle is detected by the braking state detector.

Accordingly, it is possible to control the actuator capable of controlling the yaw angle of the vehicle with high responsiveness compared with a hydraulic pressure control so as to suppress the yaw angle deviation before and after braking during braking in the vehicle turning traveling state by the yaw angle controller. Accordingly, it is possible to enhance the responsiveness for suppressing the yaw angle deviation compared with a case where the braking pressure is controlled to suppress the yaw angle deviation. Further, it is possible to set the vehicle in the under-steering state to enhance the handling stability, and to suppress the movement amount in the vehicle width direction.

(2) When the turning state of the vehicle is detected by the turning state detector and when the braking state of the vehicle is detected by the braking state detector, the yaw angle controller calculates a target turning amount for suppressing the yaw angle deviation before and after braking and controls the actuator to provide the calculated target turning amount.

Accordingly, as the yaw angle controller calculates the target turning amount for suppressing the yaw angle deviation before and after braking during braking in the turning traveling state of the vehicle and controls the actuator to provide the calculated target turning amount, it is possible to cause a turning amount change for suppressing the yaw angle deviation. Accordingly, it is possible to enhance the responsiveness for suppressing the yaw angle deviation compared with a case where the braking pressure is controlled to suppress the yaw angle deviation. Further, it is possible set the vehicle in the under-steering state to enhance the handling stability, and to suppress the movement amount in the vehicle width direction.

Further, it is possible to change the toe angle by controlling the turning amount of the turning wheels by the yaw angle controller so as to suppress the yaw angle deviation before and after braking. Further, it is not necessary to secure a longitudinal force toe characteristic as a basic characteristic of the suspension device, to thereby provide a simple and light-weight suspension device.

(3) The yaw angle controller stops the control of the actuator, when the braking state of the vehicle is detected by the braking state detector, and when the steering angle deviation before and after braking state detected by the steering angle detector is equal to or greater than a predetermined value.

Accordingly, when the vehicle is in a turning braking state to start a yaw angle control for suppressing the yaw angle, and when the driver performs steering of the steering wheel such as counter steering, it is possible to stop the yaw angle control to preferentially perform a turning control due to the steering of the driver. Accordingly, it is possible to reliably perform steering such as counter steering of the driver.

(4) Further, in the suspension device on a front wheel side, when the steering wheel is at the neutral position, the king pin axis is set to pass through the inside of the tire contact surface. Further, the turning controller includes a straightness securing section that supports straightness of the suspension device.

Thus, it is possible to reduce the moment around the king pin axis of the suspension device, and thus, it is possible perform the turning with a small rack shaft force, and to control the direction of the vehicle wheel with a small force.

Accordingly, it is possible to enhance the turning responsiveness. At this time, by setting the caster angle to a value close to zero, it is possible to realize a suspension device with high turning responsiveness.

Further, it is possible to secure reduction in the straightness of the vehicle as the turning responsiveness of the suspension device is secured by the straightness securing section.

(5) Further, since the straightness securing section is configured by the steer-by-wire system provided with the turning actuator and the actuator controller, it is not necessary to independently provide the straightness securing section, and thus, it is possible to simplify the configuration.

In addition, as the straightness securing section, since the straightness securing section 55 of the turning responsiveness setting section 52 serves as a main straightness securing section and the actuator controller 54 serves as a sub straightness securing section, it is possible to reliably secure the straightness of the suspension device by both the straightness securing sections.

(6) When the steering wheel is steered rightward or leftward from the state where the steering wheel maintains the neutral position, as the straightness securing control of the straightness securing section is delayed by the delay control section, high turning responsiveness is secured using the turning responsiveness of the suspension device as the initial response characteristic. Then, as the turning responsiveness of the suspension device is adjusted by the straightness securing control due to the straightness securing section, it is possible to secure ideal turning responsiveness.

(7) The straightness securing section calculates the self aligning torque to secure the straightness.

Accordingly, it is possible to secure the straightness reduced when securing the high responsiveness of the suspension device using the self aligning torque by the straightness securing section, and to enhance the handling stability of the vehicle.

(8) When the steering of the steering wheel is started from the neutral position, the turning response characteristic of the suspension device is set as the initial turning response characteristic by the turning responsiveness setting section of the steer-by-wire system in an initial period when the turning starts. Then, after the initial setting time elapses, the control of the turning actuator for securing the straightness of the suspension device is started by the straightness securing section of the steer-by-wire system.

Accordingly, it is possible to secure the high turning response characteristic of the suspension device during initial turning, and after the initial setting time elapses, it is possible to perform the control of the turning actuator for securing the straightness of the suspension device by the straightness securing section, and to obtain an ideal turning response characteristic.

Second Embodiment

Next, a second embodiment of the invention will be described with reference to FIG. 18.

The second embodiment relates to a case where the start of the yaw angle control during turning braking in the above-described first embodiment is performed only at a setting vehicle velocity or greater.

Figure 18:
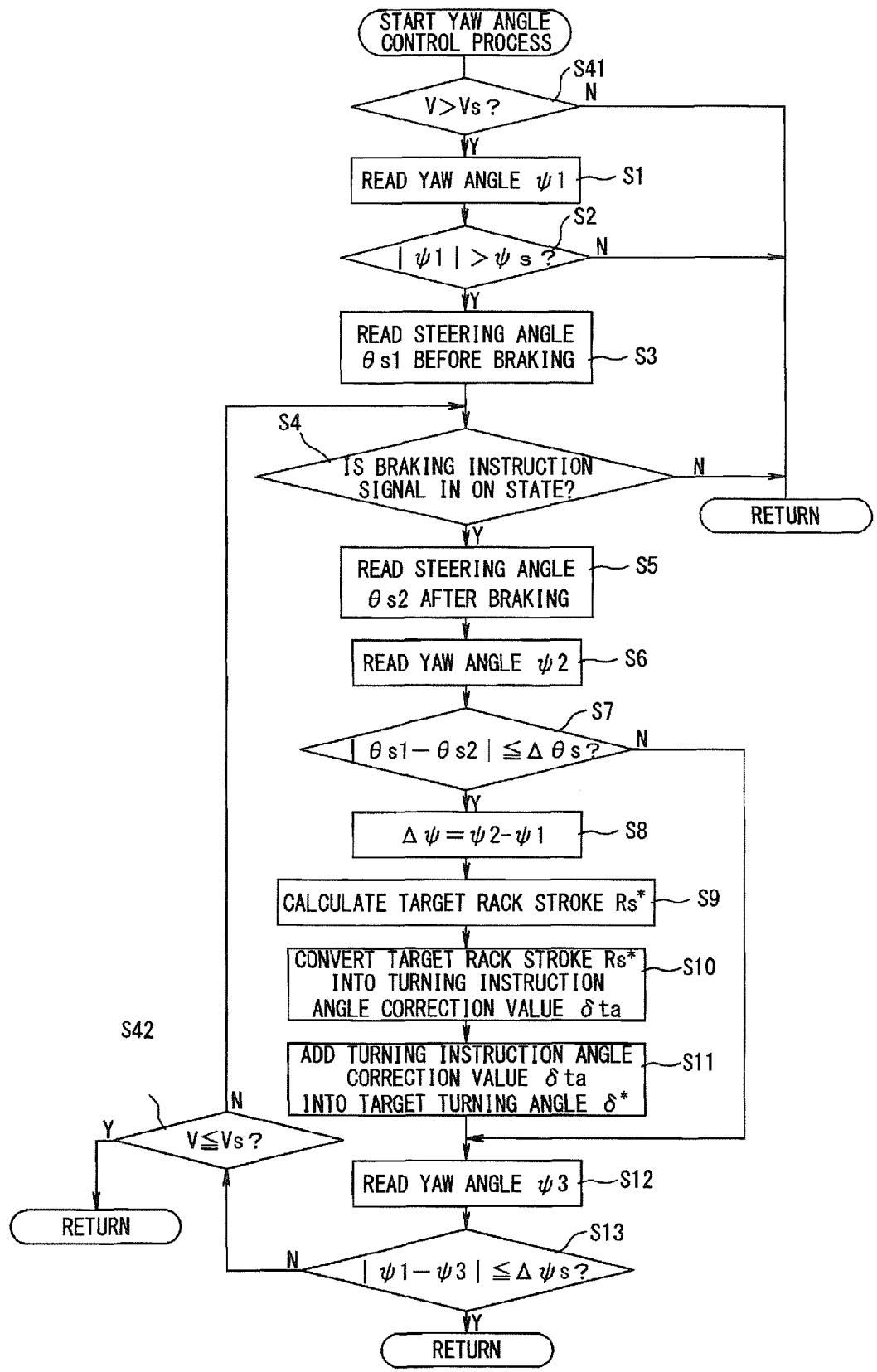
FIG. 18 is a flowchart illustrating an example of a procedure of a yaw angle control process according to a second embodiment of the invention.

That is, in the second embodiment, a yaw angle control process shown in FIG. 18 is executed by the yaw angle controller 53C. In the yaw angle control process, in the above-described process of FIG. 12, step S41 of determining whether the vehicle velocity V exceeds a setting vehicle velocity Vs (for example, 80 km/h) is inserted before step S1. Here, when the determination result of step S41 is V≤Vs, the timer interrupting process is terminated as it is to return to the predetermined main program, and when V>Vs, the procedure progresses to step S1.

Further, step S42 of determining whether the vehicle velocity V is equal to or smaller than the setting vehicle velocity Vs (for example, 80 km/h) is inserted between step S13 and step S4. Here, when the determination result of step S42 is V≤Vs, the yaw angle control process is terminated as it is, and when V>Vs, the procedure returns to step S4.

According to the second embodiment, in a state where the vehicle velocity V during traveling is equal to or smaller than the setting vehicle velocity Vs, the yaw angle control process is terminated only by repeatedly executing step S41, and the yaw angle control for controlling the turning actuator 8 is not actually executed.

If the vehicle velocity V is greater than the setting vehicle velocity from this state, the procedure progresses to step S1 from step S41 to calculate the target rack stroke Rs* for suppressing the yaw angle deviation Δψ(=ψ2−ψ1) before and after braking when the vehicle is changed from the turning state to the braking state, similar to the above-described first embodiment, controls the turning actuator 8 to suppress the yaw angle deviation Δψ based on the target rack stroke Rs*, and controls the toe angle of the turning wheels 17FR and 17FL so that an outer turning wheel is directed in the toe-out direction. Thus, it is possible to reduce the yaw angle ψ of the vehicle, and to set the steering characteristic of the vehicle to the under-steering characteristic to reduce the movement amount of the vehicle in the vehicle width direction during turning braking, thereby enhancing the handling stability. In this case, similarly, since the rack stroke of the rack shaft 14 is controlled by the steering actuator 8, it is possible to perform the yaw angle control with high responsiveness.

Further, if the vehicle velocity V is equal to or smaller than the setting vehicle velocity Vs or the braking state is eliminated while the yaw angle control is being executed, the yaw angle control is terminated.

(Effects of Second Embodiment)

(1) In the second embodiment, a vehicle velocity detector that detects a vehicle velocity of the vehicle is provided, and the yaw angle controller is operated when the vehicle velocity is greater than a predetermined vehicle velocity.

Accordingly, since the yaw angle control during turning braking is executed only in a high vehicle velocity traveling state where the vehicle velocity V exceeds the setting vehicle velocity Vs, and in low and medium vehicle velocity traveling areas, the yaw angle deviation before and after braking is small and the influence on the traveling of the vehicle due to the braking during turning traveling is small, it is possible to omit the yaw angle control in the low and medium vehicle velocity traveling areas. Thus, it is possible to reduce the control frequency of the turning actuator 8, and to prolong the life span for long-time use.

Third Embodiment

Next, a third embodiment of the invention will be described with reference to FIGS. 19 and 20.

In the third embodiment, the yaw angle control is executed when the vehicle velocity is greater than a setting vehicle velocity, similar to the second embodiment, and the target rack stroke calculation method is changed.

Figure 19:
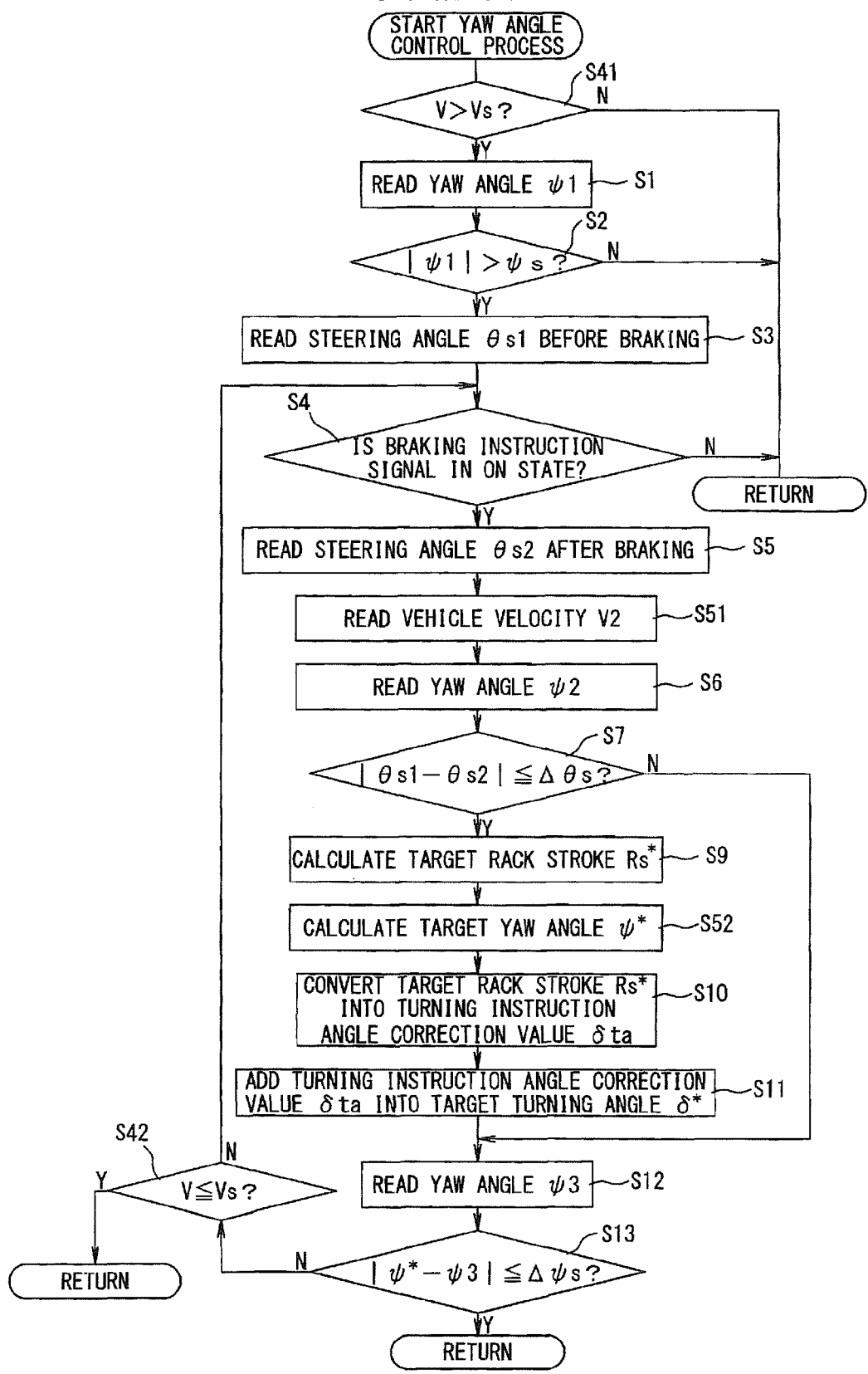
FIG. 19 is a flowchart illustrating an example of a procedure of a yaw angle control process according to a third embodiment of the invention.

That is, in the third embodiment, the yaw angle control process executed by the yaw angle controller 53C is changed as shown in FIG. 19. The yaw angle control process is different from the process of FIG. 18 relating to the second embodiment in that step S51 of reading a vehicle velocity V2 is inserted between step S5 and step S6, and in that step S8 is not performed. Further, in the third embodiment, step S52 of calculating a target yaw angle ψ* with reference to a target value calculation map shown in FIG. 20 is inserted between step S9 and step S10. Further, in the third embodiment, the process of step S13 is changed so that a yaw angle ψ3 is read in the process of step S12 and it is determined whether an absolute value of a yaw angle deviation obtained by subtracting the yaw angle ψ3 from the target yaw angle ψ* is equal to or smaller than a yaw angle deviation setting value Δψs.

Figure 20:
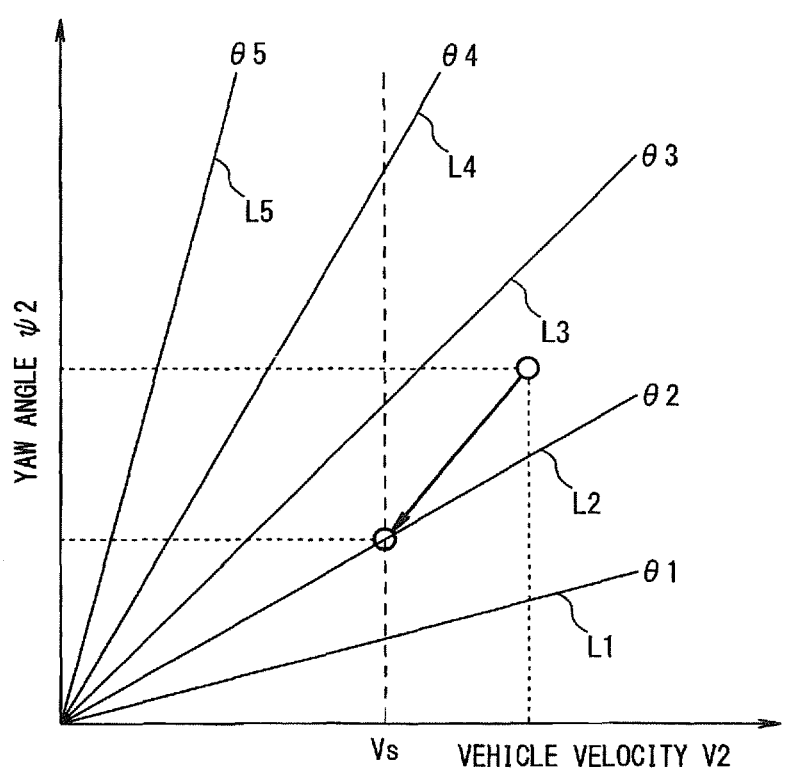
FIG. 20 is a characteristic line map illustrating a target yaw angle calculation map illustrating the relationship between a vehicle velocity and a yaw angle, in which a steering angle is used as a parameter.

Here, in the target yaw angle calculation map in FIG. 20, a transverse axis represents the vehicle velocity V2, and a longitudinal axis represents the yaw angle ψ2, in which plural characteristic lines L1 to L5 using plural steering angles θ as parameters are set.

Further, in the calculation process of the target rack stroke Rs* in step S9, a closest characteristic line Li (i=1 to 5) where the yaw angle ψ2 is smaller than a current yaw angle is selected with reference to the target value calculation map shown in FIG. 20 based on the vehicle velocity V2 and the yaw angle ψ2, and a rack stroke corresponding to a steering angle deviation Δθ2 between a steering angle θi of the characteristic line Li and a steering angle θs2 after braking read in step S5 is set as the target rack stroke Rs*.

Further, in the calculation process of the target yaw angle ψ* in step S52, a yaw angle of the characteristic line Li selected in step S9 at the setting vehicle velocity Vs (for example, 80 km/h) is set as the target yaw angle ψ*.

According to the third embodiment, similar to the second embodiment, when the vehicle velocity V is equal to or smaller than the setting vehicle velocity Vs, the process of step S41 is merely repeated every predetermined time, and the yaw angle control for controlling the turning actuator 8 is not executed.

Further, in the turning state where the vehicle velocity V exceeds the setting vehicle velocity Vs and the yaw angle ψ1 exceeds the setting value NA, and during turning braking when the vehicle is in the braking state and the braking instruction signal is in the ON state, the procedure progresses to step S5 from step S4 to execute a substantial yaw angle control.

Here, in the third embodiment, when an absolute value |θs1−θs2| of the steering angle deviation before and after braking is equal to or smaller than the setting value Δθs, the closest characteristic line L2 where the yaw angle is smaller than the current yaw angle ψ2 is selected with reference to the target value calculation map shown in FIG. 20 based on the vehicle velocity V2 read in step S51 and the yaw angle ψ2 read in step S6 after braking. Further, the steering angle deviation Δθ is calculated by subtracting the steering angle θ2 of the selected characteristic line L2 from the steering angle θs2 after braking read in step S5, and a stroke corresponding to the steering angle deviation Δθ is calculated as the target rack stroke Rs* (step S9).

Then, a yaw angle at the setting vehicle velocity Vs is calculated as the target yaw angle ψ* based on the selected characteristic line L2 (step S52).

Further, the target rack stroke Rs* is converted into the turning correction value δta corresponding to the target turning angle δ* (step S10), and the turning correction value δta is added to the target turning angle δ* to be supplied to the turning actuator controller 54, and thus, the turning actuator 8 is drive-controlled so that the rack shaft 14 moves by the target rack stroke. Thus, the toe angle is generated to the turning wheels 17FR and 17FL so that the outer turning wheel is directed in the toe-out direction.

Then, a yaw angle NA is read (step S12), and it is determined whether an absolute value of a value obtained by subtracting the read yaw angle ψ4 from the target yaw angle ψ3 is equal to or smaller than the yaw angle deviation setting value Δψs (step S13). When the determination result is |ψ*−ψ3|≤Δψs, it is determined that the yaw angle deviation is eliminated, and the yaw angle control process is terminated.

On the other hand, when the determination result of step S13 is |ψ*−ψ3|>Δψs, it is determined that the yaw angle deviation is not eliminated, and the procedure progresses to step S42. Here, when the vehicle velocity V is equal to or smaller than the setting vehicle velocity Vs, the yaw angle control process is terminated, and when the vehicle velocity V exceeds the setting vehicle velocity Vs, the procedure returns to step S4 to determine whether the braking instruction signal continues the ON state.

Accordingly, in the third embodiment, if the vehicle enters the turning braking state in a state where the vehicle velocity V exceeds the setting vehicle velocity Vs, the steering angle θs2 after braking, the vehicle velocity V2, and the yaw angle ψ2 are read. Further, in a state where the steering of the driver is not present, i.e., in a state where the absolute value |θs1−θs2| of the steering angle deviation before and after braking is equal to or smaller than the setting value Δθs, the characteristic line Li having a small yaw angle is selected with reference to the target value calculation map shown in FIG. 20 based on the vehicle velocity V2 and the yaw angle ψ2. The yaw angle in the selected characteristic line Li at the setting vehicle velocity Vs is set as the target yaw angle ψ*, and the absolute value |ψ*−ψ3| of the deviation between the target yaw angle ψ* and the actual yaw angle ψ3 is controlled to be equal to or smaller than the setting value Δψs.

(Effects of Third Embodiment)

(1) A steering control device includes a steer-by-wire system that controls an actuator that detects displacement of a steering angle when a steering wheel is steered and operates a turning mechanism that turns a turning wheel separated from the steering wheel based on a detection result; a yaw angle detector that detects a yaw angle of a vehicle; a steering angle detector that detects the steering angle of the steering wheel; a vehicle velocity detector that detects a vehicle velocity of the vehicle; a turning state detector that detects a turning state of the vehicle based on the yaw angle of the vehicle; a braking state detector that detects a braking state of the vehicle; and a yaw angle controller that calculates, when the turning state of the vehicle is detected by the turning state detector and when the braking state of the vehicle is detected by the braking state detector, based on a vehicle velocity after braking and a yaw angle after braking after the braking state is detected, a target yaw angle for bringing the yaw angle after braking close to the yaw angle before braking based on plural steering angle characteristics in which the steering angle is used as a parameter, and controls the actuator so that the yaw angle after braking becomes the target yaw angle.

Accordingly, since the target yaw angle for bringing the yaw angle after braking close to the yaw angle before braking is calculated based on the vehicle velocity after braking and the yaw angle after braking and based on the plural steering angle characteristics in which the steering angle is used as the parameter, it is possible to reduce the yaw angle, and to secure the handling stability of the vehicle.

(2) When the vehicle is in the turning braking state in a state where the vehicle velocity V exceeds the setting vehicle velocity Vs, the yaw angle controller reads the vehicle velocity V2 and the yaw angle ψ2 to selects the closest characteristic line where the yaw angle is smaller than the yaw angle ψ2 with reference to the target yaw angle calculation map based on the vehicle velocity V2 and the yaw angle ψ2, and sets the yaw angle of the selected characteristic line at the setting vehicle velocity Vs to the target yaw angle ψ*. Accordingly, similar to the above-described second embodiment, in the low and medium vehicle velocity traveling areas, the yaw angle deviation before and after braking becomes small, and the influence on the traveling of the vehicle due to the braking during turning traveling becomes small, and thus, it is possible to omit the yaw angle control in the low and medium vehicle velocity traveling areas. Thus, it is possible to reduce the control frequency of the turning actuator 8, and to prolong the life span for long-time use.

(3) Further, the target yaw angle ψ* is calculated with reference to the target value calculation map based on the vehicle velocity V2 and the yaw angle ψ2 after the braking is started, the rack stroke is adjusted so that the actual yaw angle ψ3 comes close to the target yaw angle ψ* to perform the yaw angle control.

Accordingly, compared with a case where the braking pressure is controlled to suppress the yaw angle deviation, it is possible to enhance the responsiveness for suppressing the yaw angle deviation, and to set the vehicle in the understeering state to enhance the handling stability, to thereby suppress the movement amount in the vehicle width direction. Further, since the toe angle of the turning wheels is controlled by the yaw angle controller so as to suppress the yaw angle deviation before and after braking, it is not necessary to secure a longitudinal force toe characteristic as a basic characteristic of the suspension device, to thereby provide a simple and light-weight suspension device.

Fourth Embodiment

Next, a fourth embodiment of the steering control device according to the invention will be described with reference to FIGS. 21 and 22.

Figure 21:
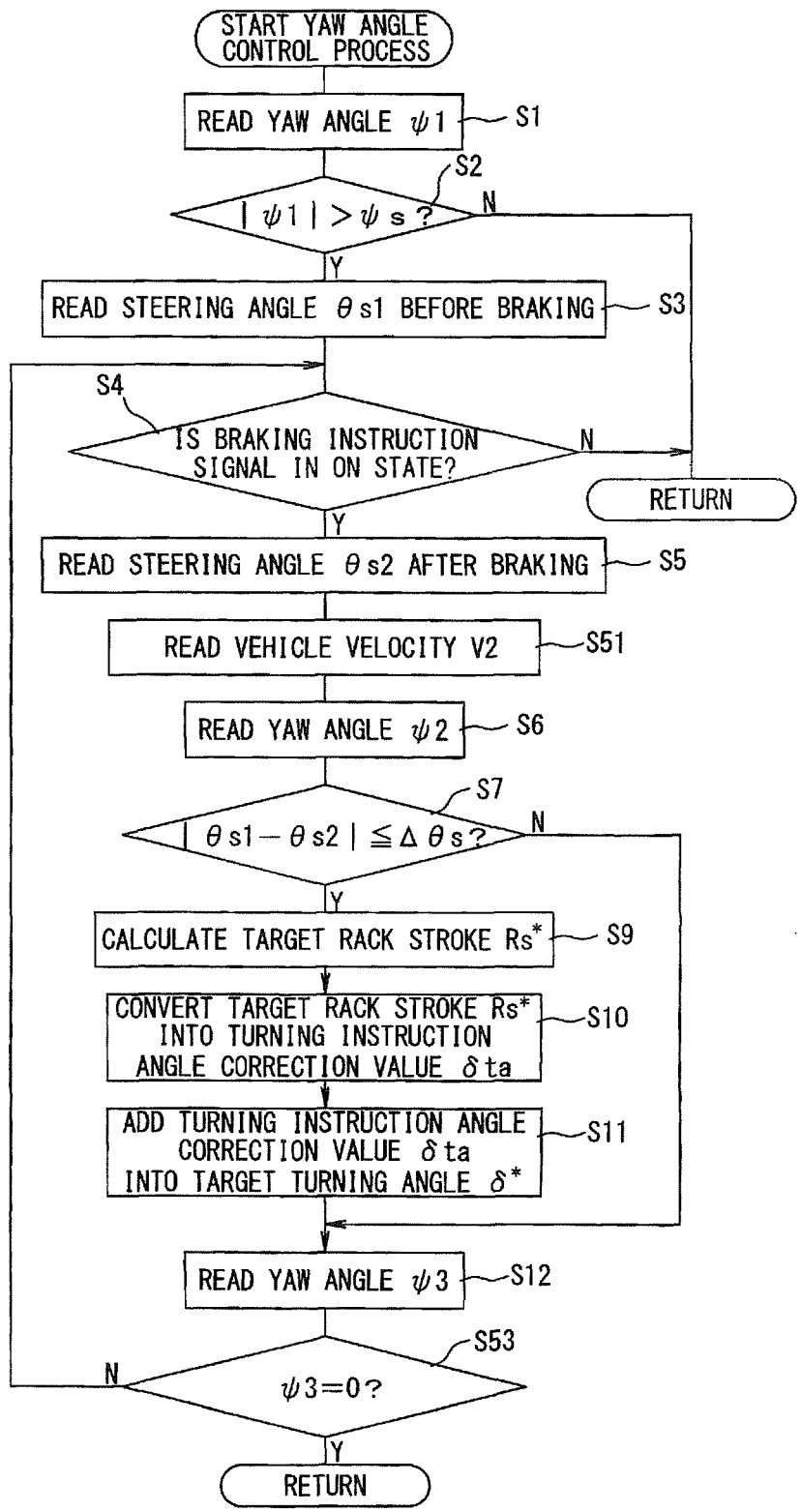
FIG. 21 is a flowchart illustrating an example of a procedure of a yaw angle control process according to a fourth embodiment of the invention.

In the fourth embodiment, the yaw angle control process executed by the yaw angle controller 53C is changed as shown in FIG. 21. In this yaw angle control process, step S51 of reading a current vehicle velocity V2 is inserted between step S5 and step S6, in the process of FIG. 12 in the above-described first embodiment, and steps S8 and S13 are not performed.

Figure 22:
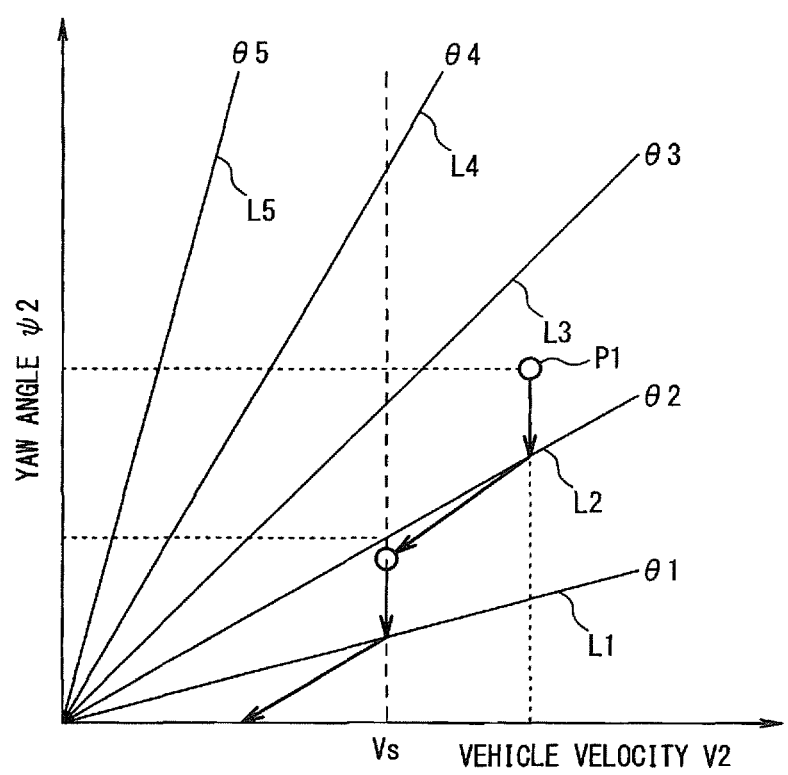
FIG. 22 is a characteristic line map illustrating a rack stroke calculation map illustrating the relationship between a vehicle velocity and a yaw angle.

Further, in the calculation process of the target rack stroke Rs* in step S9, the closest characteristic line Li (i=1 to 5) where the yaw angle ψ2 is smaller than a current yaw angle is selected with reference to a target value calculation map shown in FIG. 22 based on the vehicle velocity V2 and the yaw angle ψ2, and a rack stroke corresponding to a steering angle deviation Δθ2 between a steering angle θi of the selected characteristic line Li and the steering angle θs2 after braking read in step S5 is set as the target rack stroke Rs*.

Further, step S53 of determining whether the yaw angle ψ3 read in step S12 is "0" is inserted after step S12. Here, when the determination result of step S53 is ψ3=0, the yaw angle control process is terminated to return to the predetermined main program, and when ψ3≠0, the procedure returns to step S4.

According to the fourth embodiment, similar to the first embodiment, when the vehicle is changed from the turning state to the braking state, a substantial yaw angle control is performed. In this yaw angle control, the steering angle θs2 after braking is read (step S5), the vehicle velocity V2 is read (step S6), and then, the yaw angle ψ2 is read (step S7).

Further, when the absolute value |θs1−θs2| of the steering angle deviation before and after braking is equal to or smaller than a setting value Δθs, that is, when the steering is not performed by the driver, the rack stroke control is performed. In the rack stroke control, first, the target steering angle θ* is calculated with reference to the target value calculation map having the same configuration as that of the target value calculation map in the above-described third embodiment shown in FIG. 22 based on the vehicle velocity V2 and the yaw angle ψ2. In the calculation of the target steering angle θ*, a characteristic line Li where the yaw angle at the current vehicle velocity V2 is small with reference to a point P1 indicated by the vehicle velocity V2 and the yaw angle ψ2 in FIG. 22 is selected, and the steering angle θi set in the characteristic line Li is set as the target steering angle θ*.

Further, the target steering angle θ* is subtracted from the steering angle θs2 after braking read in step S5 to calculate the steering angle deviation Δδ, and a rack stroke corresponding to the calculated steering angle deviation Δθ is calculated as the target rack stroke Rs* (step S9).

Further, the target rack stroke Rs* is converted into the turning correction value δta (step S10), and the converted turning correction value δta is added to the target turning angle δ* calculated by the target turning angle calculator 51 to calculate the target turning angle correction value δ*a, and the target turning angle correction value δ*a is output to the actuator controller 54.

Further, the yaw angle control is continued until the yaw angle ψ3 becomes "0" or the braking instruction signal becomes the OFF state.

Accordingly, as indicated by a broken line in FIG. 22, the yaw angle control is performed until the steering angle θs2 matches the target steering angle θ2 at the point P1, and then, the yaw angle ψ2 is reduced according to reduction of the vehicle velocity V2. In this state, as the target rack stroke calculation is performed again, the yaw angle ψ2 is reduced to a value indicated by the characteristic line Lθ1.

Then, the yaw angle control is repeated until the yaw angle ψ3 becomes "0" or the braking instruction signal becomes the OFF state.

(Effects of Fourth Embodiment)

(1) According to the fourth embodiment, the target steering angle θ* is calculated based on the vehicle velocity V2 and the yaw angle ψ2 after braking with reference to the target steering angle calculation map which is a target value calculation map having the plural steering angle characteristic lines where the steering angle is used as a parameter and indicating the relationship between the vehicle velocity and the yaw angle, the target rack stroke Rs* is calculated based on the target steering angle θ* and the steering angle θs2 after braking, and the yaw angle control for controlling the turning wheels is performed based on the target rack stroke Rs*.

Thus, similar to the above-described third embodiment, since the target rack stroke is calculated based on the vehicle velocity after braking and the yaw angle after braking of the vehicle with reference to the target value calculation map, it is possible to calculate a steering angle for reducing the yaw angle to calculate the target rack stroke, and to reduce the yaw angle during turning braking to set the vehicle in the under-steering state. Thus, it is possible to enhance the handling stability of the vehicle, and to suppress the movement amount in the vehicle width direction of the vehicle.

(2) Further, the yaw angle control is continued until the detected yaw angle becomes "0".

Thus, since the yaw angle control of the turning wheels is performed so that the yaw angle becomes small, it is possible to reliably suppress the movement of the vehicle in the vehicle width direction during turning braking, and to control the vehicle to have the under-steering tendency to secure the traveling stability.

Fifth Embodiment

Next, a fifth embodiment of the steering control device according to the embodiment will be described with reference to FIGS. 23 and 24.

The fifth embodiment is different from the above-described fourth embodiment in that when the turning braking state is continued, the yaw angle control is continued until the vehicle velocity becomes "0", i.e., until the vehicle stops even after the yaw angle becomes "0".

Figure 23:
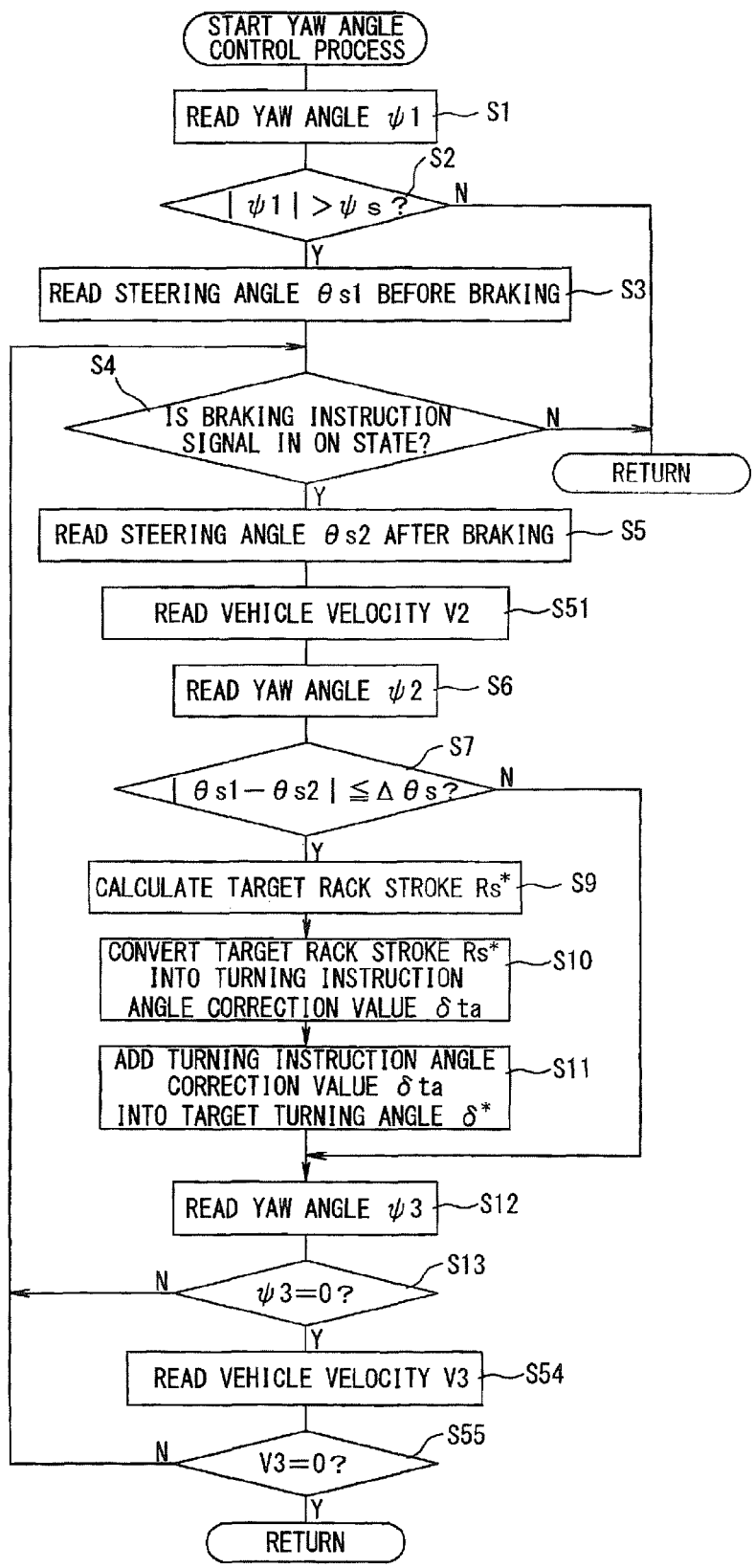
FIG. 23 is a flowchart illustrating an example of a procedure of a yaw angle control process according to a fifth embodiment of the invention.

That is, in the fifth embodiment, as shown in FIG. 23, the process of FIG. 21 in the above-described fourth embodiment is changed so that when the determination result of step S53 indicates that the yaw angle ψ3 is "0", the procedure progresses to step S54 to read the vehicle velocity V3, and then, progresses to step S55 to determine whether the vehicle velocity V3 is "0". When the determination result of step S55 is V3>0, the procedure returns to step S4, and when V3=0, the timer interrupting process is terminated to return to the predetermined main program.

Figure 24:
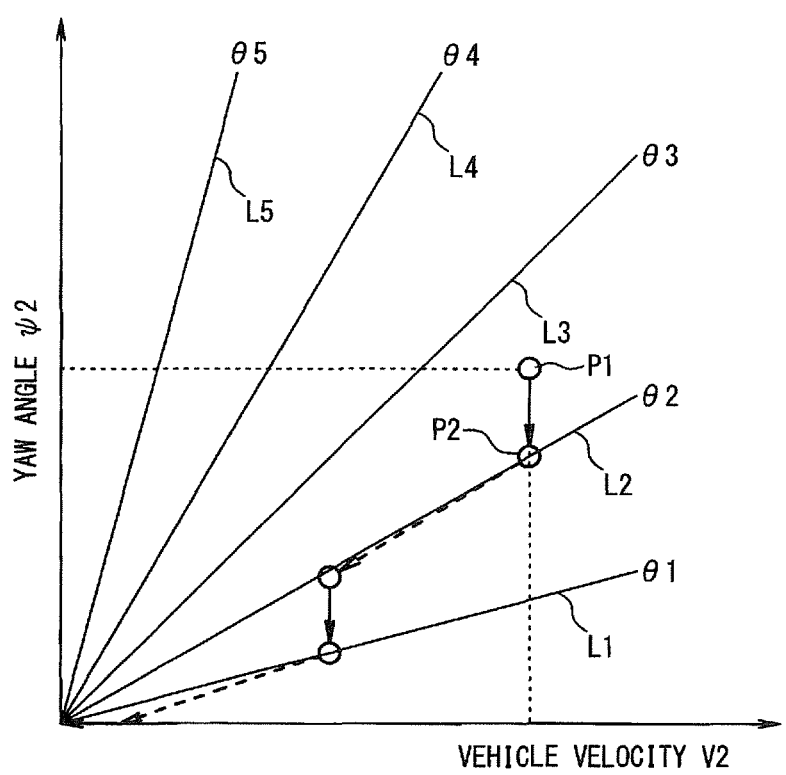
FIG. 24 is a characteristic line map illustrating a rack stroke calculation map illustrating the relationship between a vehicle velocity and a yaw angle.

According to the fifth embodiment, similar to the above-described fourth embodiment, when the driver does not perform the steering during turning braking, in the target rack stroke calculation process of step S9, a closest steering angle characteristic line where the yaw angle is small with reference to coordinates indicated by the vehicle velocity V2 and the yaw angle ψ2, for example, the steering angle characteristic line L2 indicating the steering angle θ2 is selected based on the vehicle velocity V2 and the yaw angle ψ2 with reference to the same target value calculation map as the target value calculation map in the above-described fourth embodiment shown in FIG. 24, and the steering angle θ2 set in the selected steering angle characteristic line L1 is subtracted from the steering angle θs2 after braking to calculate the steering angle deviation Δθ (=θs2−θ2). Further, the target rack stroke Rs* is calculated based on the calculated steering angle deviation Δθ.

Then, the calculated target rack stroke Rs* is converted into the turning correction value δta (step S10), and then, the converted turning correction value δta is added to the target turning angle δ* calculated by the target turning angle calculator 51 to calculate the target turning angle correction value δa*. As the target turning angle correction value δa* is output to the actuator controller 54, the turning motor 8a is controlled to move the rack shaft 14, and thus, the yaw angle control for turning the turning wheels 17FR and 17FL is performed to control the yaw angle.

When the braking state is continued, the yaw angle control is continued until the yaw angle ψ3 becomes "0" as indicated by a broken line in FIG. 24. Here, if the yaw angle ψ3 reaches "0", the vehicle velocity V3 is read (step S54), and the yaw angle control is continued until the vehicle velocity V3 becomes "0", i.e., until the vehicle stops.

(Effects of Fifth Embodiment)

(1) According to the fifth embodiment, when the vehicle is in the turning braking state and the yaw angle control for suppressing the yaw angle is started, the yaw angle control is continued until the yaw angle becomes "0" and the vehicle velocity becomes "0". Thus, in the fifth embodiment, in addition to the effects of the above-described fourth embodiment, since when the braking state is continued, the yaw angle control for setting the yaw angle to "0" is continued until the vehicle stops, it is possible to stop the vehicle in a state where the traveling stability of the vehicle is secured.

(Application Example of Actuator of the Invention)

Figure 25:
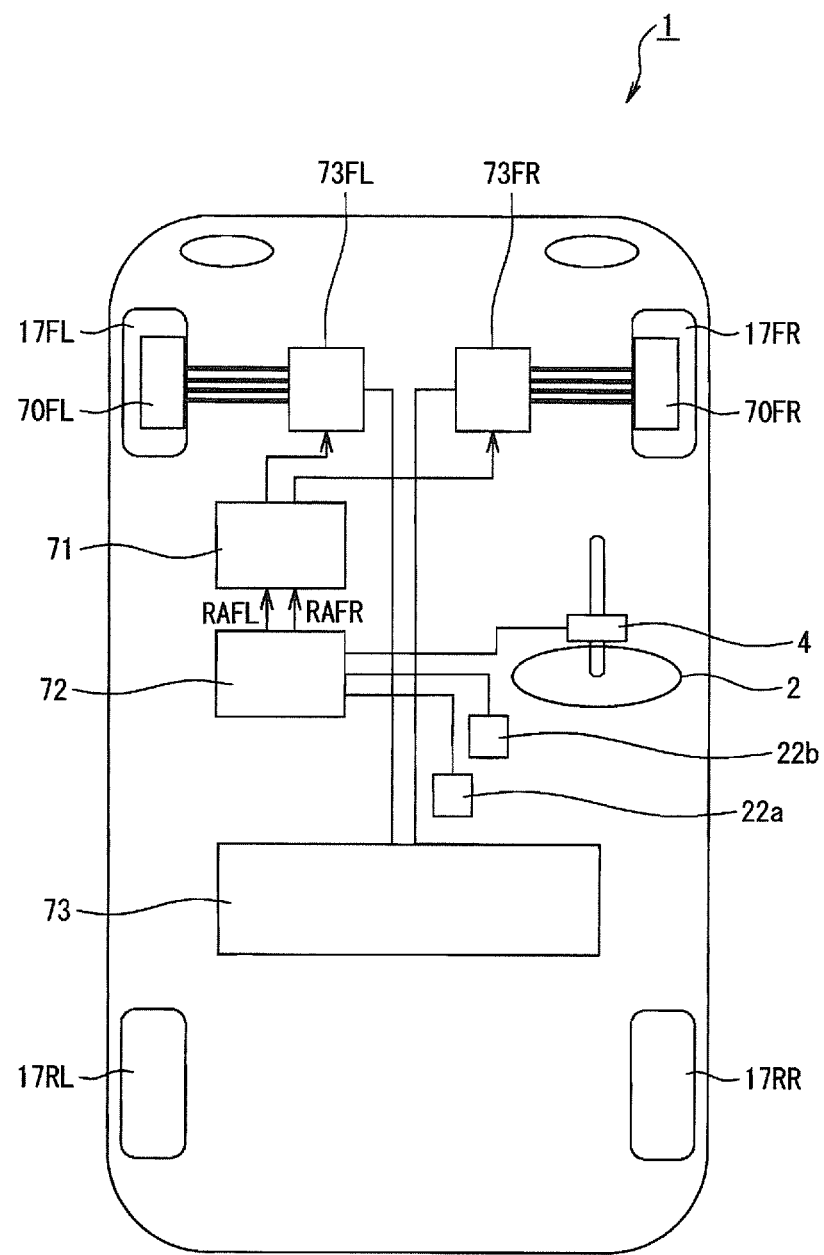
FIG. 25 is a block diagram illustrating another example of an actuator according to the invention.

In the above-described embodiment, a case where the turning actuator 8 that drives the rack shaft 14 is used as the actuator is described. However, the invention is not limited to this configuration, and as shown in FIG. 25, when in-wheel motors 70FR and 70FL that directly drive the front wheels 17FR and 17FL as drive wheels are provided, the in-wheel motors 70FR and 70FL are used as a yaw angle control actuator for performing the steering by a speed difference of the right and left wheels.

Further, with respect to a drive unit 71 that rotationally drives the in-wheel motors 70FR and 70FL, a target yaw angle ψ* is calculated by a yaw angle controller 72 during turning acceleration, similar to the above-described yaw angle controller 53C. In addition, speed correction values RAFR and RAFL for increasing the speed of the in-wheel motor 70FR (or 70FL) on an outer turning wheel side and decreasing the speed of the in-wheel motor (70FL (or 70FR)) on an inner turning wheel side so that the current yaw angle ψ3 reaches the calculated target yaw angle ψ* are calculated.

The speed correction values RAFR and RAFL are supplied to the drive unit 71, and the drive unit 71 corrects rotation instruction values. Further, inverter drive signals based on the corrected rotation instruction values are supplied to inverters 74FR and 74FL that are supplied with electric power from a DC power source 73. The yaw angle control for steering is performed by causing the speeds of the in-wheel motors 70FR and 70FL to increase on the outer turning wheel side and to decrease on the inner turning wheel side using the inverters 74FR and 74FL, so that the steering characteristic of the vehicle may show an oversteering tendency.

(Effects of Application Example)

In this way, by applying the yaw angle control actuator based on the in-wheel motors that directly drive the drive wheels as the actuator, it is possible to suppress the response delay caused when using the hydraulic pressure, and to eliminate the toe-angle change in the outward turning direction during turning acceleration by controlling the yaw angle without controlling the turning angle.

(Modification Example of Turning Mechanism)

As the turning mechanism that turns the turning wheels, a ball screw mechanism may be applied instead of the rack-and-pinion mechanism. In this case, a ball nut may be rotationally driven by the turning actuator 8. In this way, by applying the ball screw mechanism, it is possible to control the turning angle with high accuracy.

Further, as the turning mechanism, a turning mechanism of a different type may be applied instead of the pinion-and-rack mechanism or the ball screw mechanism.

(Application Example of Yaw Angle Controller of the Invention)

In the above-described embodiment, a case where the target rack stroke and the target yaw angle are calculated with reference to the target yaw angle calculation map is described. However, the invention is not limited thereto, and instead of the reference to the target yaw angle calculation map, plural steering angle characteristic lines where the steering angle is used as a parameter may be expressed as a function of the vehicle velocity and the yaw angle, and a steering angle characteristic line where the yaw angle becomes larger than a yaw angle after acceleration at a vehicle velocity after acceleration may be selected based on the vehicle velocity after acceleration and the yaw angle after acceleration.

In this way, by expressing the steering characteristic line as the function of the vehicle velocity and the yaw angle, it is possible to select the steering angle characteristic line through an operation without using the target yaw angle calculation map.

In the above-described embodiment, the number of steering angle characteristic lines is not limited to four, and may be set to an arbitrary number.

(Application Example of Suspension Applied to the Invention)

Figure 26:
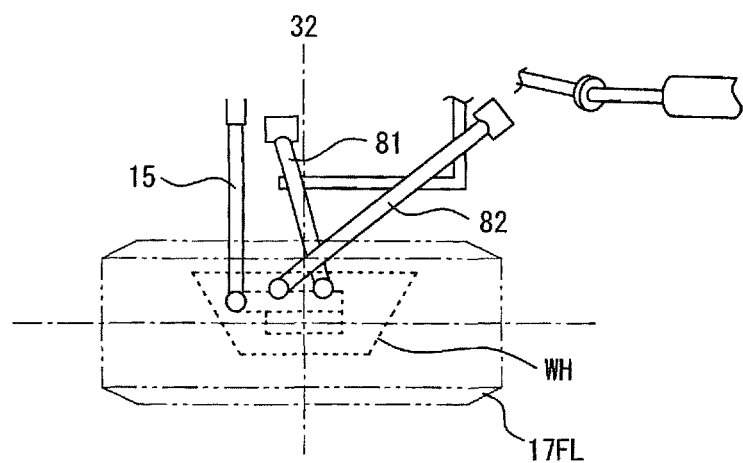
FIG. 26 is a plan view schematically illustrating another example of a suspension device which can be applied to the invention.
Figure 27:
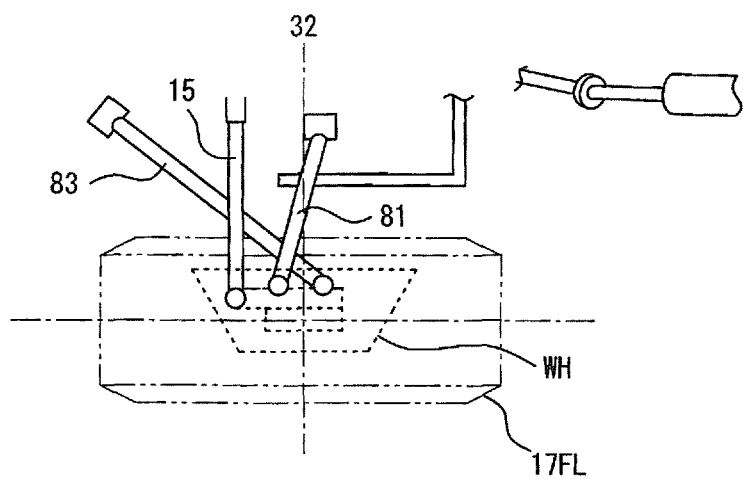
FIG. 27 is a plan view schematically illustrating still another example of a suspension device which can be applied to the invention.

In the above-described embodiment, a case where the lower link of the suspension device is configured by the first link 37 and the second link 38 that do not intersect each other is described. However, the suspension device is not limited to such a configuration, and any configuration in which the king pin axis is set to pass through the inside of the tire contact surface so that the turning force can be reduced may be used. Thus, the lower link structure may be configured by a transverse link 81 and a compression link 82 that intersect each other, as schematically shown in FIG. 26. Further, the lower link structure may be also configured by the transverse link 81 and a tension link 83 that intersect each other, as schematically shown in FIG. 27.

(Effects of Application Example)

In this way, by configuring the lower link structure using the first link and the second link that intersect each other in a planar view, the lower pivot point that forms the king pin axis may be set at an intersection position of both the links. Thus, it is possible to make the position of the lower pivot point close to the inside of the vehicle body of the turning wheels. Accordingly, it is easy to set the king pin axis to pass through the inside of the tire contact surface.

Further, the suspension device 1B is not limited to the above-described configuration, and suspension devices having various different configurations may be applied.

In addition, the turning responsiveness setting section 52 may not be provided according to the configuration of the suspension device 1B.

(Application Example 2 of the Invention)

In the above-described first to fifth embodiments, a case where the invention is applied to the steer-by-wire system SBW is described, but the invention is not limited thereto. When a wheel-in motor is applied as the actuator, the invention may be applied to a normal electric power steering apparatus.

Sixth Embodiment

Next, a sixth embodiment of the invention will be described with reference to FIGS. 28 to 32.

In the sixth embodiment, the yaw angle control is performed during turning acceleration.

That is, in the related art technique disclosed in the above-mentioned Patent Document 1, the behavior of a vehicle during turning acceleration is stabilized by controlling a braking force of each wheel by a steer-by-wire control system, but it is necessary to control a braking pressure of an actuator that generates the braking force in order to stabilize the behavior of the vehicle by controlling the braking force of each wheel, which causes response delay in a pressure control system.

Further, in the related art technique disclosed in JP 9-86203 A (hereinafter, referred to as Patent Document 2), since a hydraulic clutch inserted between drive wheels is controlled during turning acceleration to give a driving force to an outer turning wheel, and to give a braking force to an inner turning wheel, response delay is caused in a pressure control system, similar to Patent Document 1.

Thus, in the sixth embodiment, it is desirable to appropriately stabilize the behavior of the vehicle during turning acceleration of the vehicle by suppressing the response delay.

In order to solve the above problem, the steering control device according to the present embodiment calculates a target control amount of an actuator based on a vehicle velocity and a yaw angle in acceleration during turning traveling, and performs a control so that a control amount of an actuator becomes the target control amount to increase the yaw angle during turning acceleration. Accordingly, the vehicle is over-steered due to the yaw angle change of the vehicle, to thereby make it possible to enhance a response characteristic for stabilizing the behavior of the vehicle.

With such a configuration, since the yaw angle in acceleration during turning acceleration of the vehicle in the steer-by-wire system increases by performing the yaw angle control of the vehicle by the actuator that turns the turning wheels, it is possible to suppress the response delay, and to rapidly and appropriately stabilize the behavior of the vehicle.

Figure 28:
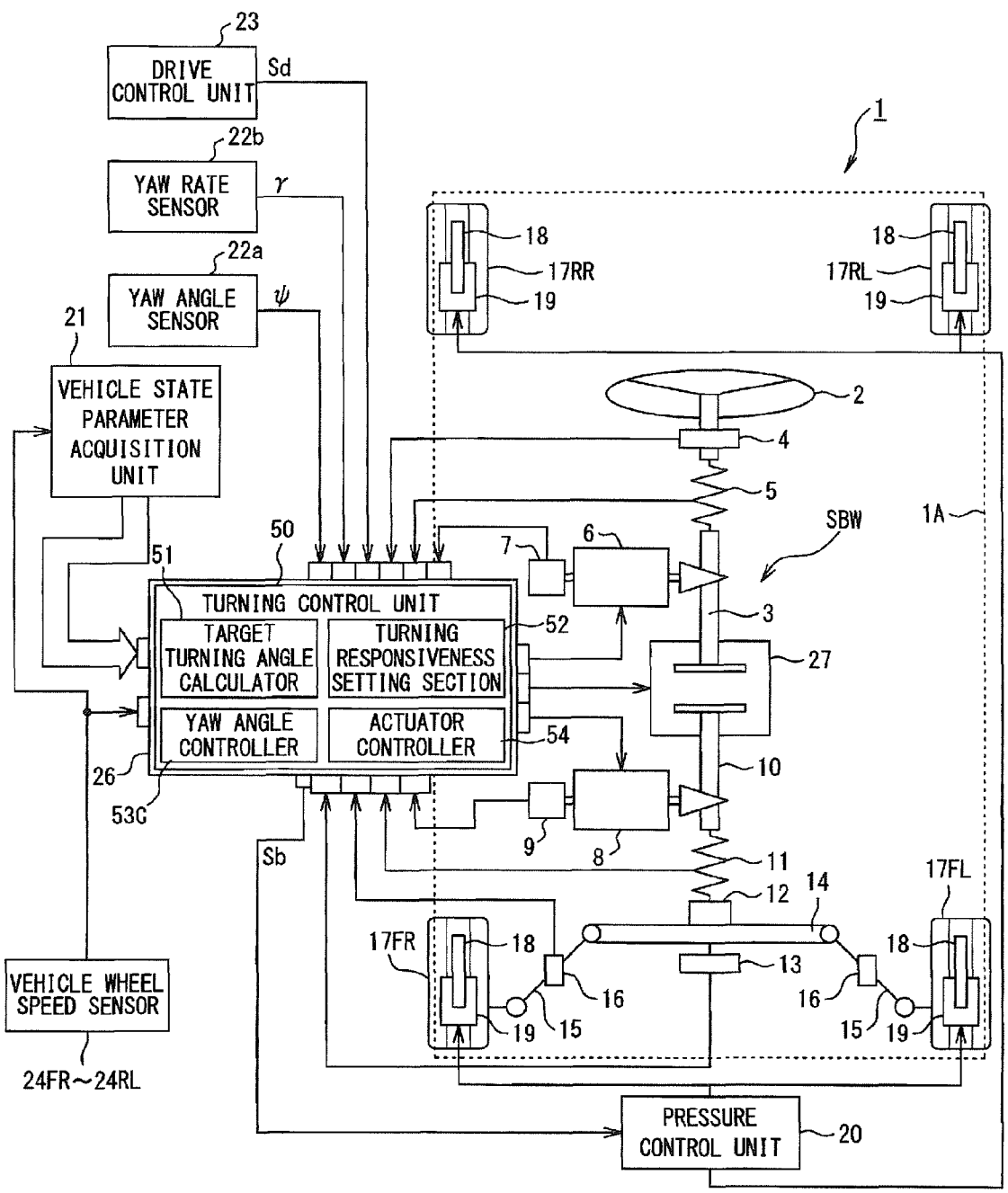
FIG. 28 is a diagram schematically illustrating an automobile according to a sixth embodiment of the invention.

Accordingly, in the sixth embodiment, the same suspension device as the suspension device described with reference to FIGS. 2 to 10 relating to the above-described first embodiment is applied as the suspension device, but as an overall configuration, as shown in FIG. 28, in the configuration of FIG. 1 relating to the first embodiment, a drive control unit 23 from which an acceleration instruction signal Sd is output is additionally provided, and the acceleration instruction signal Sd output from the drive control unit 23 is input to the control/drive circuit unit 26.

Figure 29:
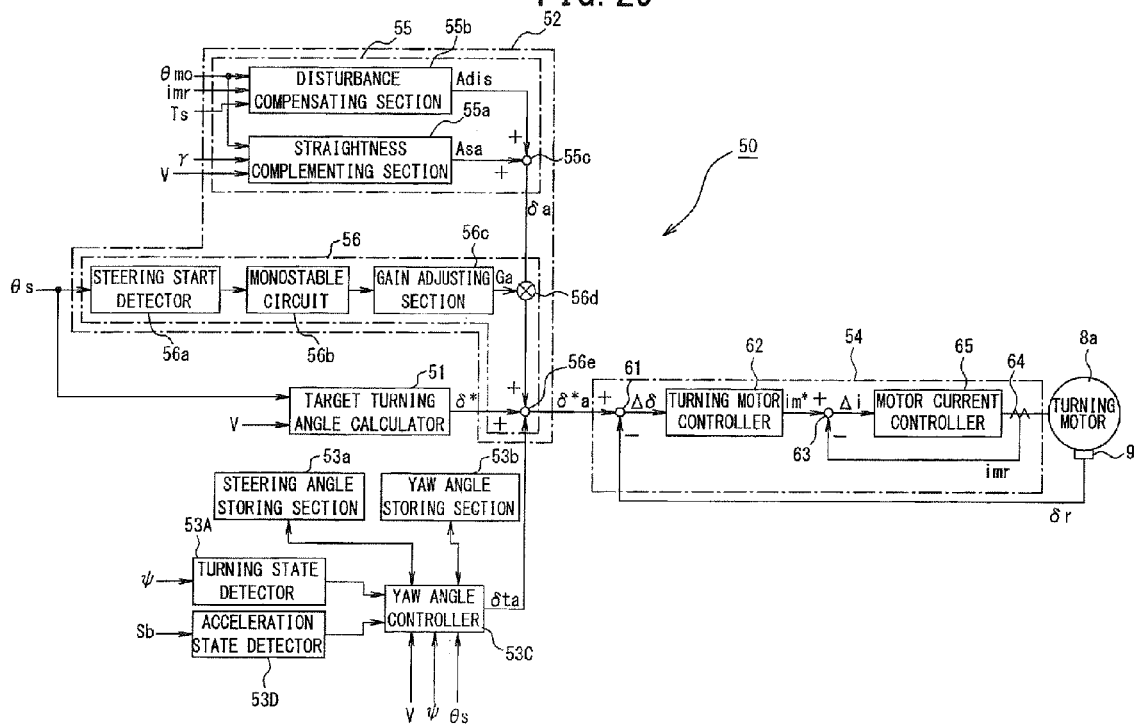
FIG. 29 is a block diagram illustrating a specific configuration of a yaw angle controller according to the sixth embodiment of the invention.

Further, as shown in FIG. 29, an acceleration state detector 53D instead of the braking state detector 53B is connected to the yaw angle controller 53C in the above-described first embodiment. The acceleration state detector 53D receives an input of the acceleration instruction signal Sd input to the control/drive circuit unit 26 from the drive control unit 23, and determines that the vehicle is in an acceleration state when the acceleration instruction signal Sd is in an ON state.

Further, the yaw angle controller 53C receives inputs of the determination results of the turning state detector 53A and the acceleration state detector 53D, and receives inputs of the yaw angle ψ detected by the yaw angle sensor 22a, the steering angle θs detected by the steering angle sensor 4, and the vehicle velocity V calculated by the vehicle state parameter acquisition unit 21. When the vehicle enters the acceleration state during turning traveling of the vehicle, the yaw angle controller 53C executes the yaw angle control process of controlling the turning actuator 8 to eliminate the toe angle change toward the outside of the turning.

Figure 30:
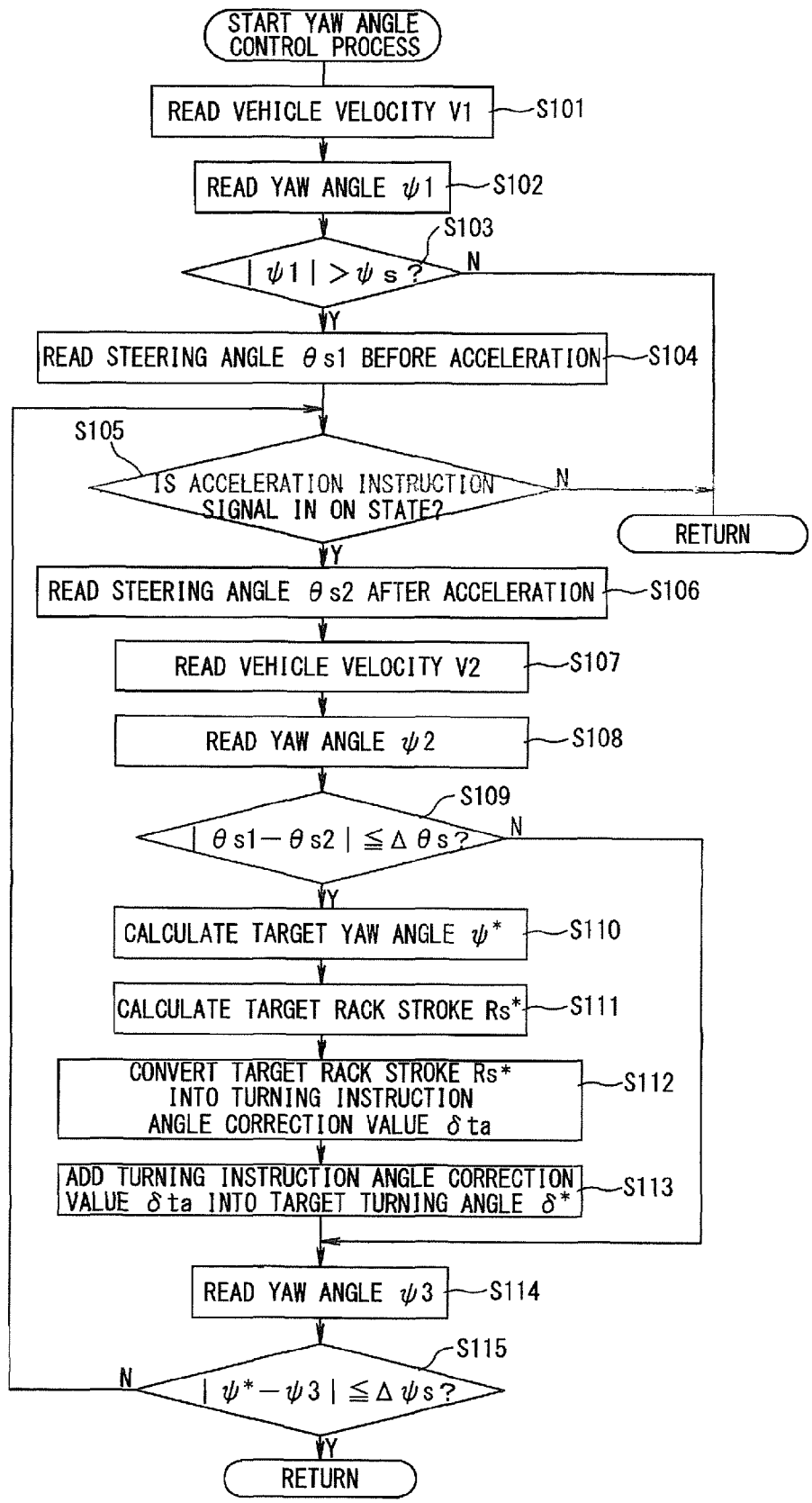
FIG. 30 is a flowchart illustrating an example of a procedure of a yaw angle control process according to the sixth embodiment of the invention.

The yaw angle control process is executed as the timer interrupting process executed for a predetermined time (for example, 1 μsec). The yaw angle control process is expressed as shown in FIG. 30, including the processes of the turning state detector 53A and the acceleration state detector 53D.

In the yaw angle control process, first, a current vehicle velocity V1 is read in step S101, and then, a yaw angle ψ1 detected by the yaw angle sensor 22a is read in step S102. The read yaw angle ψ1 is stored in the yaw angle storing section 53a.

Then, the procedure progresses to step S103 to determine whether an absolute value of the read yaw angle ψ1 exceeds a threshold value ψs close to zero so that the vehicle is in the turning state. When it is determined that the vehicle is not in the turning state, and the current timer interrupting process is terminated to return to the predetermined main program.

On the other hand, when the determination result in S103 is ψ1>ψs, it is determined that the vehicle is in the turning state, and the procedure progresses to step S104. Here, a steering angle θs1 detected by the steering angle sensor 4 is read and is stored in the steering angle storing section 53b, and then, the procedure progresses to step S105.

In step S105, it is determined whether the acceleration instruction signal Sd in the ON state indicating the acceleration state is input from the drive control unit 23 mounted in the vehicle. When the acceleration instruction signal Sd is in the OFF state, it is determined that the vehicle is not in the acceleration state, and the current timer interrupting process is terminated to return to the predetermined main program. Further, when the acceleration instruction signal Sd is in the ON state, it is determined that the vehicle is in the acceleration state, the procedure progresses to step S106.

In step S106, a steering angle θs2 after braking detected by the steering angle sensor 4 is read. Then, the procedure progresses to step S107 to read a vehicle velocity V2 after acceleration from the vehicle state parameter acquisition unit 21. Then, the procedure progresses to step S108 to read a yaw angle ψ2 after acceleration detected by the yaw angle sensor 22a. Then, the procedure progresses to step S109.

In step S109, the steering angle θs1 before acceleration stored in the steering angle storing section 53b is read, and it is determined whether an absolute value of a value obtained by subtracting the steering angle θs2 after acceleration from the steering angle θs1 before acceleration is smaller than a steering angle Δθs close to zero. When |θs1−θs2|≤Δθs, it is determined that the vehicle is in a steering wheel holding state where a driver does not steer the steering wheel 2 in a turning increase direction or in a returning direction, and the procedure progresses to step S110.

Figure 31:
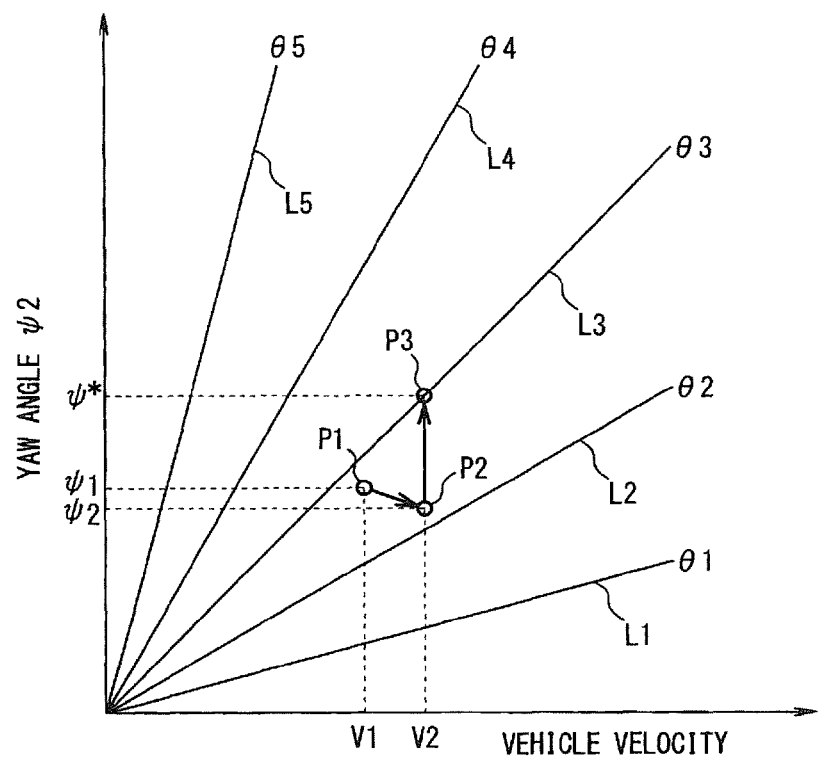
FIG. 31 is a characteristic line map illustrating a target yaw angle calculation map illustrating the relationship between a vehicle velocity and a yaw angle which can be applied to the sixth embodiment of the invention, in which a steering angle is used as a parameter.

In step S110, a target yaw angle ψ* necessary for turning acceleration is calculated with reference to a target yaw angle calculation map which is a target control value calculation map shown in FIG. 31, based on the vehicle velocity V2 after acceleration and the yaw angle ψ2 after acceleration. Here, in the target yaw angle calculation map, as shown in FIG. 31, a transverse axis represents the vehicle velocity V2, and a longitudinal axis represents the yaw angle ψ2. Here, plural characteristic lines L1 to L5 where plural steering angles θ are used as parameters are set.

In the calculation of the target yaw angle ψ*, a closest characteristic line Li (i=1 to 5) where the yaw angle is larger than a current yaw angle ψ2, a yaw angle of the selected characteristic line Li at the current vehicle velocity V2 is calculated as a target yaw angle ψ*.

Then, the procedure progresses to step S111 to subtract the steering angle θs2 after acceleration read in step S106 from the steering angle θi of the characteristic line Li selected in step S110 to thereby calculate the steering angle deviation Δδ, and to calculate a rack stroke for turning the turning wheels 17FR and 17FL by the calculated steering angle deviation as a target rack stroke Rs* which is the target control amount. Then, the procedure progresses to step S112.

In step S112, the calculated target rack stroke Rs* is converted into the turning angle correction value δta with respect to the target turning angle δ* generated in the turning actuator 8, and then, the procedure progresses to step S113 to add the converted turning angle correction value δta to the target turning angle δ*. Then, the procedure progresses to step S114.

In step S114, a yaw angle ψ3 after yaw angle control detected by the yaw angle sensor 22a is read, and then, the procedure progresses to step S115 to determine whether an absolute value of a value obtained by subtracting the yaw angle ψ3 after yaw angle control read in step S114 from the target yaw angle ψ* calculated in step S110 is smaller than a setting value Δψs close to zero. When the determination result is |ψ*−ψ3|≥Δψs, it is determined that the yaw angle ψ3 after yaw angle control does not approximately match the target yaw angle ψ*, and the procedure returns to step S5. When |ψ*−ψ3|<Δψs, it is determined that the yaw angle ψ3 after yaw angle control approximately matches the target yaw angle ψ*, and reaches a necessary yaw angle, and the current timer interrupting process is terminated to return to the predetermined main program.

Further, when the determination result in step S109 is |θs1−θs2|>Δθs, it is determined that the driver steers the steering wheel 2 in the turning increase direction or in the returning direction, and the procedure jumps to step S114 without performing the yaw angle control in step S110 to S113.

In the yaw angle control process shown in FIG. 30, the processes of steps S102 and S103 correspond to the turning state detector 53A, the process of step S105 corresponds to the acceleration state detector 53D, and the processes of step S106 to step S115 correspond to the yaw angle controller 53C.

In FIG. 29, the target turning angle calculator 51, the turning responsiveness setting section 52, and the actuator controller 54 that form the turning control unit 50 have the same configurations as in the first embodiment, and detailed description thereof will not be repeated.

(Operation of Sixth Embodiment)

Next, an operation of the sixth embodiment will be described with reference to FIGS. 31 and 32.

Here, it is assumed that the steering wheel 2 maintains the neutral position for straight traveling.

In the straight traveling state, the target turning angle δ* calculated by the target turning angle calculator 51 becomes zero. Thus, the rack shaft 14 is controlled to maintain the neutral position by the turning motor 8a controlled by the actuator controller 54, so that the turning angles δr of the turning wheels 17FR and 17FL are controlled to become zero through the tie rods 15. Here, since the steering wheel 2 maintains the neutral position, a yaw rate γ of the vehicle detected by a yaw rate sensor 22b is zero. Thus, since the gravity central point side slip angle β becomes zero as the turning angle δr becomes zero, and since the yaw rate γ is zero, the self aligning torque Tsa calculated according to Formula (1) by the straightness complementing section 55a becomes zero.

Since the disturbance compensating value Adis for suppressing disturbance is calculated in the disturbance compensating section 55b, the disturbance compensating value Adis becomes zero when the disturbance does not occur.

Further, in the yaw angle controller 53C, since the vehicle is not in the turning state but is in the straight traveling state so that the yaw angle ψ1 is zero, it is not determined that the vehicle is in the turning traveling state. Thus, the rack stroke control for correcting the rack stroke is not performed, and the target turning angle correction value δ*a obtained by adding the correction values δa and δta to the target turning angle δ* becomes zero.

Accordingly, the turning angle deviation Δδ output from the turning angle deviation calculator 61 of the actuator controller 54 also becomes zero, and the motor current instruction value im* output from the turning motor controller 62 also becomes zero. Thus, the motor current imt is not output from the motor current controller 65, and the turning motor 8a maintains the stop state, and the rack shaft 14 maintains the neutral position, so that the turning angle δt of the turning wheels 17FR and 17FL is controlled to become "0".

In the straight traveling state, if at least one of the turning wheels 17FR an 17FL is fit in a wheel track or passes on a manhole cover so that at least one of the turning wheels 17FR and 17FL is turned or a yaw angle is generated, the self aligning torque Tsa calculated by the straightness complementing section 55a increases. Here, when the king pin axis KS is set to pass through the tire contact surface in a state where the steering wheel 2 is at the neutral position as described above in the suspension device 1B to improve the turning responsiveness, the self aligning torque Tsa generated by the suspension device 1B becomes insufficient.

However, in the present embodiment, since the self aligning torque is calculated based on the above-described Formula (1), by setting the caster trail ϵc in Formula (1) to the same value as that of a normal suspension device, it is possible to calculate a value corresponding to the caster trail ϵc as the calculated self aligning torque Tsa.

Further, the calculated self aligning torque Tsa is multiplied by a gain Ksa to calculate a straightness correction value Asa, and the straightness correction value Asa is supplied to the delay controller 56. Here, since the vehicle is in the straight traveling state, the delay controller 56 sets the gain Ga to "1" by the gain adjustor 56c without detecting the steering start by the steering start detector 56a, and thus, the straightness correction value Asa is supplied to the adder 56e as it is.

Thus, as the target turning angle δ* is corrected by the straightness correction value Asa, the turning motor 8a that forms the turning actuator 8 is drive-controlled by the actuator controller 54 to generate a turning torque corresponding to the self aligning torque Tsa, and the generated turning torque is transmitted to the turning wheels 17FR and 17FL through the rack shaft 14 and the tie rods 15.

Thus, the self aligning torque Tsa is generated in the turning wheels 17FR and 17FL, so that the lack of the self aligning torque in the suspension device 1 is complemented to secure the straightness of the vehicle.

However, if a state where the straight traveling state where the steering wheel 2 maintains the neutral position is changed to a state where the steering wheel 2 is steered rightward (or leftward), the change from the straight traveling state to the turning state due to the steering is detected by the steering start detector 56a.

Thus, a control delay signal that is in an ON state for a predetermined time, for example, 0.1 seconds is output from the monostable circuit 56b to the gain adjustor 56c. Accordingly, the control gain Ga is set to "0" in the gain adjustor 56c while the control delay signal continues the ON state. Thus, the multiplication output that is output from the multiplier 56d becomes "0", and the output of the straightness securing control value δa to the adder 56e is stopped.

Accordingly, since the control gain Ga is set to "0" during an initial response period T1 of 0.1 seconds from a time point when the steering is started from the neutral position of the steering wheel 2, the multiplication output that is output from the multiplier 56d becomes "0", and the straightness securing control for the target turning angle δ* is stopped as indicated by the solid line in FIG. 15(b).

Thus, the steering angle θs detected by the steering angle sensor 4 is supplied to the target turning angle calculator 51, and the target turning angle δ* calculated by the target turning angle calculator 51 is supplied to the turning angle deviation calculator 61 as it is. Thus, the turning motor 8a is rotationally driven so as to match the target turning angle δ*. During this period, the straightness securing control in the straightness securing section 55 is stopped.

Accordingly, in the initial response period T1, the road surface contact point of the king pin axis KS is set to the contact central position in the contact surface of the tire, and the turning is started by the suspension device 1B in which the caster angle is set to zero.

Here, the caster angle of the suspension device 1B is set to zero. The relationship between the caster angle, the turning responsiveness, and the handling stability is in a state where the turning responsiveness is high when the caster angle is zero, as shown in FIG. 14(a), but in this case, the handling stability cannot be secured. That is, the turning responsiveness and the handling stability with respect to the caster angle have a trade-off relationship.

Thus, in the initial state where the steering is started from the neutral position, the straightness securing control due to the steer-by-wire control is not executed, and thus, the initial turning is provided by the suspension device 1B.

In the initial response period T1, as described above, since the suspension device 1B has the caster angel of 0 degrees and the high handling responsiveness, as indicated by the characteristic line L1 shown by the solid line in FIG. 15(a), it is possible to obtain a turning response characteristic (yaw angle) higher than a turning response characteristic (yaw angle) in a vehicle having a general steer-by-wire type steering system indicated by the characteristic line L2 shown by the single dot chain line. Here, since the turning angle is changed corresponding to the steering angle change due to the steering of the steering wheel 2 of the driver, the driver does not feel discomfort.

However, if the turning is continued in excess of the initial response period T1 only using the turning responsiveness based on the suspension device 1B, as indicated by the characteristic line L3 shown by the broken line in FIG. 15(a), the turning responsiveness of the vehicle due to the steering in the middle response period T2 and the last response period T3 becomes sensitive. Further, the rolling-in phenomenon of the vehicle toward the inside over the middle response period T2 to the last response period T3 increases.

Thus, in the sixth embodiment, as shown in FIG. 15(b), for example, when 0.1 seconds elapse from the initial response period T1, the straightness securing control for the target turning angle δ* in the straightness securing section 55 formed by the straightness complementing section 55a and the disturbance compensating section 55b is started in a step form. Thus, it is possible to suppress the turning responsiveness of the vehicle due to the suspension device 1B to suppress staggering of the vehicle, and as indicated by the dotted line in FIG. 14(b), it is possible to complement the straightness of the suspension device 1B by the steer-by-wire control to secure the handling stability.

Then, for example, when 0.3 seconds elapse after the middle response period T2, the turning response characteristic is further suppressed compared with a general turning response characteristic of the vehicle by the straightness securing control in the straightness securing section 55, to thereby make it possible to obtain the under-steering tendency. Thus, as indicated by the characteristic line L1 shown by the solid line in FIG. 15(a), it is possible to enhance the handling stability, and to realize an ideal turning response characteristic of the vehicle indicated by the characteristic line L1.

In the turning traveling state of the vehicle, in the yaw angle controller 53C, in the above-described yaw angle control process in FIG. 30, the vehicle V1 is read in step S101, the yaw angle ψ1 is read in step S102 and is stored in the yaw angle storing section 53a, and then, the procedure progresses to step S103, so that the vehicle is in the turning traveling state. Thus, the procedure progresses to step S104 to read the steering angle θs1 before acceleration and to store the steering angle θs1 before acceleration in the steering angle storing section 53b, and then, the processes up to the termination of the timer interruption process are repeated. Thus, the yaw angle ψ1 before acceleration is updated and stored in the yaw angle storing section 53a, and the steering angle θs1 before acceleration is updated and stored in the steering angle storing section 53b.

In the turning traveling state, if the driver steps on a brake pedal, the drive control unit 23 is operated so that the acceleration control is started with respect to the drive wheels, the acceleration state signal Sd in the ON state is output to the control/drive circuit unit 26.

Thus, in the yaw angle controller 53C, in the process of FIG. 30, the procedure progresses to step S106 from step S105 to read the steering angle θs2 after acceleration, to read the vehicle velocity V2 after acceleration (step S107), and then, to read the yaw angle ψ2 after acceleration (step S108).

Further, when there is no substantial change in the steering angles θs1 and θs2 before and after acceleration, it is determined that the vehicle is in the steering wheel holding state where the driver does not steer the steering wheel 2 in the turning increase direction or in the returning direction, and the procedure progresses to step S110 to calculate the target yaw angle ψ* with reference to the target yaw angle calculation map based on the vehicle velocity V2 after acceleration and the yaw angle ψ2 after acceleration.

In the calculation of the target yaw angle ψ*, it is assumed that a position P1 before acceleration indicated by the vehicle velocity V1 and the yaw angle ψ1 before acceleration in the turning state is disposed between steering characteristic lines L2 and L3, as shown in FIG. 31. If the vehicle enters the acceleration state from the position P1 before acceleration, since the suspension device 1B can perform the steering with a light turning force as described above at a position P2 after acceleration indicated by the vehicle velocity V2 after acceleration and the yaw angle ψ2 after acceleration, the vehicle velocity V2 after acceleration becomes greater than the vehicle velocity V1 before acceleration, and the yaw angle ψ2 after acceleration is changed from the yaw angle ψ1 before acceleration so that the toe angle of the turning wheels 17FR and 17FL is directed toward the outside of the turning due to the acceleration of the vehicle. As a result, the yaw angle ψ2 after acceleration becomes smaller than the yaw angle ψ1 before acceleration, so that the vehicle shows the under-steering tendency.

The closest characteristic line L3 having a larger yaw angle compared with the yaw angle ψ2 after acceleration at the vehicle velocity V2 after acceleration is selected from the position P2 after acceleration, and the yaw angle of the selected steering characteristic line L3 at the vehicle velocity V2 after acceleration is calculated as the target yaw angle ψ*.

Further, the steering angle θs2 after acceleration is subtracted from a steering angle θ3 necessary at the vehicle velocity V2 after acceleration set in the selected steering characteristic line L3 to calculate a steering angle deviation Δδ, a rack stroke for turning the turning wheels 17FR and 17FL by the calculated steering angle deviation Δθ is calculated, and the calculated rack stroke is calculated as a target rack stroke Rs* (step S111).

The target rack stroke Rs* is converted into the turning angle correction value δta for performing the yaw angle control with respect to the target turning angle δ* calculated in the target turning angle calculator 51 (step S112). Then, the converted turning angle correction value δta is added to the target turning angle δ*, and the result is output to the actuator controller 54 (step S113).

Thus, in the actuator controller 54, the turning actuator 8 is controlled to give a toe angle change for eliminating the toe angle change toward the outside of the turning due to being supported by the suspension device 1B configured so that the turning wheels 17FR and 17FL can be turned with a light turning force, so that the rack shaft 14 strokes by the target rack stroke Rs*, and the stroke is supplied to the turning wheels 17FR and 17FL through the tie rods 15.

Figure 32:
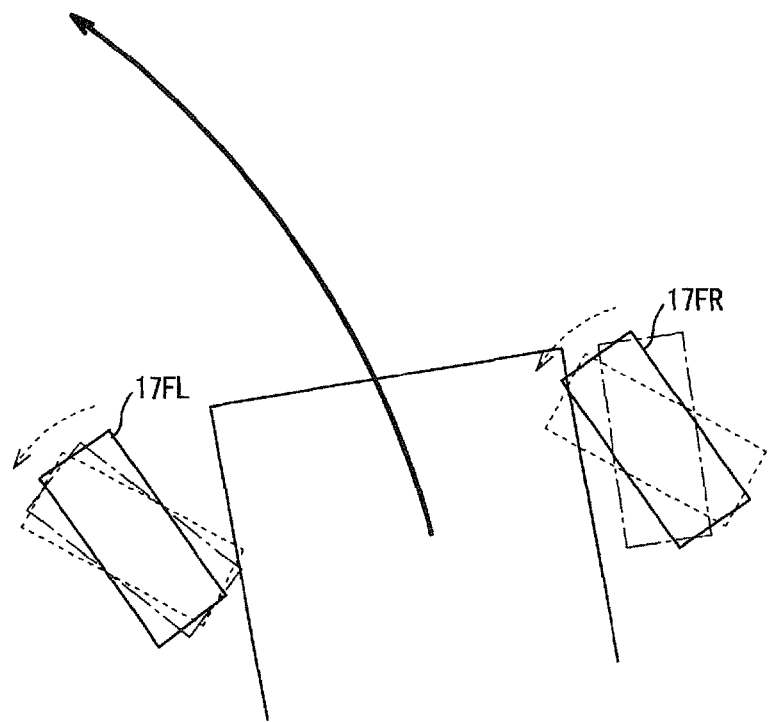
FIG. 32 is a diagram illustrating an operation of the sixth embodiment of the invention.

Accordingly, when the suspension device 1B capable of performing the turning with the light turning force is applied, when the yaw angle control is not performed, and when the vehicle enters to the acceleration state from a state indicated by a solid line in FIG. 32 which is a state where the acceleration is not performed in the turning state, the turning wheels 17FR and 17FL is in a state where the toe angle change of the turning wheel 17FL on the outer turning wheel side becomes large in the toe-out direction, as indicated by a single dot chain line in FIG. 32.

However, in the present embodiment, as the above-described yaw angle control is performed during turning acceleration, when the state indicated by the solid line in FIG. 32 is changed to the acceleration state, the toe angle of the turning wheel 17FL on the outer turning wheel side is controlled in a toe-in direction toward the inside of the turning as indicated by a dotted line, and accordingly, the inner turning wheel is controlled in the toe-out direction. Here, since the vehicle is being turned, the weight load of the vehicle applied to the turning wheels is large on the outer turning wheel side and is small on the inner turning wheel side, and thus, the influence on the turning behavior of the vehicle is scarcely generated even though the inner turning wheel is controlled in the toe-out direction.

Accordingly, according to the present embodiment, the toe angle change in the toe-out direction on the outer turning wheel side due to the suspension device 1B capable of turning the turning wheels with the light turning force is eliminated, so that the steering characteristic of the vehicle is controlled to show the over-steering tendency. Thus, in a state where the vehicle 1 travels and turns at a corner, it is possible to secure appropriate turning performance even in the acceleration state.

Further, in the present embodiment, since the rack stroke of the rack shaft 14 is controlled to cause the toe angle change as the turning actuator 8 is controlled, it is possible to prevent the problems in the related art techniques, for example, the technique in which the braking pressure on the outer turning wheel side is larger than the braking pressure on the inner turning wheel side by the braking device to generate the yaw angle that is directed toward the inside of the turning, or the technique in which the driving force of the outer turning wheel increases using the hydraulic clutch to increase the braking force on the inner turning wheel side, and thus, the response delay due to the hydraulic pressure control is not caused. Accordingly, it is possible to provide the high responsiveness during turning acceleration to change the toe angle of the turning wheels 17FR and 17FL, thereby controlling the vehicle in the over-steering state. Thus, it is possible to enhance the turning performance, and to enhance the handling stability.

Further, it is possible to perform the yaw angle control during turning acceleration by the yaw angle controller 53C provided in the turning control unit 50 that forms the steer-by-wire system. Thus, it is not necessary to set the longitudinal force (forward pulling) in the toe-in direction in the front-side suspension device 1B like a normal suspension device, and to set the longitudinal force (forward pulling) in the toe-out direction in the rear-side suspension device. Accordingly, it is possible to realize the front and rear suspension devices with a simple and light-weight configuration, and to enhance the degree of freedom in the layout.

In the related art techniques, since the toe angle control amount burdens the suspension device, for example, it is necessary to set the transverse link to be longer than the rack shaft in the vehicle width direction in a state where the transverse link and the rack shaft are arranged approximately in parallel. Thus, the degree of freedom in the layout of the suspension device decreases, its configuration becomes complicated, and the weight increases.

Then, the yaw angle ψ3 is read again (step S114), and the yaw angle control is continued until an absolute value of the yaw angle deviation obtained by subtracting the yaw angle ψ3 from the target yaw angle ψ* is equal to or smaller than the setting value Δψs or the acceleration state is terminated.

In the turning acceleration state, if the absolute value of the steering angle deviation obtained by subtracting the steering angle θs2 after acceleration from the steering angle θs1 before acceleration exceeds the setting value Δθs as the driver steers the steering wheel 2, the procedure jumps from step S9 to step S14 to stop the yaw angle control for calculating the turning angle correction value δta. Thus, the influence on steering correction of the steering wheel 2 of the driver is prevented.

As described above, according to the vehicle steering apparatus according to the present embodiment, in the suspension device 1B, since the caster trail is set in the tire contact surface, it is possible to reduce the moment around the king pin axis KS.

Accordingly, in the above-described embodiment, similarly, it is possible to perform turning using a small rack shaft force, i.e., a small turning force, and to control the direction of the vehicle wheels using a small force, to thereby enhance the turning responsiveness.

In this way, in the above-described embodiment, by setting the king pin axis KS to pass through at least the inside of the tire contact surface, the suspension device 1B is configured to enhance the turning responsiveness, and performs the straightness complementation and the disturbance compensation for controlling the turning characteristic by the straightness securing section 55 of the steer-by-wire system SBW to secure the straightness of the vehicle.

Thus, when the rightward steering or leftward steering is performed from the state where the steering wheel 2 maintains the neutral position, as the initial responsiveness, high responsiveness is secured using the high turning responsiveness of the suspension device. Then, if the initial period elapses to enter the middle period, it is necessary to set a high value on the handling stability compared with the steering responsiveness. Thus, by starting the control by the turning responsiveness setting section 52 in the steer-by-wire system SBW to perform the straightness complementation control, the high steering responsiveness due to the suspension device 1B is suppressed to secure the handling stability. Further, in the last period, the steering responsiveness is further reduced to suppress the rolling-in phenomenon of the vehicle toward the inside to obtain the understeering tendency. Thus, it is possible to suppress staggering of the vehicle, to thereby establish an ideal steering responsiveness control.

Further, since the suspension device 1B according to the present embodiment is the strut type, it is possible to reduce the number of components, and to easily perform the setting of the king pin axis KS in the present embodiment.

In the present embodiment, the control/drive circuit unit 26 that includes the input-side steering shaft 3, the steering reaction force actuator 6, the steering reaction force actuator angle sensor 7, the turning actuator 8, the turning actuator angle sensor 9, the output-side steering shaft 10, and the turning control unit 50 forms the steer-by-wire system SBW. Further, the vehicle wheels 17FR, 17FL, 17RR, and 17RL correspond to the tire wheels, the tire, and the wheel hub mechanism. In addition, the first link 37, the second link 38, and the shock absorber 40 correspond to the plural link members. Further, the lower arm is configured by the first link 37 and the second link 38, and the strut member ST is configured by the spring member 34 and the shock absorber 40.

In the sixth embodiment, a case where the turning control unit 50 is configured by hardware is described, but the invention is not limited thereto, and for example, the target turning angle calculator 51 and the turning responsiveness setting section 52 may be configured by an operation processing device such as a microcomputer, and the turning control process shown in FIG. 17 may be executed by the operation processing device, similar to the above-described first to fifth embodiments.

(Effects of Sixth Embodiment)

(1) A steering control device includes a steer-by-wire system that controls an actuator that detects displacement of a steering angle when a steering wheel is steered and operates a turning mechanism that turns a turning wheel separated from the steering wheel based on a detection result; a suspension device that supports the turning wheel and is able to providing turning with a low turning force by the actuator; a yaw angle detector that detects a yaw angle of a vehicle; a steering angle detector that detects the steering angle of the steering wheel; a vehicle velocity detector that detects a vehicle velocity of the vehicle; a turning state detector that detects a turning state of the vehicle based on the yaw angle; an acceleration state detector that detects an acceleration state of the vehicle; and a yaw angle controller that calculates, when the turning state of the vehicle is detected by the turning state detector and when the acceleration state of the vehicle is detected by the acceleration state detector, based on a vehicle velocity after acceleration and a yaw angle after acceleration after the acceleration state is detected, a target control amount of the actuator for suppressing a yaw angle deviation before and after acceleration based on plural steering angle characteristics in which the steering angle is used as a parameter, and controls the actuator so that the control amount of the actuator becomes the target control amount.

With such a configuration, when the suspension device configured to provide the turning with a light turning force is applied, as the yaw angle controller calculates the target control amount for eliminating the toe angle change toward the outside of the turning of the suspension device generated during acceleration in the turning traveling state of the vehicle and controls the turning actuator so that the control amount becomes the target control amount, it is possible to change the toe angle so that the turning wheel has the over-steering tendency. Accordingly, it is possible to enhance the responsiveness for over-steering compared with a case where the braking pressure or the hydraulic clutch pressure is controlled to obtain the over-steering characteristic. Further, as the braking force is applied to the drive wheels in the acceleration state, it is possible to suppress reduction in the acceleration performance. Accordingly, it is possible to enhance the turning performance during turning acceleration of the vehicle, and to enhance the handling stability.

(2) Further, the yaw angle controller selects a closest steering angle characteristic line where a yaw angle at the same vehicle velocity as the vehicle velocity after acceleration is larger than the yaw angle after acceleration based on the vehicle velocity after acceleration and the yaw angle after acceleration with reference to a target value calculation map having plural steering angle characteristic lines where the steering angle is used as a parameter and indicating the relationship between the vehicle velocity and the yaw angle, and calculates the target control amount from a deviation between a steering angle of the selected steering angle characteristic line and a steering angle after acceleration.

Accordingly, it is possible to instantly and easily calculate the target control amount necessary in actual turning acceleration based on the vehicle velocity after acceleration and the yaw angle after acceleration with reference to the target value calculation map.

(3) The yaw angle controller selects a closest steering angle characteristic line where a yaw angle at the same vehicle velocity as the vehicle velocity after acceleration is larger than the yaw angle after acceleration based on the vehicle velocity after acceleration and the yaw angle after acceleration with reference to the target value calculation map, calculates the target control amount from the deviation between the steering angle of the selected steering angle characteristic line and the steering angle after acceleration, and sets the yaw angle at the vehicle velocity after acceleration of the selected steering angle characteristic line as a target yaw angle.

Accordingly, it is possible to instantly and easily calculate the target control amount and the target yaw angle necessary in actual turning acceleration based on the vehicle velocity after acceleration and the yaw angle after acceleration with reference to the target value calculation map.

(4) The yaw angle controller continues the control of the actuator for causing the control amount to become the target control amount until the yaw angle of the vehicle detected by the vehicle yaw angle detector becomes a value close to the target yaw angle.

Accordingly, since the yaw angle control is terminated when the vehicle yaw angle reaches the target yaw angle, it is possible to reliably prevent the yaw angle of the vehicle from excessively increasing, to thereby secure an appropriate yaw angle.

(5) The yaw angle controller stops, when the acceleration state of the vehicle is detected by the acceleration state detector, the control of the actuator when the steering angle deviation before and after acceleration state detected by the steering angle detector is equal to or greater than a predetermined value.

Accordingly, when the vehicles is in the turning acceleration state and the yaw angle control for eliminating the yaw angle reduction is started, and when the driver performs steering correction of the steering wheel, it is possible to stop the yaw angle control to preferentially perform a turning control due to the steering of the driver. Accordingly, it is possible to reliably perform the steering correction from the driver.

(6) The actuator is a turning actuator that detects the displacement of the steering angle when the steering wheel is steered and drives a rack mechanism of the steer-by-wire system that turns the turning wheel separated from the steering wheel based on a detection result, and the target control amount is a target rack stroke.

Accordingly, by controlling a rack stroke of the rack mechanism to become the target rack stroke, it is possible to directly and correctly control the toe angle change of the turning wheel.

(7) The suspension device includes plural link members that support the turning wheel to a vehicle body, and a king pin axis that passes through an upper pivot point and a lower pivot point of the link members is set to pass through the inside of a tire contact surface at a neutral position of the steering wheel.

Accordingly, it is possible to reduce the moment around the king pin axis of the suspension device, and thus, it is possible to perform the turning with a small turning force, and to control the direction of the vehicle wheel with a small force.

Accordingly, it is possible to enhance the turning responsiveness. At this time, by setting the caster angle to a value close to zero, it is possible to realize a suspension device with high turning responsiveness.

Further, a straightness securing section is provided in a turning control unit, and accordingly, it is possible to secure reduction in the straightness of the vehicle as the turning responsiveness of the suspension device is secured, by the straightness securing section.

(8) Further, since the straightness securing section is configured by the steer-by-wire system provided with the turning actuator and the actuator control device, it is not necessary to independently provide the straightness securing section, and thus, it is possible to simplify the configuration.

In addition, as the straightness securing section, the straightness securing section 55 of the turning responsiveness setting section 52 serves as a main straightness securing section, and the actuator controller 54 serves as a sub straightness securing section, and thus, it is possible to reliably secure the straightness of the suspension device by both the straightness securing sections.

(9) When the steering wheel is steered rightward or leftward from the state where the steering wheel maintains the neutral position, as the straightness securing control of the straightness securing section is delayed by the delay controller, a high turning responsiveness is secured as the initial response characteristic using the turning responsiveness of the suspension device. Then, as the turning responsiveness of the suspension device is adjusted by the straightness securing control due to the straightness securing section, it is possible to secure ideal turning responsiveness.

(10) The straightness securing section calculates a self aligning torque to secure straightness.

Accordingly, it is possible to secure the straightness reduced when securing the high responsiveness of the suspension device using the self aligning torque by the straightness securing section, and to enhance the handling stability of the vehicle.

(11) When the turning of the steering wheel is started from the neutral position, the turning response characteristic of the suspension device is set as the initial turning response characteristic by the turning responsiveness setting section of the steer-by-wire system in an initial period when the turning starts. Then, after the initial setting time elapses, the control of the turning actuator for securing the straightness of the suspension device is started by the straightness securing section of the steer-by-wire system.

Accordingly, it is possible to secure the high turning response characteristic of the suspension device during initial turning, and after the initial setting time elapses it is possible to perform the control of the turning actuator for securing the straightness of the suspension device by the straightness securing section, and to obtain an ideal turning response characteristic.

(Application Example of Actuator of the Invention)

In the sixth embodiment, a case where the turning actuator 8 that drives the rack shaft 14 is used as the actuator is described. However, the invention is not limited to this configuration, and as shown in FIG. 25, when the in-wheel motors 70FR and 70FL that directly drive the front wheels 17FR and 17FL as the drive wheels are provided, the in-wheel motors 70FR and 70FL are used as a yaw angle control actuator for performing the steering by the speed difference of the right and left wheels.

Further, with respect to the drive unit 71 that rotationally drives the in-wheel motors 70FR and 70FL, the target yaw angle $\psi^*$ is calculated by the yaw angle controller 72 during turning acceleration, similar to the above-described yaw angle controller 53C. In addition, the speed correction values RAFR and RAFL for increasing the speed of the in-wheel motor 70FR (or 70FL) on the outer turning wheel side and decreasing the speed of the in-wheel motor (70FL (or 70FR)) on the inner turning wheel side so that the current yaw angle $\psi3$ reaches the calculated target yaw angle $\psi^*$ are calculated. The speed correction values RAFR and RAFL are supplied to the drive unit 71, and the drive unit 71 corrects rotation instruction values. Further, inverter drive signals based on the corrected rotation instruction values are supplied to the inverters 74FR and 74FL that are supplied with electric power from the DC power source 73. The yaw angle control for the steering is performed by causing the speeds of the in-wheel motors 70FR and 70FL to increase on the outer turning wheel side and to decrease on the inner turning wheel side using the inverters 74FR and 74FL, so that the steering characteristic of the vehicle may show the over-steering tendency.

(Effects of Application Example)

In this way, by applying the yaw angle control actuator based on the in-wheel motors that directly drive the drive wheels as the actuator, it is possible to suppress the response delay caused when using the hydraulic pressure, and to eliminate the toe-angle change toward the outside of the turning during turning acceleration by controlling the yaw angle without controlling the turning angle.
(Modification Example of Turning Mechanism)

As the turning mechanism that turns the turning wheels, a ball screw mechanism may be applied instead of the rack-and-pinion mechanism. In this case, a ball nut may be rotationally driven by the turning actuator 8. In this way, by applying the ball screw mechanism, it is possible to control the turning angle with high accuracy.

Further, as the turning mechanism, a turning mechanism of a different type may be applied instead of the pinion-and-rack mechanism or the ball screw mechanism.
(Application Example of Yaw Angle Controller of the Invention)

In the above-described embodiment, a case where the target rack stroke and the target yaw angle are calculated with reference to the target yaw angle calculation map is described. However, the invention is not limited thereto, and instead of the reference to the target yaw angle calculation map, plural steering angle characteristic lines where the steering angle is used as a parameter may be expressed as a function of the vehicle velocity and the yaw angle, and a steering angle characteristic line where the yaw angle becomes larger than a yaw angle after acceleration at a vehicle velocity after acceleration may be selected based on the vehicle velocity after acceleration and the yaw angle after acceleration.

In this way, by expressing the steering characteristic line as the function of the vehicle velocity and the yaw angle, it is possible to select the steering angle characteristic line through an operation without using the target yaw angle calculation map.

In the above-described embodiment, the number of steering angle characteristic lines is not limited to four, and may be set to an arbitrary number.
(Application Example of Suspension Applied to the Invention)

In the above-described embodiment, a case where the lower link of the suspension device is configured by the first link 37 and the second link 38 that do not intersect each other is described. However, the suspension device is not limited to such a configuration, and any configuration in which the king pin axis is set to pass through the inside of the tire contact surface so that the turning force can be reduced may be used. Thus, the lower link structure may be configured by the transverse link 81 and the compression link 82 that intersect each other, as schematically shown in FIG. 26. Further, the lower link structure may be also configured by the transverse link 81 and the tension link 83 that intersect each other, as schematically shown in FIG. 27.
(Effects of Application Example)

In this way, by configuring the lower link structure using the first link and the second link that intersect each other in a planar view, the lower pivot point that forms the king pin axis may be set at an intersection position of both the links. Thus, it is possible to make the position of the lower pivot point close to the inside of the vehicle body of the turning wheels. Accordingly, it is easy to set the king pin axis to pass through the inside of the tire contact surface.

Further, the suspension device 1B is not limited to the above-described configuration, and suspension devices having various different configurations may be applied.

In addition, the turning responsiveness setting section 52 may not be provided according to the configuration of the suspension device 1B.

Seventh Embodiment

Next, a seventh embodiment of the invention will be described with reference to FIGS. 33 to 41.

In the seventh embodiment, the yaw angle control is performed during turning braking and turning acceleration.

That is, in the related art technique disclosed in the above-mentioned Patent Document 1, the behavior of the vehicle during turning acceleration is stabilized by controlling the braking force of each wheel by the steer-by-wire control system, but it is necessary to control the braking pressure of the actuator that generates the braking force in order to stabilize the behavior of the vehicle by controlling the braking force of each wheel, which causes the response delay in the pressure control system.

Further, in the related art technique disclosed in Patent Document 2, since the hydraulic clutch inserted between the drive wheels is controlled during turning acceleration to give the driving force to the outer turning wheel, and to give the braking force to the inner turning wheel, the response delay is caused in the pressure control system, similar to Patent Document 1.

Thus, in the seventh embodiment, it is desirable to appropriately stabilize the behavior of the vehicle during acceleration and braking of the vehicle, during turning of the vehicle, by suppressing the response delay by the steering control device.

In order to solve the above problem, the steering control device according to the present embodiment selects plural turning amount characteristic lines based on a vehicle velocity and a yaw angle after vehicle velocity change in an acceleration state and a deceleration state during turning traveling, calculates the target turning amount of the actuator based on the selected turning amount characteristic line, controls a turning amount of the actuator to become the target turning amount, and appropriately controls the yaw angle during turning traveling by the toe angle change of the turning wheel. Accordingly, the vehicle is in the over-steering state or the under-steering state due to the toe angle change of the turning wheel, to thereby make it possible to enhance the response characteristic for stabilizing the behavior of the vehicle.

With such a configuration, since the yaw angle control of the vehicle is performed in the acceleration state and the deceleration state during turning of the vehicle in the steer-by-wire system to adjust the yaw angle to an appropriate value, it is possible to suppress the response delay, and to rapidly and appropriately stabilize the behavior of the vehicle.

Figure 33:
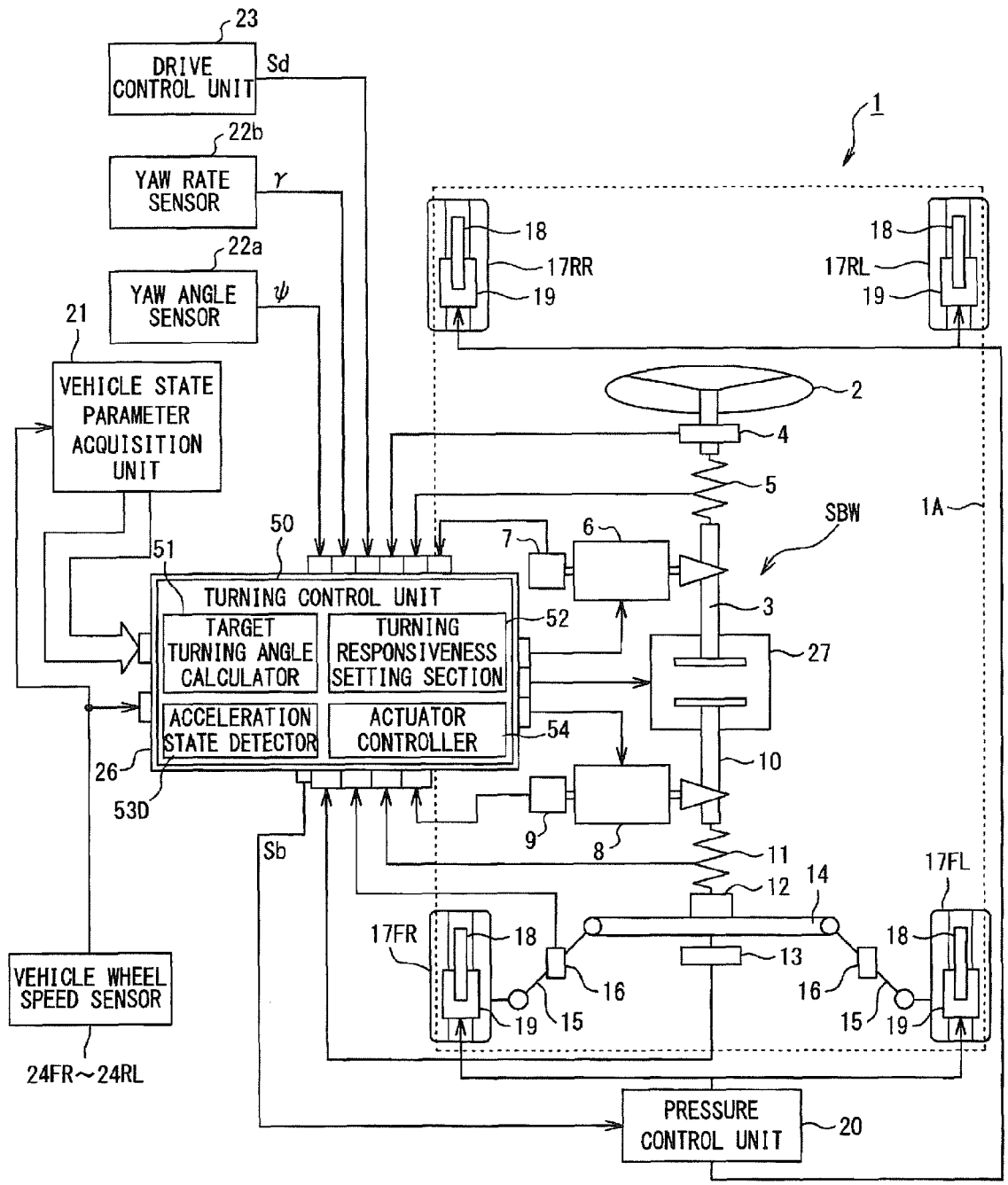
FIG. 33 is a configuration diagram schematically illustrating an automobile according to a seventh embodiment of the invention.

Accordingly, in the seventh embodiment, the same suspension device as the suspension device described with reference to FIGS. 2 to 10 relating to the above-described first embodiment is applied as the suspension device, but as an overall configuration, as shown in FIG. 33, the same configuration as that of FIG. 28 in the above-described sixth embodiment is provided.
(Turning Control)

Next, the turning control in the control/drive circuit unit 26 for controlling the turning actuator 8 will be described with reference to FIGS. 34 to 41.

That is, as described above, the steering torque Ts of the input-side steering shaft 3 detected by the torque sensor 5, the vehicle velocity V acquired by the vehicle state parameter acquisition unit 21, and the rotational angle θmi of the actuator 6 detected by the steering reaction force actuator angle sensor 7 are input to the control/drive circuit unit 26.

Figure 34:
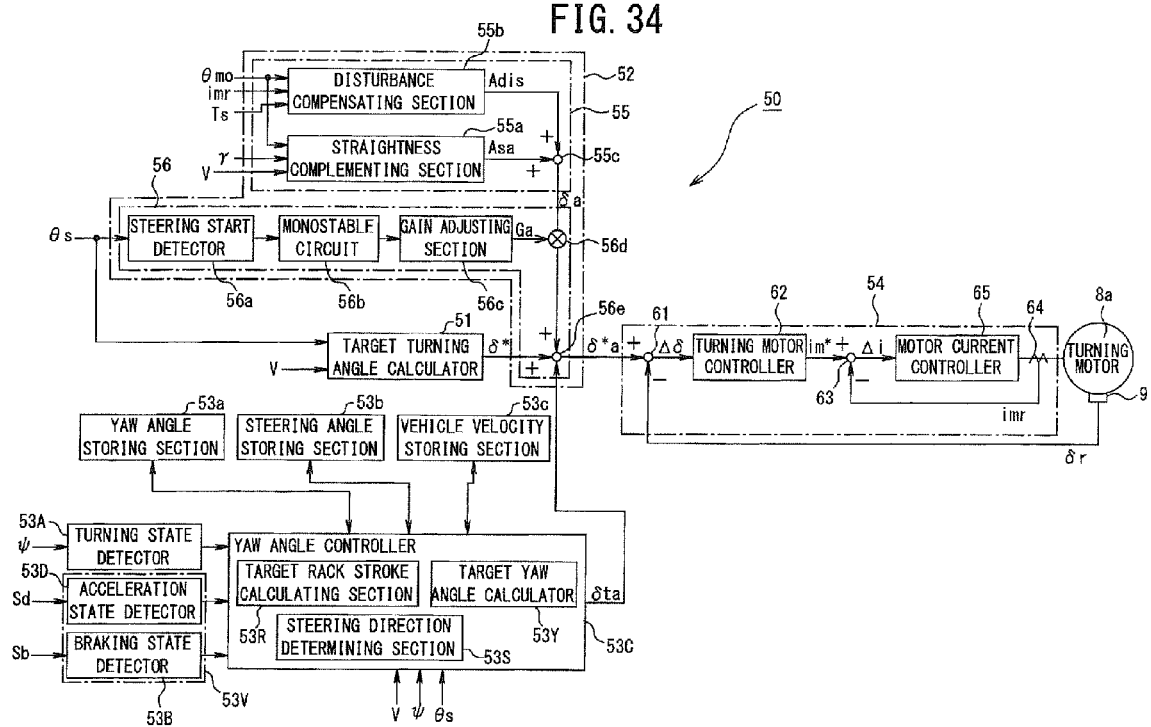
FIG. 34 is a block diagram illustrating a specific configuration of a yaw angle controller according to the seventh embodiment of the invention.

A turning control unit 50 shown in FIG. 34 is provided in the control/drive circuit unit 26. The turning control unit 50 includes a target turning angle calculator 51, a turning responsiveness setting section 52, a turning state detector 53A, an acceleration state detector 53D, a braking state detector 53B, a yaw angle controller 53C, and an actuator controller 54.

The target turning angle calculator 51 receives inputs of the vehicle velocity V and the rotational angle θmi, and calculates a target turning angle δ* for driving the turning actuator 8 based on the inputs.

The turning responsiveness setting section 52 includes a straightness securing section 55 and a delay controller 56.

The straightness securing section 55 includes a straightness complementing section 55*a* and a disturbance compensating section 55*b*.

The straightness complementing section 55*a* calculates a self aligning torque Tsa by performing an operation of Formula (1) based on the vehicle velocity V, an actual turning angle δr of the turning wheels 17FR and 17FL calculated based on the pinion angle detected by the pinion angle sensor 13, and a yaw rate γ detected by the yaw rate sensor 22*b*, and multiplies the calculated self aligning torque Tsa by a predetermined gain Ksa to calculate a self aligning torque control value Asa (=Ksa·Tsa) which is a straightness correcting value.

The self aligning torque Tsa is not limited to the calculation using Formula (1), and may be calculated by providing a lateral acceleration sensor that detects the lateral acceleration Gy of the vehicle, by calculating a lateral force Fy based on the lateral acceleration Gy of the vehicle and the yaw rate γ of the vehicle, based on a motion equation of the vehicle, and based on a differential value of a yaw rate γ and a lateral acceleration Gy, and by multiplying the lateral force Fy by the pneumatic trail εn. Further, the self aligning torque Tsa may be calculated based on the steering angle θs detected by the steering angle sensor 4 and the vehicle velocity V, with reference to a control map obtained by measuring the relationship between the steering angle θs of the steering wheel 2 and the self aligning torque Tsa using the vehicle velocity V as a parameter, or by calculating the relationship by a simulation. Further, when the turning wheels 17FR and 17FL are used as drive wheels, a generated torque Th generated during turning due to a torque steer phenomenon based on a deviation between rightward and leftward driving forces may be estimated, and the self aligning torque Tsa may be calculated by subtracting the generated torque Th from the steering torque Ts detected by the steering torque sensor 5. Similarly, the self aligning torque Tsa may be calculated based on a difference between braking forces of the right and left turning wheels 17FR and 17FL.

The disturbance compensating section 55*b* receives inputs of a steering torque Ts from the steering torque sensor 5, a rotational angle θmo from the turning actuator angle sensor 9, a motor current imr from a motor current detector 64, divides and estimates disturbance input to the vehicle for each frequency band, and calculates a disturbance compensating value Adis for suppressing the disturbance.

In the disturbance compensating section 55*b*, for example, as disclosed in JP 2007-237840 A, in a model in which a steering torque Ts which is a steering input from a driver and a turning input from the turning actuator 8 are used as control inputs and an actual steering state amount is used as a control amount, plural disturbance estimating parts that estimate disturbance based on a difference between a value obtained by passing the control inputs through a low pass filter and a value obtained by passing the control amount through a reverse characteristic of the model and the low pass filter. Each disturbance estimating section divides the disturbance for each of plural frequency bands by changing a cut-off frequency of the low pass filter.

Further, the disturbance compensating value Adis and the self aligning torque control value Asa calculated by the disturbance compensating section 55*b* and the straightness complementing section 55*a* are added by an adder 55*c* to calculate a straightness securing control value δa. The straightness securing control value δa is supplied to the delay controller 56.

As shown in FIG. 34, the delay controller 56 includes a steering start detector 56*a*, a monostable circuit 56*b*, a gain adjustor 56*c*, and a multiplier 56*d*.

The steering start detector 56*a* detects a timing when the rightward steering or leftward steering is performed from a state where the neutral position is maintained based on the steering angle θs detected by the steering angle sensor 4, and outputs a steering start signal SS indicating a steering start from the neutral position to the monostable circuit 56*b*.

Further, the monostable circuit 56*b* outputs a control start delay signal that is in an ON state for a predetermined delay time, for example, 0.1 seconds, based on the steering start signal output from the steering start detector 56*a* to the gain adjustor 56*c*.

The gain adjustor 56*c* sets the control gain Ga to "0" when the control start delay signal is in the ON state, and sets the control gain Ga to "1" when the control start delay signal is in an OFF state, and then, outputs the set control gain Ga to the multiplier 56*d*.

The multiplier 56*d* receives an input of the straightness securing control value δa output from the straightness securing section 55, multiplies the straightness securing control value δa by the control gain Ga, and supplies the multiplication result to the adder 56*e* to which the target turning angle δ* from the target turning angle calculator 51 is input.

Accordingly, in the delay controller 56, when the steering starting state in which the rightward steering or leftward steering is performed from the state where the neutral position state is maintained is detected by the steering start detector 56*a*, the gain adjustor 56*c* sets the control gain Ga to be multiplied by the straightness securing control value δa to "0" so that the straightness securing control of adding the straightness securing control value δa calculated by the straightness securing section 55 to the target turning angle δ* is stopped for a predetermined time set by the monostable circuit 56*b*, for example, 0.1 seconds. Further, in the gain adjustor 56*c*, if the output signal of the monostable circuit 56*b* is reversed to an OFF state after the lapse of 0.1 seconds, the gain adjustor 56*c* sets the control gain Ga to "1" so that the straightness securing control for adding the straightness securing control value δa to the target turning angle δ* is started.

Further, when the steering of the steering wheel 2 is continued, since the delay controller 56 does not detect the steering start from the neutral position state by the steering start detector 56*a*, the output of the monostable circuit 56*b* maintains the OFF state, and thus, the gain adjustor 56*c* sets the control gain Ga to "1". Thus, the straightness securing control value δa calculated by the straightness securing section 55 is supplied to the adder 56*e* as it is. Accordingly, the straightness securing control value δa is added to the target turning angle δ*, so that the straightness securing control is performed.

Further, the turning state detector 53A receives an input of a yaw angle ψ detected by the yaw angle sensor 22*a*, and when the yaw angle ψ exceeds a predetermined setting angle ψs, the turning state detector 53A determines that the vehicle is in the turning state.

The acceleration state detector 53D receives an input of an acceleration instruction signal Sd output to the control/drive circuit unit 26 from the drive control unit 23, and when the acceleration state instruction signal Sd is in an ON state, the acceleration state detector 53D determines that the vehicle is in the acceleration state.

The braking state detector 53B receives an input of a braking instruction signal Sb output to the pressure control unit 20 during braking in the control/drive circuit unit 26, and when the braking state instruction signal Sb is in an ON state, the braking state detector 53B determines that the vehicle is in the braking state.

Here, a traveling state detector 53V is configured by the acceleration state detector 53D and the braking state detector 53B.

Further, the yaw angle controller 53C receives inputs of the determination results of the turning state detector 53A, the acceleration state detector 53D, and the braking state detector 53B, and receives inputs of the yaw angle ψ detected by the yaw angle sensor 22a, the steering angle θs detected by the steering angle sensor 4, and the vehicle velocity V calculated by the vehicle state parameter acquisition unit 21. The yaw angle controller 53C includes a steering direction determining section 53S, a target rack stroke calculator 53R which is a target turning amount calculator, and a target yaw angle calculator 53Y.

The steering direction determining section 53S determines whether the steering direction of the driver is a turning increase direction or a returning direction based on the steering angles before and after the turning acceleration state or the steering angles before and after the turning braking state.

Figure 38:
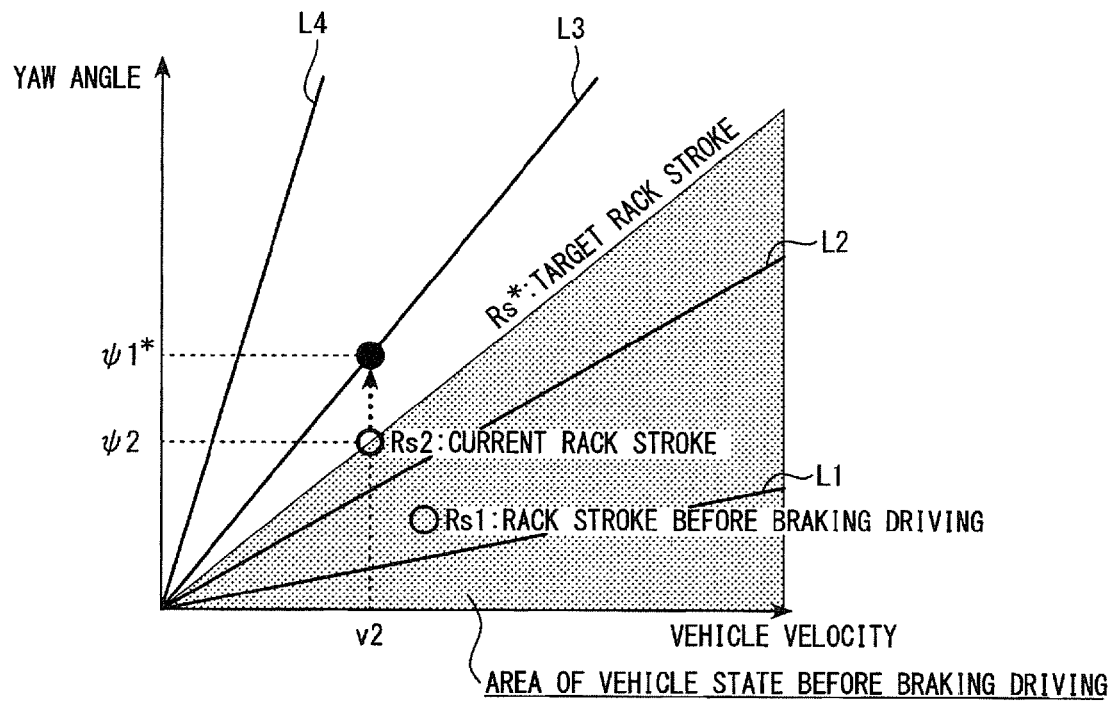
FIG. 38 is a characteristic line map illustrating a target value calculation map illustrating the relationship between a vehicle velocity and a yaw angle, in which a target rack stroke is used as a parameter, which shows a case where a vehicle is over-steered.
Figure 39:
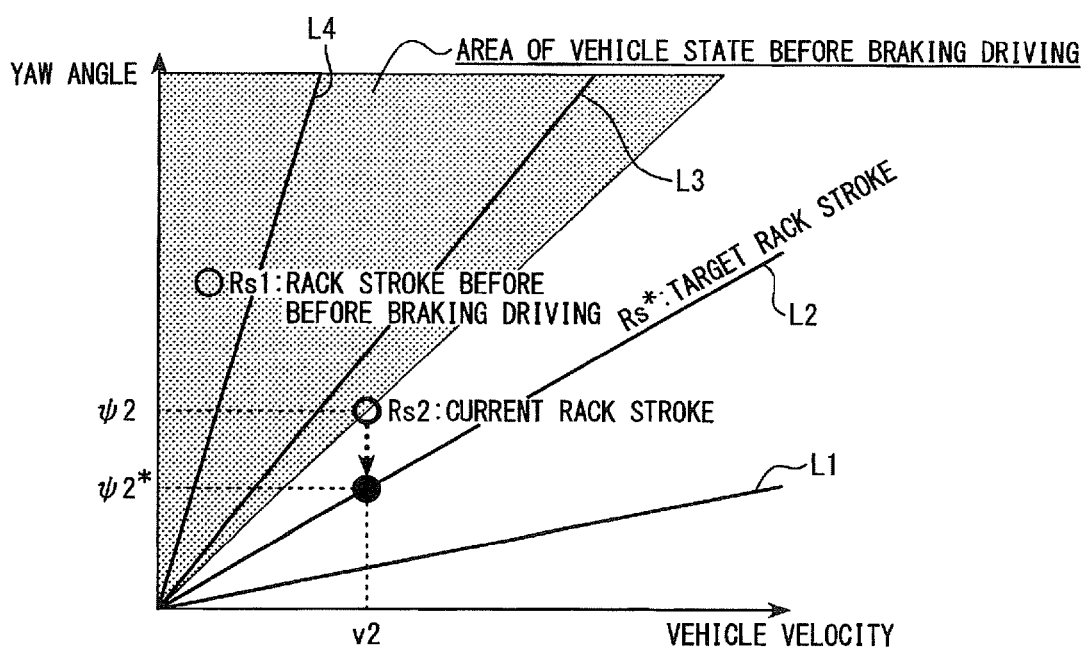
FIG. 39 is a characteristic line map illustrating a target value calculation map illustrating the relationship between a vehicle velocity and a yaw angle, in which a target rack stroke is used as a parameter, which shows a case where a vehicle is under-steered.

The target rack stroke calculator 53R calculates a target rack stroke Rs* which is a target turning amount based on the vehicle velocity V and the yaw angle ψ with reference to a target rack stroke calculation map shown in FIGS. 38 and 39. Here, as shown in FIGS. 38 and 39, the target rack stroke calculation map has a configuration in which a transverse axis represents a vehicle velocity V2, and a longitudinal axis represents a yaw angle ψ2. Here, plural target turning amount characteristic lines L1 to L4 where the target rack stroke Rs is used as a parameter are set.

Further, in the turning acceleration state, the target rack stroke calculator 53R selects a target turning amount characteristic line Li where the yaw angle is larger than the yaw angle ψ2 at the vehicle velocity V2 with reference to the target rack stroke calculation map shown in FIG. 38, based on the vehicle velocity V2 and the yaw angle ψ2 after being in the turning acceleration state (after state change), and calculates a target rack stroke set in the selected target turning amount characteristic line Li (i=1 to 4) as the target rack stroke Rs*.

Further, in the turning braking state, the target rack stroke calculator 53R selects a target turning amount characteristic line Lj (j=1 to 4) where the yaw angle is smaller than the yaw angle ψ2 at the vehicle velocity V2 with reference to the target rack stroke calculation map shown in FIG. 39, based on the vehicle velocity V2 and the yaw angle ψ2 after being in the turning braking state (after state change), and calculates a target rack stroke set in the selected target turning amount characteristic line Lj as the target rack stroke Rs*.

Furthermore, when there is a state change which is the turning acceleration state or the turning braking state, and when the determination result of the steering direction determining section 53S indicates the turning increase direction, the target rack stroke calculator 53R selects the target turning amount characteristic line Li where the yaw angle is larger than the yaw angle ψ2 at the vehicle velocity V2 with reference to the target rack stroke calculation map shown in FIG. 38, based on the vehicle velocity V2 and the yaw angle ψ2 after the state change, similar to the turning acceleration state, and calculates the target rack stroke set in the selected target turning amount characteristic line Li as the target rack stroke Rs*.

Furthermore, when there is the state change which is the turning acceleration state or the turning braking state, and when the determination result of the steering direction determining section 53S indicates the returning direction, the target rack stroke calculator 53R selects the target turning amount characteristic line Lj where the yaw angle is smaller than the yaw angle ψ2 at the vehicle velocity V2 with reference to the target rack stroke calculation map shown in FIG. 39, based on the vehicle velocity V2 and the yaw angle ψ2 after the state change, similar to the turning braking state, and calculates the target rack stroke set in the selected target turning amount characteristic line Lj as the target rack stroke Rs*.

Further, the target yaw angle calculator 53Y calculates the yaw angle ψ at the vehicle velocity V2 after state change as a target yaw angle ψ* using the target turning amount characteristic line Li or Lj selected by the target rack stroke calculator 53R. The target yaw angle calculator 53Y may select the target turning amount characteristic line Li or Lj with reference to the target rack stroke calculation map shown in FIG. 38 or 39, based on the vehicle velocity V2 and the yaw angle ψ2 after state change, independently of the target rack stroke calculator 53R, and may calculate the target yaw angle ψ* based on the selected target turning amount characteristic line Li or Lj.

Further, the yaw angle controller 53C performs a yaw angle control for controlling the turning actuator 8 so that the rack stroke of the rack shaft 14 and the target rack stroke Rs* calculated by the target rack stroke calculator 53R match each other.

Further, the yaw angle controller 53C continues the yaw angle control until a yaw angle ψ3 after the yaw angle control and the target yaw angle ψ* calculated by target yaw angle calculator match each other, a yaw angle deviation ψ2 which is an absolute value of a value obtained by subtracting the yaw angle ψ3 after the yaw angle control from a yaw angle ψ1 before being in the turning state becomes smaller than a yaw angle deviation Δψ1 which is an absolute value of a value obtained by subtracting the yaw angle ψ2 after the state change after being in the acceleration state or the braking state from the yaw angle ψ1 before being in the turning state, and the yaw angle ψ3 after the yaw angle control becomes "0", or until the acceleration state or the braking state is eliminated.

That is, when the vehicle enters the acceleration state or the deceleration state during turning traveling, the yaw angle controller 53C executes the yaw angle control process for controlling the turning actuator 8 so as to eliminate the toe angle change.

Figure 35:
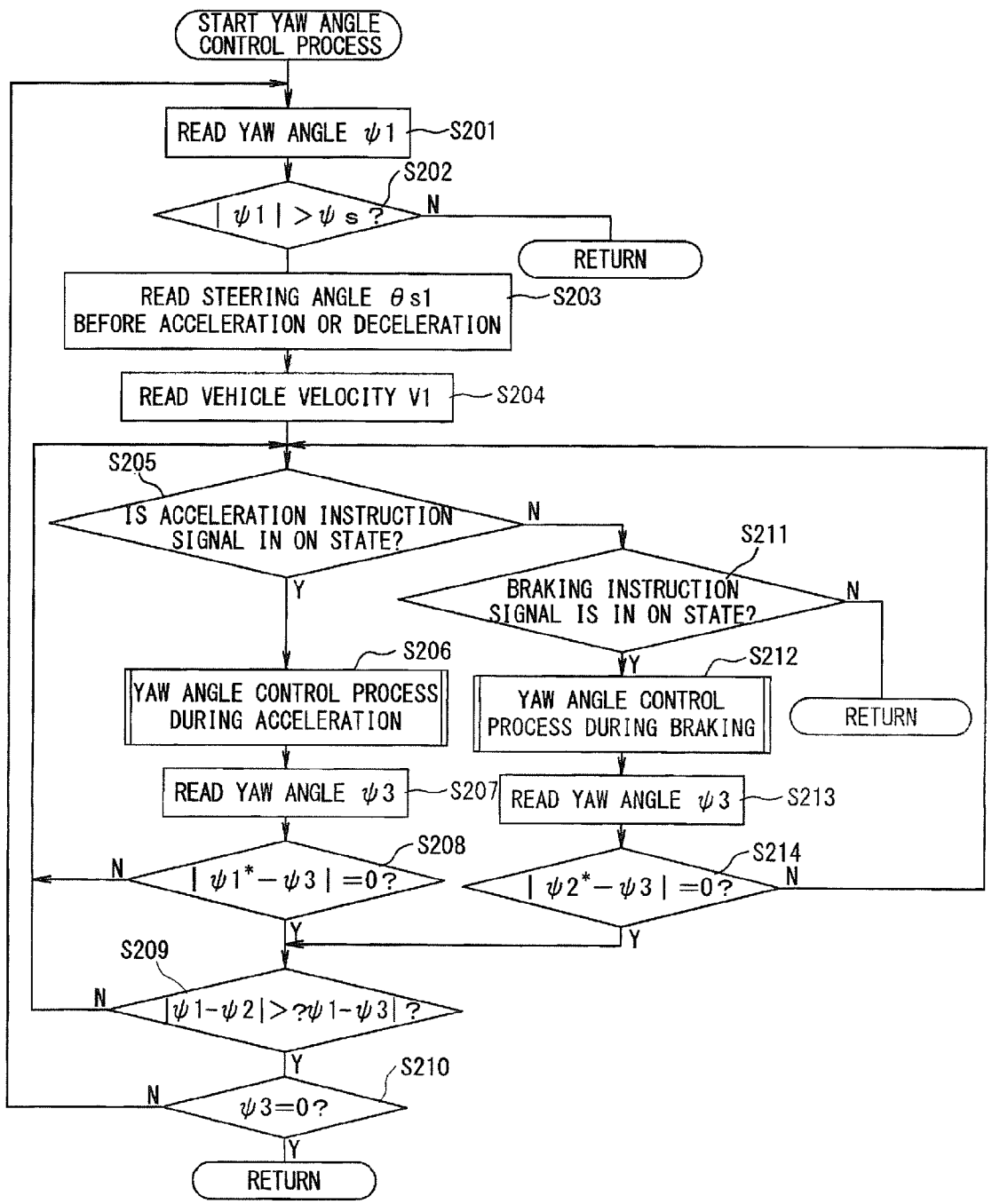
FIG. 35 is a flowchart illustrating an example of a procedure of a yaw angle control process according to the seventh embodiment of the invention.
Figure 36:
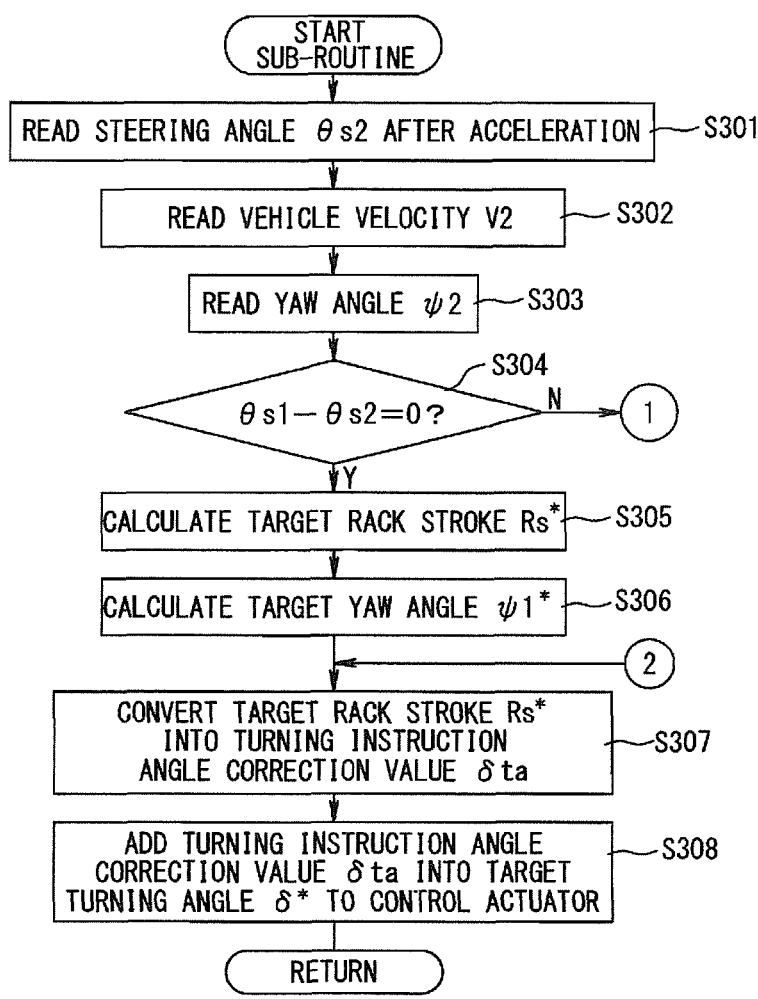
FIG. 36 is a flowchart illustrating a specific example of a procedure of a yaw angle control process during acceleration in FIG. 35.
Figure 37:
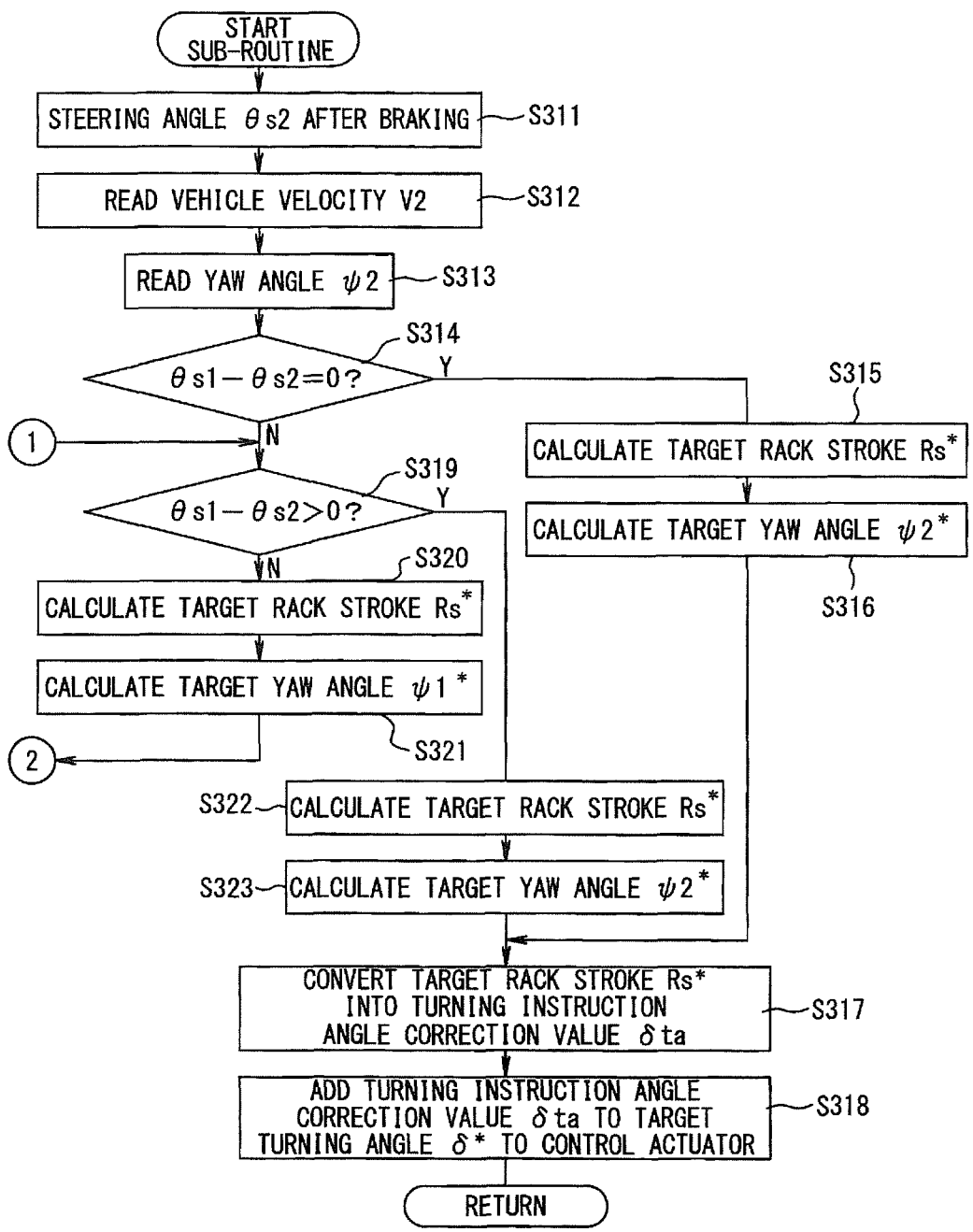
FIG. 37 is a flowchart illustrating a specific example of a procedure of a yaw angle control process during deceleration in FIG. 35.

The yaw angle control process is executed as a timer interruption process executed every predetermined time (for example, 1 μsec). The yaw angle control process is expressed as shown in FIG. 35 to FIG. 37, including the processes of the turning state detector 53A, the acceleration state detector 53D, and the braking state detector 53B.

In the yaw angle control process, first, the yaw angle ψ1 before turning detected by the yaw angle sensor 22a is read in step S201, and is stored in the steering angle storing section 53b connected to the yaw angle controller 53C.

Then, the procedure progresses to step S202 to determine whether an absolute value of the read yaw angle ψ1 before turning exceeds a threshold value ψs close to zero so that the vehicle is in the turning state. When |ψ1|≤ψs, it is determined that the vehicle is not in the turning state, and the current timer interruption process is terminated to return to the predetermined main program.

On the other hand, when the determination result in S202 is |ψ1|>ψs, it is determined that the vehicle is in the turning state, and the procedure progresses to step S203. Here, a steering angle θs1 before acceleration detected by the steering angle sensor 4 is read and is stored in the steering angle storing section 53b connected to the yaw angle controller 53C, and then, the procedure progresses to step S204.

In step S204, a vehicle velocity V1 acquired by the vehicle state parameter acquisition unit 21 is read, and is stored in the vehicle velocity storing section 53c connected to the yaw angle controller 53C, and the procedure progresses to step S205.

In step S205, it is determined whether the acceleration instruction signal Sd in the ON state indicating the acceleration state is input from the drive control unit 23 mounted in the vehicle. When the acceleration instruction signal Sd is in the ON state, it is determined that the vehicle is in the acceleration state, and the procedure progresses to step S206.

In step S206, the yaw angle control process during acceleration shown in FIG. 36 is executed, and then, the procedure progresses to step S207.

In step S207, the yaw angle ψ3 after the yaw angle control detected by the yaw angle sensor 22a is read, and then, the procedure progresses to step S208 to determine whether an absolute value of a value obtained by subtracting the yaw angle ψ3 after the yaw angle control read in step S14 from the target yaw angle ψ1* calculated in step S305 in FIG. 36 (to be described later) is zero or not. When the determination result is |ψ1≤ψs it is determined that the yaw angle ψ3 after the yaw angle control does not approximately match the target yaw angle ψ1*, the procedure returns to step S205. When |ψ1*−ψ3|=0, it is determined that the yaw angle ψ3 after the yaw angle control approximately matches the target yaw angle ψ1* and reaches a necessary yaw angle, and the current timer interrupting process is terminated to return to the predetermined main program.

On the other hand, when the determination result in step S205 indicates that the acceleration instruction signal Sd is in an OFF state, the procedure progresses to step S211 to determine whether the braking instruction signal Sb output to the pressure control unit 20 from the control/drive circuit unit 26 is in an ON state. When the braking instruction signal Sb is in an OFF state, the current timer interrupting process is terminated to return to the predetermined main program. Further, when the braking instruction signal Sb is in the ON state, the procedure progresses to step S212.

In step S212, the yaw angle control process during braking shown in FIG. 37 is executed, and then, the procedure progresses to step S213. In step S213, the yaw angle ψ3 after the yaw angle control detected by the yaw angle sensor 22a is read, and then, the procedure progresses to step S214 to determine whether an absolute value of a value obtained by subtracting the yaw angle ψ3 after the yaw angle control read in step S213 from a target yaw angle ψ2* calculated in step S316 in FIG. 37 (to be described later) is zero or not. When the determination result is |ψ2*−ψ3|>0, it is determined that the yaw angle ψ3 after the yaw angle control does not approximately match the target yaw angle ψ2*, the procedure returns to step S205. When |ψ2*−ψ3|=0, it is determined that the yaw angle ψ3 after the yaw angle control matches the target yaw angle ψ2* and reaches a necessary yaw angle, the current timer interrupting process is terminated to return to the predetermined main program.

Further, in the yaw angle control process during acceleration executed in step S206 in FIG. 35, as shown in FIG. 36, first, in step S301, a steering angle θs2 after acceleration detected by the steering angle sensor 4 is read, and then, the procedure progresses to step S302 to read a vehicle velocity V2 after acceleration from the vehicle state parameter acquisition unit 21. Then, the procedure progresses to step S303 to read a yaw angle ψ2 after acceleration detected by the yaw angle sensor 22a, and then, the procedure progresses to step S304.

In step S304, a steering angle θs1 before acceleration or deceleration stored in the steering angle storing section 53b is read, and it is determined whether a value obtained by subtracting a steering angle θs2 after acceleration from the steering angle θs1 before acceleration is zero or not. When θs1−θs2=0, it is determined that the vehicle is in a steering wheel holding state where a driver does not steer the steering wheel 2 in the turning increase direction or in the returning direction, and the procedure progresses to step S305.

In step S305, the target rack stroke Rs* necessary in turning acceleration is calculated with reference to the target rack stroke calculation map which is the target turning amount calculation map shown in FIG. 38, based on the vehicle velocity V2 after acceleration and the yaw angle ψ2 after acceleration. That is, a closest characteristic line Li (i=1 to 4) where the yaw angle is larger than the current yaw angle ψ2 at the current vehicle velocity V2 is selected, and a target rack stroke Lsi set in the selected characteristic line Li is calculated as the target rack stroke Rs*.

Then, the procedure progresses to step S306 to calculate the yaw angle at the current vehicle velocity V2 in the characteristic line Li selected in step S305 as the target yaw angle ψ1*, and the procedure progresses to step S307.

In step S307, the set target rack stroke Rs* is converted into the turning angle correction value δta with respect to the target turning angle δ* generated by the turning actuator 8 and output from the above-described target turning angle calculator 51, and then, the procedure progresses to step S308. The turning angle correction value δta is added to the target turning angle δ* to perform the yaw angle control for controlling the turning actuator 8. Then, the yaw angle control during acceleration is terminated, and then, the procedure progresses to step S207 in FIG. 35.

Further, when the determination result of step S304 is θs1−θs2≠0, it is determined that the driver steers the steering wheel 2 in the turning increase direction or in the returning direction, and then, the procedure progresses to step S320 in the yaw angle control process during braking shown in FIG. 37.

Further, in the yaw angle control process during braking executed in step S212 in FIG. 35, as shown in FIG. 37, first, in step S311, the steering angle θs2 detected by the steering angle sensor 4 is read, and then, the procedure progresses to step S312 to read the vehicle velocity V2 after braking from the vehicle state parameter acquisition unit 21. Then, the procedure progresses to step S313 to read the yaw angle ψ2 after braking detected by the yaw angle sensor 22a, and then, the procedure progresses to step S314.

In step S314, the steering angle θs1 before acceleration or deceleration stored in the steering angle storing section 53b is read, and it is determined whether the value obtained by subtracting the steering angle θs2 after braking from the steering angle before acceleration θs1 is zero or not. When θs1−θs2=0, it is determined that the vehicle is in the steering wheel holding state where the driver does not steer the steering wheel 2 in the turning increase direction or in the returning direction, and the procedure progresses to step S315.

In step S315, the target rack stroke Rs* necessary in turning braking is calculated with reference to the target rack stroke calculation map which is the target turning amount calculation map shown in FIG. 39, based on the vehicle velocity V2 after acceleration and the yaw angle ψ2 after acceleration. That is, a closest characteristic line Lj (j=1 to 4) where the yaw angle is smaller than the current yaw angle ψ2 at the current vehicle velocity V2 is selected with reference to FIG. 39, and a target rack stroke Rsj set in the selected characteristic line Lj is set as the target rack stroke Rs*.

Then, the procedure progresses to step S316 to calculate the yaw angle at the current vehicle velocity V2 in the characteristic line Lj selected in step S315 as the target yaw angle ψ2*, and then, the procedure progresses to step S317.

In step S317, the set target rack stroke Rs* is converted into the turning angle correction value δta with respect to the target turning angle δ* generated by the turning actuator 8 and output from the above-described target turning angle calculator 51, and then, the procedure progresses to step S318. The turning angle correction value δta is added to the target turning angle δ* to perform the yaw angle control for controlling the turning actuator 8, and the yaw angle control process during braking is terminated, and then, the procedure progresses to step S213 in FIG. 35.

Further, when the determination result of step S314 is θs1−θs2≠0, it is determined that the driver steers the steering wheel 2 in the turning increase direction or in the returning direction, and the procedure progresses to step S319.

Further, in step S319, the steering angle θs1 before acceleration or deceleration stored in the steering angle storing section 53b is read, and it is determined whether the value obtained by subtracting the steering angle θs2 after acceleration or after braking from the steering angle θs1 before acceleration or deceleration is positive or not. When the determination result is θs1−θs2<0, it is determined that the driver steers the steering wheel 2 in the turning increase direction for over-steering, and then, the procedure progresses to step S320.

In step S320, the target rack stroke Rs* necessary for over-steering is calculated with reference to the target rack stroke calculation map which is the target turning amount calculation map shown in FIG. 38, based on the vehicle velocity V2 after braking and the yaw angle ψ2 after acceleration or after braking. That is, a closest characteristic line Li (i=1 to 4) where the yaw angle is larger than the current yaw angle ψ2 at the current vehicle velocity V2 is selected with reference to FIG. 38, and a target rack stroke Rsi set in the selected characteristic line Li is calculated as the target rack stroke Rs*.

Then, the procedure progresses to step S321 to calculate the yaw angle at the current vehicle velocity V2 in the characteristic line Li selected in step S320 as the target yaw angle ψ1*, and then, the procedure progresses to the above-described step S307 in FIG. 36.

Further, when the determination result of step S319 is θs1−θs2>0, it is determined that the driver steers the steering wheel 2 in the returning direction for under-steering, and the procedure progresses to step S322.

In step S322, the target rack stroke Rs* necessary in turning braking is calculated with reference to the target rack stroke calculation map which is the target turning amount calculation map shown in FIG. 39, based on the vehicle velocity V2 after braking and the yaw angle ψ2 after acceleration or after braking. That is, a closest characteristic line Lj (j=1 to 4) where the yaw angle is smaller than the current yaw angle ψ2 at the current vehicle velocity V2 is selected with reference to FIG. 39, and a target rack stroke Rsj set in the selected characteristic line Lj is calculated as the target rack stroke Rs*.

Then, the procedure progresses to step S323 to calculate the yaw angle at the current vehicle velocity V2 in the characteristic line Lj selected in step S322 as the target yaw angle ψ2*, and then, the procedure progresses to the above-described step S317.

In the yaw angle control process shown in FIG. 35 to FIG. 37, the processes of steps S201 and S202 correspond to the turning state detector 53A, the process of step S205 corresponds to the acceleration state detector 53D, the processes of step S211 corresponds to the braking state detector 53B, the processes of steps S301 to S308, steps S208 to S210, and steps S311 to S323 correspond to the yaw angle controller 53C, the processes of steps S305, S315, S320, and S322 correspond to the target rack stroke calculator 53R, the processes of steps S306, S315, S321, and S320 correspond to the target yaw angle calculator 53Y, and the process of step S319 corresponds to the steering direction determining section 53S.

The actuator controller 54 includes a turning angle deviation calculator 61 that calculates a turning angle deviation Δδ, a turning motor controller 62, a current deviation calculator 63, and a motor current controller 65.

The turning angle deviation calculator 61 subtracts an actual turning angle δr based on a turning actuator angle output from the turning actuator angle sensor 9 from a target turning angle correction value δ*a output from an adder 56e to calculate the turning angle deviation Δδ, and outputs the calculated turning angle deviation Δδ to the turning motor controller 62.

The turning motor controller 62 calculates a drive instruction current im* of a turning motor 8a that forms the steering actuator 8 so that the input turning angle deviation Δδ becomes zero, and outputs the calculated drive instruction current im* to the current deviation calculator 63.

The current deviation calculator 63 subtracts a motor current imr output from the motor current detector 64 that detects a motor current supplied to the turning motor 8a that forms the turning actuator 8 from the input drive instruction current im* to calculate a current deviation Δi, and outputs the calculated current deviation Δi to the motor current controller 65.

The motor current controller 65 performs a feedback control so that the input current deviation Δi becomes zero, i.e., the actual motor current imr follows the drive instruction current im*, and outputs the turning motor drive current imr to the turning motor 8a.

(Operation of Seventh Embodiment)

Next, an operation of the seventh embodiment will be described with reference to FIGS. 40 to 42.

(Straight Traveling Operation)

Here, it is assumed that the steering wheel 2 maintains the neutral position for straight traveling.

In the straight traveling state, the target turning angle δ* calculated by the target turning angle calculator 51 becomes zero. Thus, the rack shaft 14 is controlled to maintain the neutral position by the turning motor 8a controlled by the actuator controller 54, so that the turning angles δr of the turning wheels 17FR and 17FL are controlled to become zero through the tie rods 15. Here, since the steering wheel 2 maintains the neutral position, the yaw angle ψ1 of the vehicle detected by the yaw angle sensor 22a is zero. Since the gravity central point side slip angle β becomes zero and the yaw angle ψ also becomes zero as the turning angle δr becomes zero, the self aligning torque Tsa calculated according to Formula (1) by the straightness complementing section 55a becomes zero.

Since the disturbance compensating value Adis for suppressing the disturbance is calculated in the disturbance compensating section 55b, the disturbance compensating value Adis becomes zero when the disturbance does not occur.

Further, in the yaw angle controller 53C, since the vehicle is not in the turning state but is in the straight traveling state so that the yaw angle ψ1 is zero, it is not determined that the vehicle is in the turning traveling state. Thus, the rack stroke control for correcting the rack stroke is not performed, and the target turning angle correction value δ*a obtained by adding the correction values δa and δta to the target turning angle δ* becomes zero.

Accordingly, the turning angle deviation Δδ output from the turning angle deviation calculator 61 of the actuator controller 54 also becomes zero, and the motor current instruction value im* output from the turning motor controller 62 also becomes zero. Thus, the motor current imt is not output from the motor current controller 65, and the turning motor 8a maintains the stop state, and the rack shaft 14 maintains the neutral position, so that the turning angle δt of the turning wheels 17FR and 17FL is controlled to become "0".

In the straightness traveling state, if at least one of the turning wheels 17FR an 17FL is fit in a wheel track or passes on a manhole cover so that at least one of the turning wheels 17FR and 17FL is turned or a yaw angle is generated, the self aligning torque Tsa calculated by the straightness complementing section 55a increases. Here, when the king pin axis KS is set to pass through the tire contact surface in a state where the steering wheel 2 is at the neutral position as described in the suspension device 1B to improve the turning responsiveness, the self aligning torque Tsa generated by the suspension device 1B becomes insufficient.

However, in the present embodiment, since the self aligning torque is calculated based on the above-described Formula (1), by setting the caster trail ϵc in Formula (1) to the same value as that of a normal suspension device, it is possible to calculate a value corresponding to the caster trail ϵc as the calculated self aligning torque Tsa.

Further, the calculated self aligning torque Tsa is multiplied by a gain Ksa to calculate a straightness correction value Asa, and the straightness correction value Asa is supplied to the delay controller 56. Here, since the vehicle is in the straight traveling state, the delay controller 56 sets the gain Ga to "1" by the gain adjustor 56c without detecting the steering start by the steering start detector 56a, and thus, the straightness correction value Asa is supplied to the adder 56e as it is.

Thus, as the target turning angle δ* is corrected by the straightness correction value Asa, the turning motor 8a that forms the turning actuator 8 is drive-controlled by the actuator controller 54 to generate a turning torque corresponding to the self aligning torque Tsa, and the generated turning torque is transmitted to the turning wheels 17FR and 17FL through the rack shaft 14 and the tie rods 15.

Thus, the self aligning torque Tsa is generated in the turning wheels 17FR and 17FL, so that the lack of the self aligning torque to the suspension device 1 is complemented to secure the straightness of the vehicle.

(Turning Start Operation)

However, if a state where the straight traveling state where the steering wheel 2 maintains the neutral position is changed to a state where the steering wheel 2 is steered rightward (or leftward), the change from the straight traveling state to the turning state due to the steering is detected by the steering start detector 56a.

Thus, a control delay signal that is in an ON state for a predetermined time, for example, 0.1 seconds is output to the gain adjustor 56c from the monostable circuit 56b. Accordingly, the control gain Ga is set to "0" in the gain adjustor 56c while the control delay signal continues the ON state. Thus, the multiplication output that is output from the multiplier 56d becomes "0", and the output of the straightness securing control value δa to the adder 56e is stopped.

Accordingly, since the control gain Ga is set to "0" during an initial response period T1 of 0.1 seconds from a time point when the steering is started from the neutral position of the steering wheel 2, the multiplication output that is output from the multiplier 56d becomes "0", and the straightness securing control for the target turning angle δ* is stopped as indicated by the solid line in FIG. 15(b).

Thus, the steering angle θs detected by the steering angle sensor 4 is supplied to the target turning angle calculator 51, and the target turning angle δ* calculated by the target turning angle calculator 51 is supplied to the turning angle deviation calculator 61 as it is. Thus, the turning motor 8a is rotationally driven so as to match the target turning angle δ*. During this period, the straightness securing control in the straightness securing section 55 is stopped.

Accordingly, in the initial response period T1, the road surface contact point of the king pin axis KS is set to the contact central position in the contact surface of the tire, and the turning is started by the suspension device 1B in which the caster angle is set to zero.

Here, the caster angle of the suspension device 1B is set to zero. The relationship between the caster angle, the turning responsiveness, and the handling stability is in a state where the turning responsiveness is high when the caster angle is zero, as shown in FIG. 14(a), but in this case, the handling stability cannot be secured. That is, the steering responsiveness and the handling stability with respect to the caster angle have a trade-off relationship.

Thus, in the initial state where the steering is started from the neutral position, the straightness securing control due to the steer-by-wire control is not executed, and thus, the initial turning is provided by the suspension device 1B.

In the initial response period T1, as described above, since the suspension device 1B has the caster angle of 0 degrees and the high handling responsiveness, as indicated by the characteristic line L1 shown by the solid line in FIG. 15(a), it is possible to obtain a turning response characteristic (yaw angle) higher than a turning response characteristic (yaw angle) in a vehicle having a general steer-by-wire type steering system indicated by the characteristic line L2 shown by the single dot chain line. Here, since the turning angle is changed corresponding to a steering angle change due to the steering of the steering wheel 2 of the driver, the driver does not feel discomfort.

However, if the turning is continued in excess of the initial response period T1 only using the turning responsiveness based on the suspension device 1B, as indicated by the characteristic line L3 shown by the broken line in FIG.

15(a), the turning responsiveness of the vehicle due to the steering in the middle response period T2 and the last response period T3 becomes sensitive. Further, the rolling-in phenomenon of the vehicle toward the inside over the middle response period T2 to the last response period T3 increases.

Thus, in the above first embodiment, as shown in FIG. 15(b), for example, when 0.1 seconds elapse from the initial response period T1, the straightness securing control for the target turning angle δ* in the straightness securing section 55 formed by the straightness complementing section 55a and the disturbance compensating section 55b is started in a step form. Thus, it is possible to suppress the turning responsiveness of the vehicle due to the suspension device 1B to suppress staggering of the vehicle, and as indicated by the dotted line in FIG. 14B, it is possible to complement the straightness of the suspension device 1B by the steer-by-wire control to secure the handling stability.

Then, for example, when 0.3 seconds elapse after the middle response period T2, the turning response characteristic is further suppressed compared with a general turning response characteristic of the vehicle by the straightness securing control in the straightness securing section 55, to thereby make it possible to obtain the under-steering tendency. Thus, as indicated by the characteristic line L1 shown by the solid line in FIG. 15(a), it is possible to enhance the handling stability, and to realize an ideal turning response characteristic of the vehicle indicated by the characteristic line L1.

(Turning Acceleration Operation)

In the turning traveling state of the vehicle, in the yaw angle controller 53C, in the above-described yaw angle control process in FIG. 35, the yaw angle ψ1 is read in step S201 and is stored in the steering angle storing section 53b, and then, the procedure progresses to step S202, so that the vehicle is in the turning traveling state. Thus, the procedure progresses to step S203 to read the steering angle θs1 before acceleration or deceleration and to store the steering angle θs1 before acceleration or deceleration in the steering angle storing section 53b. Then, the procedure progresses to step S204 to read the vehicle velocity V1 before acceleration or deceleration, and to write the vehicle velocity V1 before acceleration or deceleration in the vehicle velocity storing section 53c.

However, since both the acceleration instruction signal Sd and the braking instruction signal Sb are in the OFF state, the processes up to the termination of the timer interruption process in this state are repeated. Thus, the yaw angle ψ1 before acceleration or deceleration is updated and stored in the steering angle storing section 53b, the steering angle θs1 before acceleration or deceleration is updated and stored in the steering angle storing section 53b, and the vehicle velocity V1 before acceleration or deceleration is updated and stored in the vehicle velocity storing section 53c.

In the turning traveling state, if the driver steps on a brake pedal, the drive control unit 23 is operated so that the acceleration control is started with respect to the drive wheels, the acceleration state signal Sd in the ON state is output to the control/drive circuit unit 26.

Thus, in the yaw angle controller 53C, in the process of FIG. 35, the procedure progresses to step S206 from step S205 to execute the yaw angle control process during acceleration shown in FIG. 36. In the yaw angle control process during acceleration, the steering angle θs2 after acceleration is read (step S301), the vehicle velocity V2 after acceleration is read (step S302), and then, the yaw angle ψ2 after acceleration is read (step S303).

Then, it is determined whether there is a change in the steering angles θs1 and θs2 before and after acceleration (step S304). Here, when the vehicle is in the steering wheel holding state where the driver does not steer the steering wheel 2 in the turning increase direction or in the returning direction, since the steering angles θs1 and θs2 before and after acceleration match each other, the procedure progresses to step S305 from step S304 to calculate the target yaw angle ψ1* with reference to the target rack stroke calculation map shown in FIG. 38 based on the vehicle velocity V2 after acceleration and the yaw angle ψ2 after acceleration.

Figure 40:
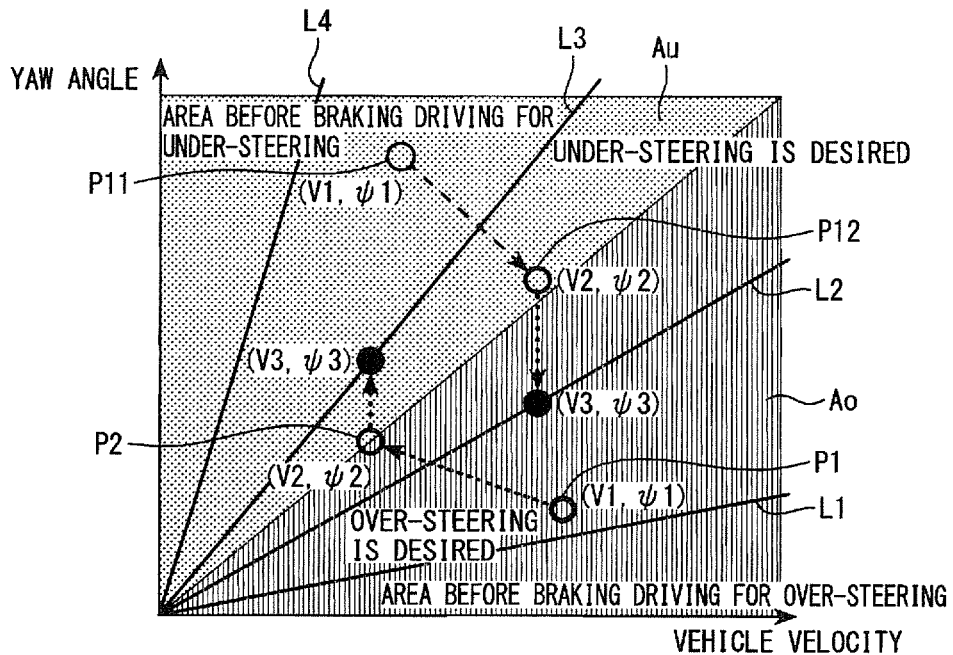
FIG. 40 is a diagram illustrating an operation when directionality of a yaw angle change is not changed before and after a yaw angle control.

In the calculation of the target yaw angle ψ1*, it is assumed that a position P1 before acceleration indicated by the vehicle velocity V1 and the yaw angle ψ1 before acceleration in the turning state is disposed between steering characteristic lines L1 and L2, as shown in FIG. 40. If the vehicle enters the acceleration state from the position P1 before turning, since the suspension device 1B can perform the turning with a light turning force as described above at a position P2 after acceleration indicated by the vehicle velocity V2 after acceleration and the yaw angle ψ2 after acceleration, the vehicle velocity V2 after acceleration becomes greater than the vehicle velocity V1 before acceleration, and the yaw angle ψ2 after acceleration is changed from the yaw angle ψ1 before acceleration so that the toe angle of the turning wheels 17FR and 17FL is directed toward the outside of the turning due to the acceleration of the vehicle. As a result, the yaw angle ψ2 after acceleration becomes smaller than the yaw angle ψ1 before acceleration, so that the vehicle shows the under-steering tendency.

The closest steering characteristic line L3 having a larger yaw angle compared with the yaw angle ψ2 after acceleration at the vehicle velocity V2 after acceleration is selected from the position P2 after acceleration, and the rack stroke necessary at the vehicle velocity V2 after acceleration set in the selected steering characteristic line L3 is calculated as the target rack stroke Rs*.

Further, the yaw angle at the current vehicle velocity V2 in the selected steering characteristic line L3 is calculated as the target yaw angle ψ* (step S11).

Further, the calculated target rack stroke Rs* is converted into the turning angle correction value δta for performing the yaw angle control with respect to the target turning angle δ* calculated in the target turning angle calculator 51 (step S12). Further, the converted turning angle correction value δta is added to the target turning angle δ*, and the result is output to the actuator controller 54 (step S13).

Thus, in the actuator controller 54, the turning actuator 8 is controlled to give a toe angle change for eliminating the toe angle change toward the outside of the turning due to the configuration of the suspension device 1B in which the turning wheels 17FR and 17FL can be turned with a light turning force, so that the rack shaft 14 strokes by the target rack stroke Rs*, and the stroke is supplied to the turning wheels 17FR and 17FL through the tie rods 15.

Figure 42A:
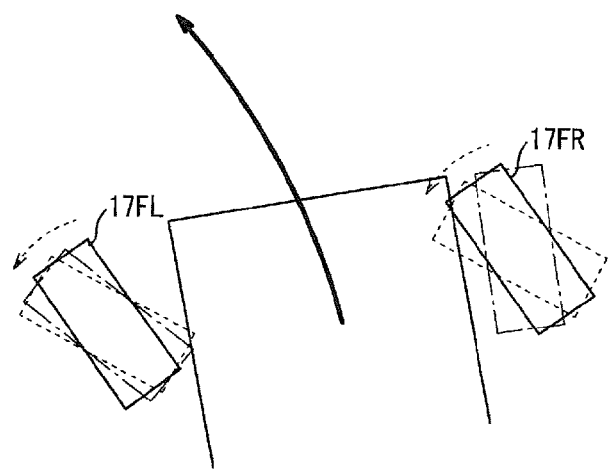
FIGS. 42A to 42C are diagrams illustrating an operation according to the seventh embodiment.
Figure 42B:
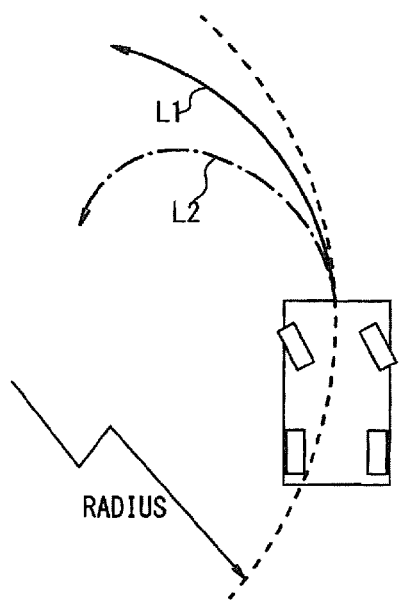
Figure 42C:
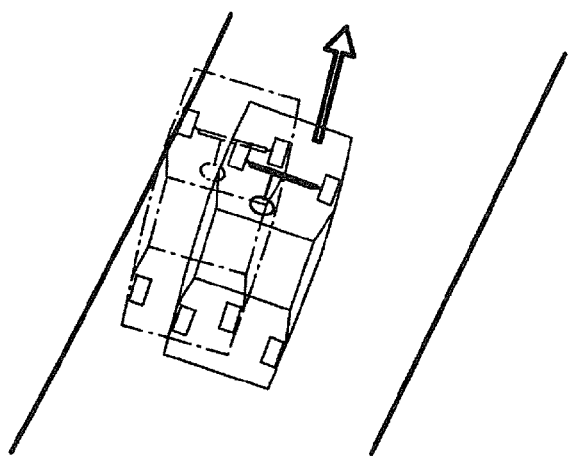

Accordingly, when the suspension device 1B capable of performing the turning with the light turning force is applied, when the yaw angle control is not performed, and when the vehicle enters to the acceleration state from a state indicated by a solid line in FIG. 42A which is a state where the acceleration is not performed in the turning state, the turning wheels 17FR and 17FL are in a state where the toe angle change of the turning wheel 17FL on the outer turning wheel side becomes large in the toe-out direction, as indicated by a single dot chain line in FIGS. 42A to 42C.

However, in the present embodiment, as the above-described yaw angle control is performed during turning acceleration, when the state indicated by the solid line in FIG. 42A is changed to the acceleration state, the toe angle of the turning wheel 17FL on the outer turning wheel side is controlled in a toe-in direction toward the inside of the turning as indicated by a dotted line, and accordingly, the inner turning wheel is controlled in the toe-out direction. Here, since the vehicle is being turned, the weight load of the vehicle applied to the turning wheels is large on the outer turning wheel side and is small on the inner turning wheel side, and thus, the influence on the turning behavior of the vehicle is scarcely generated even though the inner turning wheel is controlled in the toe-out direction.

Accordingly, according to the present embodiment, the toe angle change in the toe-out direction on the outer turning wheel side due to the suspension device 1B capable of turning the turning wheels with the light turning force is eliminated, so that the steering characteristic of the vehicle is controlled to show the over-steering tendency. Thus, in a state where the vehicle 1 travels and turns at a corner, it is possible to secure appropriate turning performance even in the acceleration state.

Further, in the present embodiment, as the turning actuator 8 is controlled, the rack stroke of the rack shaft 14 is controlled to cause the toe angle change. Thus, it is possible to prevent the problems in the related art techniques, for example, the technique in which the braking pressure on the inner turning wheel side is larger than the braking pressure on the outer turning wheel side by the braking device to generate the yaw angle that is directed toward the inside of the turning, or the technique in which the driving force of the outer turning wheel increases using the hydraulic clutch to increase the braking force on the inner turning wheel side, and thus, the response delay due to the hydraulic pressure control is not caused. Accordingly, it is possible to provide the high responsiveness during turning acceleration to change the toe angle of the turning wheels 17FR and 17FL, thereby controlling the vehicle in the over-steering state. Thus, it is possible to enhance the turning performance, and to enhance the handling stability.

Further, it is possible to perform the yaw angle control during turning acceleration by the yaw angle controller 53C provided in the turning control unit 50 that forms the steer-by-wire system. Thus, it is not necessary to set the longitudinal force (forward pulling) in the toe-in direction in the front-side suspension device 1B like a normal suspension device, and to set the longitudinal force (forward pulling) in the toe-out direction in the rear-side suspension device. Accordingly, it is possible to realize the front and rear suspension devices with a simple and light-weight configuration, and to enhance the degree of freedom in the layout.

In the related art techniques, since the toe angle control amount burdens the suspension device, for example, it is necessary to set the transverse link to be longer than the rack shaft in the vehicle width direction in a state where the transverse link and the rack shaft are arranged approximately in parallel. Thus, the degree of freedom in the layout of the suspension device decreases, its configuration becomes complicated, and the weight increases.

Then, the yaw angle $\psi3$ is read again (step S207), it is determined whether an absolute value of the yaw angle deviation obtained by subtracting the yaw angle $\psi3$ from the target yaw angle $\psi*$ is zero or not (step S208). When the determination result indicates that the yaw angle deviation is not "0", the procedure returns to step S205 to continue the yaw angle control.

Further, if the absolute value of the yaw angle deviation obtained by subtracting the yaw angle $\psi3$ from the target yaw angle $\psi*$ is zero, the procedure progresses to step S209 to determine whether an absolute value $|\psi1-\psi2|$ of a value obtained by subtracting a yaw angle $\psi2$ before the yaw angle control from a yaw angle $\psi1$ before turning is larger than an absolute value $|\psi1-\psi3|$ of a value obtained by subtracting the yaw angle $\psi3$ after the yaw angle control from the yaw angle $\psi1$ before turning (step S209). When the determination result is $|\psi1-\psi2|\leq|\psi1-\psi3|$, it is determined that the yaw angle change does not converge to the state before turning, the procedure progresses to step S205 to continue the yaw angle control.

Then, when the yaw angle deviation $|\psi1-\psi3|$ before and after the yaw angle control becomes smaller than the yaw angle deviation $|\psi1-\psi2|$ before and after acceleration, it is determined that the yaw angle change converges, and then, the procedure progresses to step S210 to determine whether the yaw angle $\psi3$ after the yaw angle control is "0". When the determination result is $\psi3\neq0$, the procedure returns to step S201, and when the determination result is $\psi3=0$, the current timer interruption process is terminated to return to the predetermined main program.

Further, as pedaling of an accelerator pedal is released, the acceleration instruction signal Sd output from the drive control unit 23 is in the OFF state, and when a brake pedal is opened and the braking instruction signal Sb is also in the OFF state, the current timer interruption process is terminated to return to the predetermined main program.

(Turning Braking Operation)

On the other hand, if the vehicle is in the turning state and the driver steps on the brake pedal to be in a braking state, the braking device is operated so that the vehicle enters the braking state where a braking force is applied to the respective vehicle wheels 17FR, 17FL, 17RR, and 17RL. In this way, if the vehicle is in the braking state, a braking instruction signal Sb output from the control/drive circuit unit 26 is in the ON state.

Thus, in the yaw angle controller 53C, in the processes of FIGS. 35 to 38, the procedure progresses to step S205 from step S204. Here, since the acceleration instruction signal Sd is in the OFF state, the procedure progresses to step S211, and since the braking instruction signal Sb is in the ON state, the procedure progresses to step S212 to execute the yaw angle control process during braking shown in FIG. 37.

In the yaw angle control process during braking, a steering angle θs2 after braking is read (step S311), a vehicle velocity V2 after braking is read (step S312), and then, a yaw angle $\psi2$ after braking is read (step S313).

Further, when there is no change in the steering angles θs1 and θs2 before and after braking, it is determined that the vehicle is in the steering wheel holding state where the driver does not steer the steering wheel 2 in the turning increase direction or in the returning direction, and the procedure progresses to step S315 from step S314 to calculate a target rack stroke Rs* with reference to a target yaw angle calculation map during braking shown in FIG. 39.

In the calculation of the target rack stroke Rs*, a closest characteristic line Lj (j=1 to 4) where the yaw angle is smaller than the current yaw angle $\psi2$ at the current vehicle velocity V2 is selected, and a target rack stroke Rsj set in the selected characteristic line Lj is calculated as the target rack stroke Rs*.

Further, the yaw angle in the selected characteristic line Lj at the current vehicle velocity V2 is calculated as a target yaw angle ψ2* (step S316).

Then, the calculated target rack stroke Rs* is converted into the turning angle correction value δta for performing the yaw angle control corresponding to the target turning angle δ* (step S317). Then, the converted turning angle correction value δta is added to the target turning angle δ*, and the result is output to the actuator controller 54 (step S318).

Thus, in the actuator controller 54, the turning actuator 8 is controlled so that a toe angle change for eliminating the yaw angle change before and after braking is given to the turning wheels 17FR and 17FL, so that the rack shaft 14 strokes by the target rack stroke Rs*, and the stroke is supplied to the turning wheels 17FR and 17FL through the tie rods 15.

Accordingly, the toe angle change toward the outside of the turning is performed so that the turning wheels 17FR and 17FL eliminate the yaw angle change, and the steering characteristic of the vehicle is controlled in an under-steering state as indicated by a curve L1 shown by a solid line in FIG. 42B. Thus, in a state where the vehicle 1 travels and turns at a corner as shown in FIG. 42C, even in the braking state, it is possible to suppress a movement amount in the vehicle width direction, and to maintain a travel lane for traveling.

Then, when the yaw angle control is not performed, the yaw rate increases as indicated by a single dot chain line in FIG. 42B to show an over-steering characteristic, and the movement amount toward the inside of the turning in the vehicle width direction increases as indicated by a single dot chain line in FIG. 42C, so that the vehicle moves toward an adjacent lane, which deteriorates the handling stability.

Further, in the present embodiment, since the rack stroke of the rack shaft 14 is controlled to cause the toe angle change as the turning actuator 8 is controlled, it is possible to control the vehicle to be in the under-steering state with high responsiveness during turning braking, and to enhance the handling stability, without causing response delay due to a hydraulic pressure control in a case where a braking pressure on an outer wheel side becomes larger than a braking pressure on an inner wheel side by the braking device to generate a yaw angle toward the outside of the turning, for example.

Further, it is possible to perform the yaw angle control during turning braking by the yaw angle controller 53C provided in the turning control unit 50 that forms the steer-by-wire system. Thus, in order to increase the longitudinal force compliance steering to the under-steering by the front-side suspension device 1B, for example, it is not necessary to set the transverse link to be longer than the rack shaft in the vehicle width direction in a state where the transverse link and the rack shaft are arranged approximately in parallel. Further, as the suspension characteristic, it is not necessary to set a longitudinal force toe characteristic in which the front-side suspension device is in a longitudinal force toe-out state and the rear-side suspension device is in a longitudinal force toe-in state. Accordingly, it is possible to realize the front and rear suspension devices with a simple and light-weight configuration.

Then, the yaw angle ψ3 is read again (step S213), and when an absolute value |ψ2*−ψ3| of a value obtained by subtracting the yaw angle ψ3 from the target yaw angle ψ2* is not zero, it is determined that the yaw angle control is not sufficient. Then, the procedure returns to step S205 to continue the torque control during braking.

Further, if the yaw angle ψ3 after the yaw angle control is equal to the target yaw angle ψ2*, the procedure progresses to step S209 from step S214. Thus, the yaw angle ψ3 after the yaw angle control becomes smaller than the yaw angle ψ2 after braking, and when the yaw angle ψ3 after the yaw angle control becomes "0", the yaw angle control during turning braking is terminated.

Similarly, as the brake pedal is opened to release the braking state, even when the braking instruction signal Sb is in the OFF state, the yaw angle control during turning braking is terminated.

(Operation During Driver Steering)

Further, when the driver steers the steering wheel 2 during turning acceleration or turning braking, the yaw angle control is performed depending on a driver's steering intension.

That is, if the driver steers the steering wheel 2 in the turning acceleration state or turning braking state, the procedure progresses to step S319 from step S314 of the yaw angle control process during braking or step S304 of the yaw angle control process during acceleration in FIG. 36.

Figure 41:
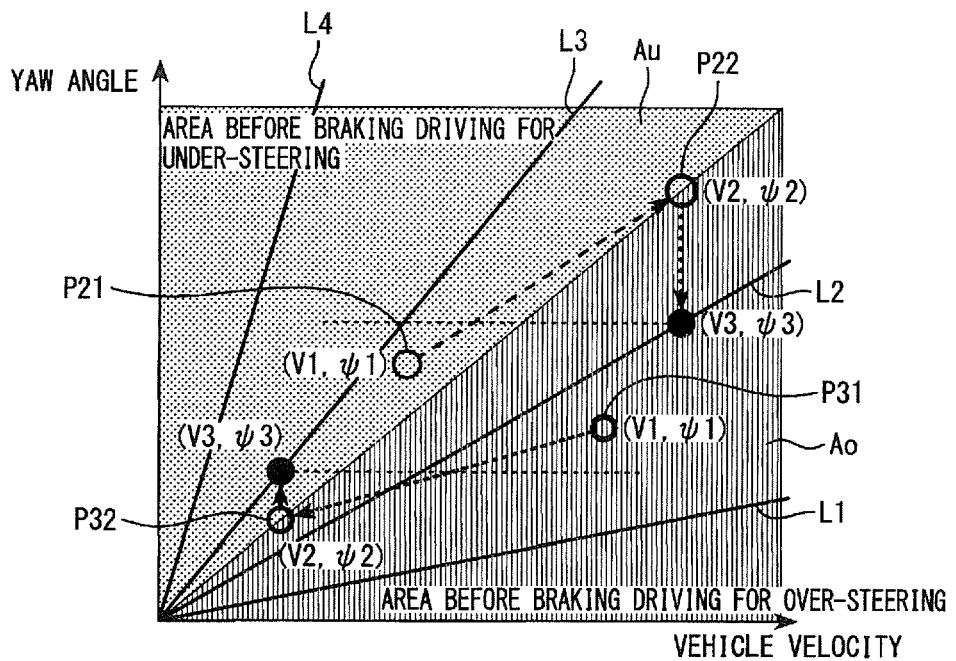
FIG. 41 is a diagram illustrating an operation when directionality of a yaw angle change is changed before and after a yaw angle control.

When the driver steers the steering wheel 2, and when coordinates indicated by a vehicle velocity V1 and a yaw angle ψ1 in the vehicle state before acceleration or braking are present in an area Ao for over-steering (OS) which is shown by gradation in FIGS. 40 and 41, it is considered that the steering wheel 2 is in a turning increase state. Contrarily, when the coordinates indicated by the vehicle velocity V1 and the yaw angle ψ1 in the vehicle state before acceleration or braking are present in an area Au for under-steering which is shown by thin gradation in FIGS. 40 and 41, it is considered that the steering wheel 2 is in a returning state.

Thus, in step S319, it is determined whether a value obtained by subtracting a steering angle θs2 after acceleration or a steering angle θs2 after braking from the steering angle θs1 before acceleration or deceleration is positive or not. Here, it is assumed that the vehicle state before acceleration or deceleration in the turning state is a state where the coordinates are at a point P1 in the area Ao for over-steering in FIG. 40, for example. In this state, for example, it is assumed that, as the vehicle enters the braking state and the steering wheel 2 is in the turning increase state, the vehicle velocity V1 is reduced to a vehicle velocity V2 and the yaw angle ψ1 increases to a yaw angle ψ2, so that the coordinates move to a point P2. In this state, since the steering wheel is in the turning increase state, the relationship of θs1−θs2<0 is established in step S319. Then, the procedure progresses to step S320.

In step S320, similar to the target yaw angle calculation process (step S305) in the acceleration state, as shown in FIG. 40, a closest target turning amount characteristic line L3 where the yaw angle is larger than the current yaw angle ψ2 at the current vehicle velocity V2 is selected, and a target rack stroke Rs3 set in the selected target turning amount characteristic line L3 is calculated as a target rack stroke Rs*.

Then, the procedure progresses to step S321 to calculate a yaw angle in the selected target turning amount characteristic line L3 at the vehicle velocity V2 as a target yaw angle ψ*.

Thus, the target rack stroke Rs* increases, and the turning angle of the turning wheel 17FR (or 17FL) on the outer turning wheel side is controlled in the toe-in direction. Thus, it is possible to set the steering characteristic of the vehicle of the vehicle to the over-steering state corresponding to the turning increase steering of the steering wheel 2 of the driver, and to obtain the steering characteristic of the vehicle corresponding to the steering of the driver.

Contrarily, it is assumed that the vehicle state before acceleration or deceleration in the turning state is a state where the coordinates are at a point P11 in the area Au for under-steering (US) in FIG. 40, for example. In this state, for example, it is assumed that, as the vehicle enters the acceleration state and the steering wheel 2 is in the returning state, the vehicle velocity V1 increases to a vehicle velocity V2 and the yaw angle ψ1 decreases to a yaw angle ψ2, so that the coordinates move to a point P12. In this state, since the steering wheel is in the returning state, the relationship of θs1−θs2>0 is established in step S319. Then, the procedure progresses to step S322.

In step S322, similar to the target yaw angle calculation process (step S315) in the braking state, as shown in FIG. 40, a closest target turning amount characteristic line L2 where the yaw angle is larger than the current yaw angle ψ2 at the current vehicle velocity V2 is selected, and a target rack stroke Rs2 set in the selected target turning amount characteristic line L2 is calculated as a target rack stroke Rs*.

Then, the procedure progresses to step S321 to calculate a yaw angle ψ2' in the selected target turning amount characteristic line L2 at the vehicle velocity V2 as a target yaw angle ψ*.

Thus, the target rack stroke Rs* decreases, and the turning angle of the turning wheel 17FR (or 17FL) on the outer turning wheel side is controlled in the toe-out direction. Thus, it is possible to set the steering characteristic of the vehicle of the vehicle to the under-steering state corresponding to the returning steering of the steering wheel 2 of the driver, and to obtain the steering characteristic of the vehicle corresponding to the steering of the driver.

Further, it is assumed that the vehicle state before acceleration or deceleration in the turning state is a state where the coordinates are at a point P21 in the area Au for under-steering (US) in FIG. 41, for example. In this state, for example, when the vehicle enters the acceleration state and the yaw angle ψ1 and the vehicle velocity V1 increase so that the coordinates move to a point P22, and in this state, when the steering wheel 2 is return-steered, the relationship of θs1−θs2>0 is established in step S319. Then, the procedure progresses to step S322.

In step S322, similar to the target yaw angle calculation process (step S315) in the braking state, as shown in FIG. 41, a closest target turning amount characteristic line L2 where the yaw angle is larger than the current yaw angle ψ2 at the current vehicle velocity V2 is selected, and a target rack stroke Rs2 set in the selected target turning amount characteristic line L2 is calculated as a target rack stroke Rs*.

Then, the procedure progresses to step S321 to calculate a yaw angle ψ2' in the selected target turning amount characteristic line L2 at the vehicle velocity V2 as a target yaw angle ψ*.

Thus, the target rack stroke Rs* decreases, and the turning angle of the turning wheel 17FR (or 17FL) on the outer turning wheel side is controlled in the toe-out direction. Thus, it is possible to set the steering characteristic of the vehicle of the vehicle to the under-steering state corresponding to the returning steering of the steering wheel 2 of the driver, and to obtain the steering characteristic of the vehicle corresponding to the steering of the driver.

Further, it is assumed that the vehicle state before acceleration or deceleration in the turning state is a state where the coordinates are at a point P31 in the area Ao for over-steering (OS) in FIG. 41, for example. In this state, for example, it is assumed that, as the vehicle enters the braking state, the vehicle velocity V1 decreases to a vehicle velocity V2 and the yaw angle ψ1 also decreases to the yaw angle ψ2, so that the coordinates move to a point P32. In this state, if the driver perform the turning increase steering, the relationship of θs1−θs2<0 is established in step S319. Then, the procedure progresses to step S320.

In step S320, similar to the target yaw angle calculation process (step S305) in the acceleration state, as shown in FIG. 41, a closest target turning amount characteristic line L3 where the yaw angle is larger than the current yaw angle ψ2 at the current vehicle velocity V2 is selected, and a target rack stroke Rs3 set in the selected target turning amount characteristic line L3 is calculated as a target rack stroke Rs*.

Then, the procedure progresses to step S321 to calculate a yaw angle in the selected target turning amount characteristic line L3 at the vehicle velocity V2 as a target yaw angle ψ*.

Thus, the target rack stroke Rs* increases, and the turning angle of the turning wheel 17FR (or 17FL) on the outer turning wheel side is controlled in the toe-in direction. Thus, it is possible to set the steering characteristic of the vehicle of the vehicle to the over-steering state corresponding to the increase steering of the steering wheel 2 of the driver, and to obtain the steering characteristic of the vehicle corresponding to the steering of the driver.

As described above, according to the vehicle steering apparatus according to the present embodiment, in the suspension device 1B, since the caster trail is set in the tire contact surface, it is possible to reduce the moment around the king pin axis KS.

Accordingly, in the above-described embodiment, similarly, it is possible to perform turning using a small rack shaft force, i.e., a smaller turning force, and to control the direction of the vehicle wheels using a small force, to thereby enhance the turning responsiveness.

In this way, in the above-described embodiment, by setting the king pin axis KS to pass through at least the inside of the tire contact surface, the suspension device 1B is configured to enhance the turning responsiveness is, and performs the straightness complementation and the disturbance compensation for controlling the turning characteristic by the straightness securing section 55 of the steer-by-wire system SBW to secure the straightness of the vehicle.

Thus, when the rightward steering or leftward steering is performed from the state where the steering wheel 2 maintains the neutral position, high responsiveness is secured using the high turning responsiveness of the suspension device 1B in the initial response period T1. Then, if the initial response period T1 elapses to enter the middle response period T2, it is necessary to set a high value on the handling stability compared with the turning responsiveness. Thus, by setting the control grain Ga to "1" by the gain adjustor 56c of the delay controller 56 in the steer-by-wire system SBW, the straightness securing control due to the straightness securing control value δa calculated by the straightness securing section 55 is started.

Thus, as the straightness securing control such as the turning angle control, the straightness complementation or the disturbance compensation is started, the high turning responsiveness due to the suspension device 1B is suppressed to secure the handling stability. Further, in the last response period T3, the turning responsiveness is further reduced to suppress the rolling-in phenomenon of the vehicle toward the inside to obtain the under-steering tendency. Thus, it is possible to suppress staggering of the vehicle, to thereby establish ideal turning responsiveness control.

However, if a state where the straight traveling state where the steering wheel 2 maintains the neutral position is changed to a state where the steering wheel 2 is steered rightward (or leftward), the change from the straight traveling state to the turning state due to the steering is detected by the steering start detector 56a. Thus, the gain Ga is set to "0" in the gain adjustor 56c for 0.1 seconds.

Thus, the correction control process for the turning instruction angle δ* is stopped during the initial response period of 0.1 seconds from the time point when the steering is started from the neutral position of the steering wheel 2, as shown in FIG. 15(b).

Accordingly, the rotational angle θmi of the actuator 6 is supplied to the target turning angle calculator 51, and the turning instruction angle δ* calculated in the target turning angle calculator 51 is supplied to the turning angle deviation calculator 61 as it is. Thus, the turning motor 8a is rotationally driven to match the turning instruction angle δ*. During this period, the turning angle correction process in the steer-by-wire control is stopped.

Accordingly, in the initial response period, the turning is started by the suspension device in which the road surface contact point of the king pin axis KS is set to the contact center position in the contact surface of the tire and the caster angle is set to zero.

Here, the caster angle of the suspension device is set to zero. The relationship between the caster angle, the steering responsiveness, and the handling stability is in a state where the steering responsiveness is high when the caster angle is zero, as shown in FIG. 14(a), but in this case, the handling stability cannot be secured. That is, the steering responsiveness and the handling stability with respect to the caster angle have the trade-off relationship.

Thus, in the initial state where the steering is started from the neutral position, the turning angle correction process due to the steer-by-wire control is not executed, and thus, the initial turning is provided by the suspension device.

In the initial period, as described above, since the suspension device has the caster angle of 0 and the high handling responsiveness, as indicated by the characteristic line L1 shown by the solid line in FIG. 15(a), it is possible to achieve a steering response characteristic (yaw angle) higher than a steering response characteristic (yaw angle) in a vehicle having a general steer-by-wire type steering system indicated by the characteristic line L2 shown by the single dot chain line. Here, since the turning angle is changed corresponding to the steering angle change due to the steering of the steering wheel 2 of the driver, the driver does not feel discomfort.

However, if the turning is continued in excess of the initial period only using the steering responsiveness based on the suspension device, as indicated by the characteristic line L3 shown by the broken line in FIG. 15(a), the steering responsiveness of the vehicle due to the steering in the middle period and the last period becomes sensitive. Further, the rolling-in phenomenon of the vehicle toward the inside over the middle period to the last period increases.

Thus, in the embodiment, as shown in FIG. 15(b), for example, when 0.1 seconds elapse from the initial response period, the turning angle correction control for the turning instruction angle δ* by the straightness complementing section 55a and the disturbance compensating section 55b is started in a step form. Thus, it is possible to suppress the steering responsiveness of the vehicle due to the suspension device to suppress staggering of the vehicle. Further, as shown in FIG. 14(b), it is possible to complement the straightness by the steer-by-wire control, to thereby secure the handling stability. Then, for example, when 0.3 seconds elapse, the steering response characteristic is further suppressed compared with the general vehicle steering response characteristic, to thereby make it possible to obtain the under-steering tendency. Thus, as indicated by the characteristic line L1 shown by the solid line in FIG. 15(a), it is possible to enhance the handling stability, and to realize an ideal steering response characteristic of the vehicle as indicated by the characteristic line L1.

As described above, according to the vehicle steering apparatus according to the present embodiment, in the suspension device 1B, since the king pin axis is set to pass through the inside of the tire contact surface when the steering wheel 2 is at the neutral position, it is possible to reduce the moment around the king pin axis KS.

Accordingly, it is possible to perform the turning with a small rack shaft force, and to control the direction of the vehicle with a small force, and thus, it is possible to enhance the steering responsiveness.

In this way, in the seventh embodiment, by setting the king pin axis KS to pass through at least the inside of the tire contact surface, the suspension device 1B is configured to enhance the turning responsiveness is, and performs the straightness complementation and the disturbance compensation for controlling the turning characteristic by the straightness securing section 55 of the steer-by-wire system SBW.

Thus, when the rightward steering or leftward steering is performed from the state where the steering wheel 2 maintains the neutral position, as the initial responsiveness, high responsiveness is secured using the high steering responsiveness of the suspension device. Then, if the initial period elapses to enter the middle period, it is necessary to set a high value on the handling stability compared with the steering responsiveness. Thus, as the control is started by the turning responsiveness setting section 52 of the steer-by-wire system (SBW) to perform the straightness complementing control, the high steering responsiveness due to the suspension device 1B is suppressed to secure the handling stability. Further, in the last period, the steering responsiveness is further reduced so as to suppress the rolling-in phenomenon of the vehicle toward the inside to obtain the under-steering tendency. Thus, it is possible to suppress staggering of the vehicle, to thereby establish an ideal steering responsiveness control.

Further, since the suspension device 1B according to the present embodiment is the strut type, it is possible to reduce the number of components, and to easily perform the setting of the king pin axis KS in the present embodiment.

Further, when the vehicle performs so-called slalom traveling while moving from the rightward steering to the leftward steering so that the steering wheel 2 crosses the neutral position, for example, the above-described delay control is not executed, and the disturbance compensation process and the straightness complementation process of complementing the lack of the self aligning torque are executed by the straightness securing section 55. Thus, it is possible to perform the turning control in which the handling stability is secured.

In the present embodiment, the control/drive circuit unit 26 that includes the input-side steering shaft 3, the steering reaction force actuator 6, the steering reaction force actuator angle sensor 7, the turning actuator 8, the turning actuator angle sensor 9, the output-side steering shaft 10, and the turning control unit 50 forms the steer-by-wire system SBW. Further, the vehicle wheels 17FR, 17FL, 17RR, and 17RL correspond to the tire wheel, the tire, and the wheel hub mechanism. In addition, the first link 37, the second link 38, and the shock absorber 40 correspond to the plural link members. Further, the lower arm is configured by the first link 37 and the second link 38, and the strut member ST is configured by the spring member 34 and the shock absorber 40.

In the seventh embodiment, a case where the turning control unit 50 is configured by hardware is described, but the invention is not limited to thereto, and for example, the target turning angle calculator 51 and the turning responsiveness setting section 52 may be configured by an operation processing device such as a microcomputer, and the turning control process shown in FIG. 17 may be executed by the operation processing device.

(Effects of Seventh Embodiment)

(1) A steering control device includes a steer-by-wire system that controls an actuator that detects displacement of a steering angle when a steering wheel is steered and turns a turning wheel separated from the steering wheel based on a detection result; a vehicle yaw angle detector that detects a yaw angle of a vehicle; a steering angle detector that detects the steering angle of the steering wheel; a vehicle velocity detector that detects a vehicle velocity of the vehicle; a turning state detector that detects a turning state of the vehicle based on the yaw angle; an acceleration state detector that detects an acceleration state of the vehicle; a braking state detector that detects a braking state of the vehicle; and a yaw angle controller that includes a target turning amount calculator that selects, when the turning state of the vehicle is detected by the turning state detector and when a state change due to the acceleration state or braking state is detected, a corresponding target turning amount characteristic line from plural target turning amount characteristic lines indicating the relationship between the vehicle velocity and the yaw angle using a target turning amount of the actuator as a parameter, based on the vehicle velocity and the yaw angle after the state change is detected, and calculates the target turning amount according to the state change based on the selected target turning amount characteristic line, and controls the actuator so that a turning amount of the turning wheel due to the actuator becomes the target turning amount.

Accordingly, when the suspension device configured to provide the turning with a light turning force is used, as the yaw angle controller calculates the target turning amount for eliminating the toe angle change of the suspension device generated during acceleration and braking in the turning traveling state of the vehicle and controls the turning actuator so that the turning amount becomes the target turning amount, it is possible to change the yaw angle so that the turning wheel has the over-steering tendency and the under-steering tendency necessary during acceleration and deceleration. Accordingly, it is possible to enhance the responsiveness for over-steering and under-steering compared with a case where the braking pressure or the hydraulic clutch pressure is controlled to obtain the over-steering and under-steering characteristics. Further, as the braking force is applied to the drive wheels in the acceleration state and the braking state, it is possible to suppress reduction in the acceleration performance. Accordingly, it is possible to enhance the turning performance during turning acceleration and turning braking of the vehicle, and to enhance the handling stability.

(2) Further, the actuator is a turning actuator that controls a rack mechanism that turns a turning wheel, and the yaw angle controller includes the target turning amount calculator that selects, when the turning state of the vehicle is detected by the turning state detector and when the state change due to the acceleration state or braking state is detected, the corresponding target turning amount characteristic line from the plural target turning amount characteristic lines indicating the relationship between the vehicle velocity and the yaw angle using the target turning amount of the actuator as a parameter and calculates the target turning amount according to the state change based on the selected target turning amount characteristic line, and controls the actuator so that the turning amount of the turning wheel due to the actuator becomes the target turning amount.

Accordingly, it is possible to control the yaw angle of the turning wheel by the yaw angle controller so as to suppress reduction in turning performance during turning acceleration and turning braking. Thus, it is not necessary to secure a longitudinal force toe characteristic as a basic characteristic of the suspension device, to thereby provide a simple and light-weight suspension device.

(3) The yaw angle controller includes the target yaw angle calculator that calculates the target yaw angle according to the state change based on the target turning amount characteristic line selected by the target turning amount calculator, performs the yaw angle control for controlling the actuator so that the turning amount of the turning wheel due to the actuator becomes the target turning amount, and continues the yaw angle control until the yaw angle after the yaw angle control matches the target yaw angle.

Accordingly, since the yaw angle control is continued until the yaw angle after the yaw angle control matches the target yaw angle, it is possible to perform a control so that the toe angle of the turning wheel becomes an optimal yaw angle during turning acceleration or turning braking, and to secure the handling stability.

(4) The target turning amount calculator calculates the target turning amount with reference to a target value calculation map indicating the relationship between the vehicle velocity and the yaw angle using the plural target turning amount characteristic lines where the target turning amount is used as the parameter, based on the vehicle velocity and the yaw angle after the state change.

Accordingly, it is possible to instantly and easily calculate the target control amount necessary in actual turning acceleration or turning braking based on the vehicle velocity after acceleration and the yaw angle after acceleration with reference to the target value calculation map.

(5) The target yaw angle calculator calculates the target yaw angle with reference to a target value calculation map indicating the relationship between the vehicle velocity and the yaw angle using the plural target turning amount characteristic lines where the target turning amount is used as the parameter, based on the vehicle velocity and the yaw angle after the state change.

Accordingly, it is possible to instantly and easily calculate the target yaw angle necessary in actual turning acceleration or turning braking based on the vehicle velocity after acceleration and the yaw angle after acceleration with reference to the target value calculation map.

(6) The target turning amount calculator selects, when the vehicle is in the acceleration state and the steering angle is not changed before and after the state change, a closest turning amount characteristic line where a yaw angle at the same speed as the vehicle velocity after the state change is larger than the yaw angle after the state change, and sets the target turning amount based on the selected turning amount characteristic line.

Accordingly, it is possible to instantly and easily calculate the target turning amount necessary in actual turning acceleration based on the vehicle velocity after acceleration and the yaw angle after acceleration.

(7) The target turning amount calculator selects, when the vehicle is in the braking state and the steering angle is not changed before and after the state change, a closest turning amount characteristic line where a yaw angle at the same speed as the vehicle velocity after the state change is smaller than the yaw angle after the state change, and sets the target turning amount based on the selected turning amount characteristic line.

Accordingly, it is possible to instantly and easily calculate the target turning amount necessary in actual turning braking based on the vehicle velocity after braking and the yaw angle after braking.

(8) The yaw angle controller includes a steering direction determining section that determines, when the vehicle is in any one of the acceleration state and the braking state and the steering angle is changed before and after the state change, whether the steering angle change is a turning increase direction or a returning direction. Here, when the determination result of the steering direction determining section indicates the turning increase direction, the yaw angle controller selects a closest turning amount characteristic line where a yaw angle at the same vehicle velocity as the vehicle velocity after the state change is larger than the yaw angle after the state change and sets the target turning amount based on the selected turning amount characteristic line by the target turning amount calculator, and calculates the target yaw angle based on the selected turning amount characteristic line and the vehicle velocity after the state change by the yaw angle calculator, and when the determination result of the steering direction determining section indicates the returning direction, the yaw angle controller selects a closest turning amount characteristic line where the yaw angle at the same vehicle velocity as the vehicle velocity after the state change is smaller than the yaw angle after vehicle velocity change and sets the target turning amount based on the selected turning amount characteristic line by the target turning amount calculator, and calculates the target yaw angle based on the selected turning amount characteristic line and the vehicle velocity after the state change by the yaw angle calculator.

Accordingly, when the driver steers the steering wheel during turning acceleration and turning braking, and when the steering direction is the turning increase direction, it is determined that the driver wants the over-steering, and thus, it is possible to select the target turning amount to show the over-steering tendency, and to calculate an optimal target yaw angle. Further, it is possible to perform the yaw angle control of the turning wheel to achieve the over-steering tendency corresponding to the desired steering of the driver.

(9) The actuator is a turning actuator that drives a turning shaft that turns the turning wheel, and the target turning amount is a target turning stroke of the turning shaft.

Accordingly, when a turning mechanism drives the turning shaft such as a rack shaft using the turning actuator, it is possible to set an optimal target stroke which is a target value of the stroke of the turning shaft.

(10) The suspension device includes plural link members that support the turning wheel to a vehicle body, and a king pin axis that passes through an upper pivot point and a lower pivot point of the link members is set to pass through the inside of a tire contact surface at a neutral position of the steering wheel.

Accordingly, it is possible to reduce the moment around the king pin axis of the suspension device, and thus, it is possible to perform the turning with a small turning force, and to control the direction of the vehicle wheel with a small force.

Accordingly, it is possible to enhance the turning responsiveness. At this time, by setting the caster angle to a value close to zero, it is possible to realize a suspension device with high turning responsiveness.

(11) Further, a straightness securing section is provided in a turning control unit, and accordingly, it is possible to secure reduction in the straightness of the vehicle as the turning responsiveness of the suspension device is secured, by the straightness securing section.

(12) Further, since the straightness securing section is configured by the steer-by-wire system provided with the turning actuator and the actuator control device, it is not necessary to independently provide the straightness securing section, and thus, it is possible to simplify the configuration.

In addition, as the straightness securing section, the straightness securing section 55 of the turning responsiveness setting section 52 serves as a main straightness securing section, and the actuator controller 54 serves as a sub straightness securing section, and thus, it is possible to reliably secure the straightness of the suspension device by both the straightness securing sections.

(13) When the steering wheel is steered rightward or leftward from the state where the steering wheel maintains the neutral position, as the straightness securing control of the straightness securing section is delayed by the delay controller, a high response characteristic is secured as the initial response characteristic using the turning responsiveness of the suspension device. Then, as the turning responsiveness of the suspension device is adjusted by the straightness securing control due to the straightness securing section, it is possible to secure ideal turning responsiveness.

(14) The straightness securing section calculates a self aligning torque to secure straightness.

Accordingly, it is possible to secure the straightness reduced when securing the high responsiveness of the suspension device using the self aligning torque by the straightness securing section, and to enhance the handling stability of the vehicle.

(15) When the turning of the steering wheel is started from the neutral position, the turning response characteristic of the suspension device is set as the initial turning response characteristic by the turning responsiveness setting section of the steer-by-wire system in an initial period when the turning starts. Then, after the initial setting time elapses, the control of the turning actuator for securing the straightness of the suspension device is started by the straightness securing section of the steer-by-wire system.

Accordingly, it is possible to secure the high turning response characteristic of the suspension device during initial turning, and after the initial setting time elapses it is possible to perform the control of the turning actuator for securing the straightness of the suspension device by the straightness securing section, and to obtain an ideal turning response characteristic.

(Application Example of Actuator of Seventh Embodiment)

In the above-described embodiment, a case where the turning actuator 8 that drives the rack shaft 14 is used as the actuator is described. However, the invention is not limited to this configuration, and as shown in FIG. 25, when the in-wheel motors 70FR and 70FL that directly drive the front wheels 17FR and 17FL as the drive wheels are provided, the in-wheel motors 70FR and 70FL are used as a yaw angle control actuator for performing the steering by the speed difference of the right and left wheels.

Further, with respect to the drive unit 71 that rotationally drives the in-wheel motors 70FR and 70FL, the target yaw angle $\psi^*$ is calculated by the yaw angle controller 72 during turning acceleration, similar to the above-described yaw angle controller 53C. In addition, the speed correction values RAFR and RAFL for increasing the speed of the in-wheel motor 70FR (or 70FL) on the outer turning wheel side and decreasing the speed of the in-wheel motor (70FL (or 70FR)) on the inner turning wheel side so that the current yaw angle $\psi 3$ reaches the calculated target yaw angle $\psi^*$ are calculated. The speed correction values RAFR and RAFL are supplied to the drive unit 71, and the drive unit 71 corrects rotation instruction values. Further, inverter drive signals based on the corrected rotation instruction values are supplied to inverters 74FR and 74FL that are supplied with electric power from a DC power source 73. The yaw angle control for steering is performed by causing the speeds of the in-wheel motors 70FR and 70FL to increase on the outer turning wheel side and to decrease on the inner turning wheel side using the inverters 74FR and 74FL, so that the steering characteristic of the vehicle may show the over-steering tendency.

(Effects of Application Example)

In this way, by applying the yaw angle control actuator based on the in-wheel motors that directly drive the drive wheels as the actuator, it is possible to suppress the response delay caused when using the hydraulic pressure, and to eliminate the toe-angle change toward the outside of the turning during turning acceleration by controlling the yaw angle without controlling the turning angle.

(Modification Example of Turning Mechanism)

As the turning mechanism that turns the turning wheels, a ball screw mechanism may be applied instead of the rack-and-pinion mechanism. In this case, a ball nut may be rotationally driven by the turning actuator 8. In this way, by applying the ball screw mechanism, it is possible to control the turning angle with high accuracy. Further, as the turning mechanism, a turning mechanism of a different type may be applied instead of the pinion-and-rack mechanism or the ball screw mechanism.

(Application Example of Yaw Angle Controller of the Invention)

In the above-described embodiment, a case where the target rack stroke and the target yaw angle are calculated with reference to the target yaw angle calculation map is described. However, the invention is not limited thereto, and instead of the reference to the target yaw angle calculation map, plural steering angle characteristic lines where the steering angle is used as a parameter may be expressed as a function of the vehicle velocity and the yaw angle, and a steering angle characteristic line where the yaw angle becomes larger than a yaw angle after acceleration at a vehicle velocity after acceleration may be selected based on the vehicle velocity after acceleration and the yaw angle after acceleration.

In this way, by expressing the steering characteristic of the vehicle line as the function of the vehicle velocity and the yaw angle, it is possible to select the steering angle characteristic line through an operation without using the target yaw angle calculation map.

In the above-described embodiment, the number of steering angle characteristic lines is not limited to four, and may be set to an arbitrary number.

(Application Example of Suspension of the Invention)

In the above-described embodiment, a case where the lower link of the suspension device is configured by the first link 37 and the second link 38 that do not intersect each other is described. However, the suspension device is not limited to such a configuration, and any configuration in which the king pin axis is set to pass through the inside of the tire contact surface so that the turning force can be reduced may be used. Thus, the lower link structure may be configured by the transverse link 81 and the compression link 82 that intersect each other, as schematically shown in FIG. 26 as described above. Further, the lower link structure may be also configured by the transverse link 81 and the tension link 83 that intersect each other, as schematically shown in FIG. 27.

(Effects of Application Example)

In this way, by configuring the lower link structure using the first link and the second link that intersect each other in a planar view, the lower pivot point that forms the king pin axis may be set at an intersection position of both the links. Thus, it is possible to make the position of the lower pivot point close to the inside of the vehicle body of the turning wheels. Accordingly, it is easy to set the king pin axis to pass through the inside of the tire contact surface.

(Modification Examples)

Further, the suspension device 1B is not limited to the above-described configuration, and suspension devices having various different configurations may be applied.

In addition, the turning responsiveness setting section 52 may not be provided according to the configuration of the suspension device 1B.

Eighth Embodiment

Next, an eighth embodiment of the invention will be described with reference to FIGS. 43 to 47.

The eighth embodiment is different from the above-described seventh embodiment in that in the yaw angle control process, when the vehicle enters the turning state, the yaw angle control is started after delay of the time corresponding to a delay time ti set in the delay controller 56 of the turning responsiveness setting section 52 in the above-described turning control unit 50.

Figure 43:
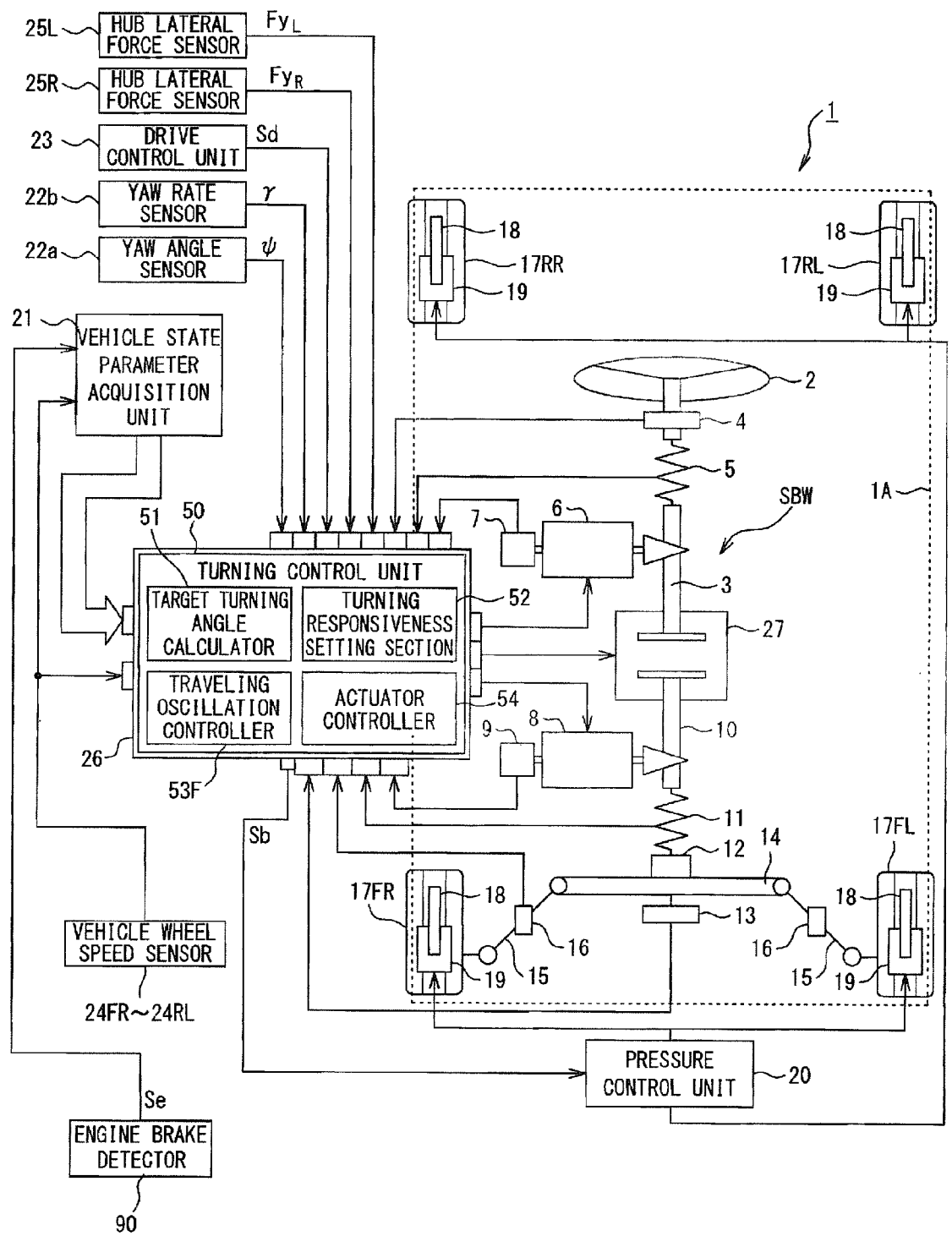
FIG. 43 is a configuration diagram schematically illustrating an automobile according to an eighth embodiment of the invention.

That is, the eighth embodiment has the same configuration as that of the suspension device described with reference to FIGS. 2 to 10 relating to the above-described first embodiment. Further, the overall configuration is made so that hub lateral force sensors 25R and 25L which are lateral force detectors that detect hub lateral forces $Fy_R$ and $Fy_L$ applied to respective hubs are provided in the right and left turning wheels 17FR and 17FL, in addition to the configuration of FIG. 33 relating to the sixth embodiment as shown in FIG. 43. The hub lateral forces $Fy_R$ and $Fy_L$ detected by the hub lateral force sensors 25R and 25L are input to the control/drive circuit unit 26. Further, an engine brake detector 90 that detects an engine braking state of the vehicle is provided, and the engine braking state detected by the engine brake detector 90 is supplied to the control/drive circuit unit 26 through the vehicle state parameter acquisition unit 21.

The control/drive circuit unit 26 is provided with a traveling oscillation controller 53F including the yaw angle controller 53C, in addition to the target turning angle calculator 51, the turning responsiveness setting section 52, and the actuator controller 54, in the turning control unit 50 of the above-described seventh embodiment.

Figure 44:
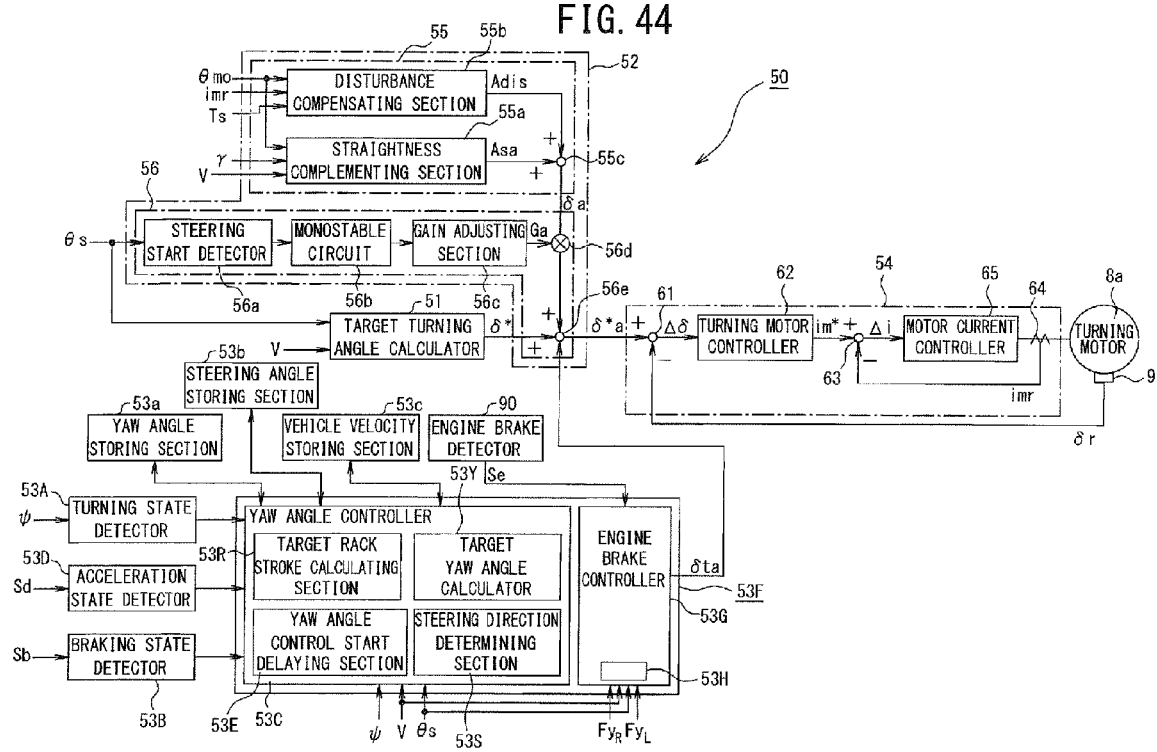
FIG. 44 is a block diagram illustrating a schematic configuration of a turning control unit and a yaw angle controller according to the eighth embodiment.

As shown in FIG. 44, the traveling oscillation controller 53F includes the yaw angle controller 53C, and an engine brake controller 53G that controls the steering characteristic of the vehicle in the engine braking state to a neutral steering characteristic of the vehicle.

The yaw angle controller 53C includes a yaw angle control start delaying section 53T that delays the start of the yaw angle control by a predetermined delay time ti when the turning starts, in addition to a target rack stroke calculator 53R, a target yaw angle calculator 53Y, and a steering direction determining section 53S having the same configuration as that of the above-described seventh embodiment.

When it is determined that an absolute value $|\psi 1|$ of a yaw angle $\psi 1$ exceeds a setting value $\psi s$ and the vehicle is in the turning state, the yaw angle control start delaying section 53T delays the yaw angle control in the above-described seventh embodiment by the predetermined time $\tau$ (for example, 0.1 seconds, similar to the delay time ti of the delay controller 56 of the above-described turning responsiveness setting section 52) so as not to affect the yaw angle control due to the turning responsiveness of the suspension device in the initial period T1 when the turning starts.

Further, when the engine brake detector 90 detects that the vehicle is not in the engine braking state, the yaw angle controller 53C executes the yaw angle control process.

On the other hand, when an engine braking state signal Se supplied from the engine brake detector 90 indicates the engine braking state, the engine brake controller 53G controls the steering characteristic of the vehicle. That is, when the steering state of the vehicle is the turning state, the engine brake controller 53G calculates a reference hub lateral force on the outer wheel side, and controls a brake cylinder so that a hub lateral force on the outer wheel side matches the reference hub lateral force. Further, when the steering state of the vehicle is in the straight traveling state, the engine brake controller 53G controls the brake cylinder so that the right and left hub lateral forces match each other to secure the straight traveling stability. Here, the engine brake controller 53G includes a straight traveling control start delaying section 53H that delays the start of the straight traveling stability control when the steering state is changed from the turning state to the straight traveling state.

Further, the traveling oscillation controller 53F executes a traveling oscillation control process. The traveling oscillation control process is expressed as shown in FIGS. 45 to 46, including the processes of the turning state detector 53A, the acceleration state detector 53D, and the braking state detector 53B.

Figure 45:
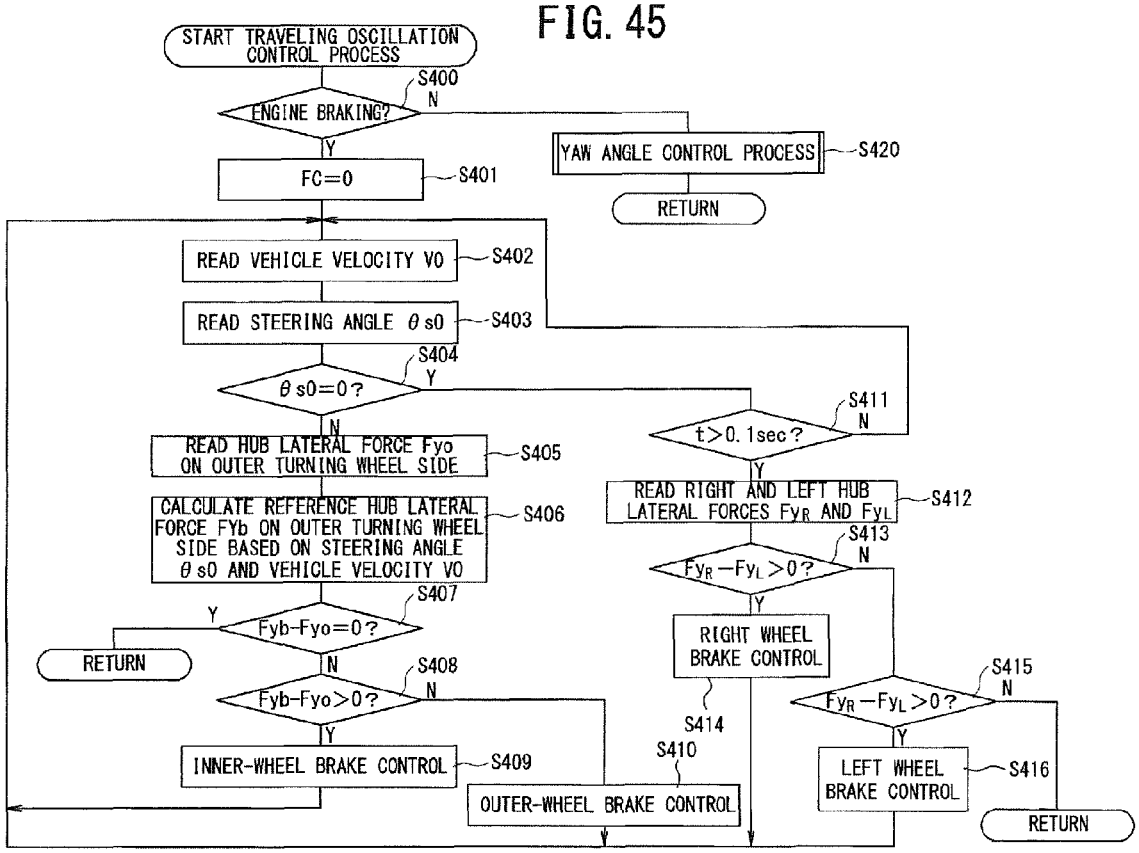
FIG. 45 is a flowchart illustrating an example of a traveling steering angle control processing procedure according to the eighth embodiment.
Figure 46:
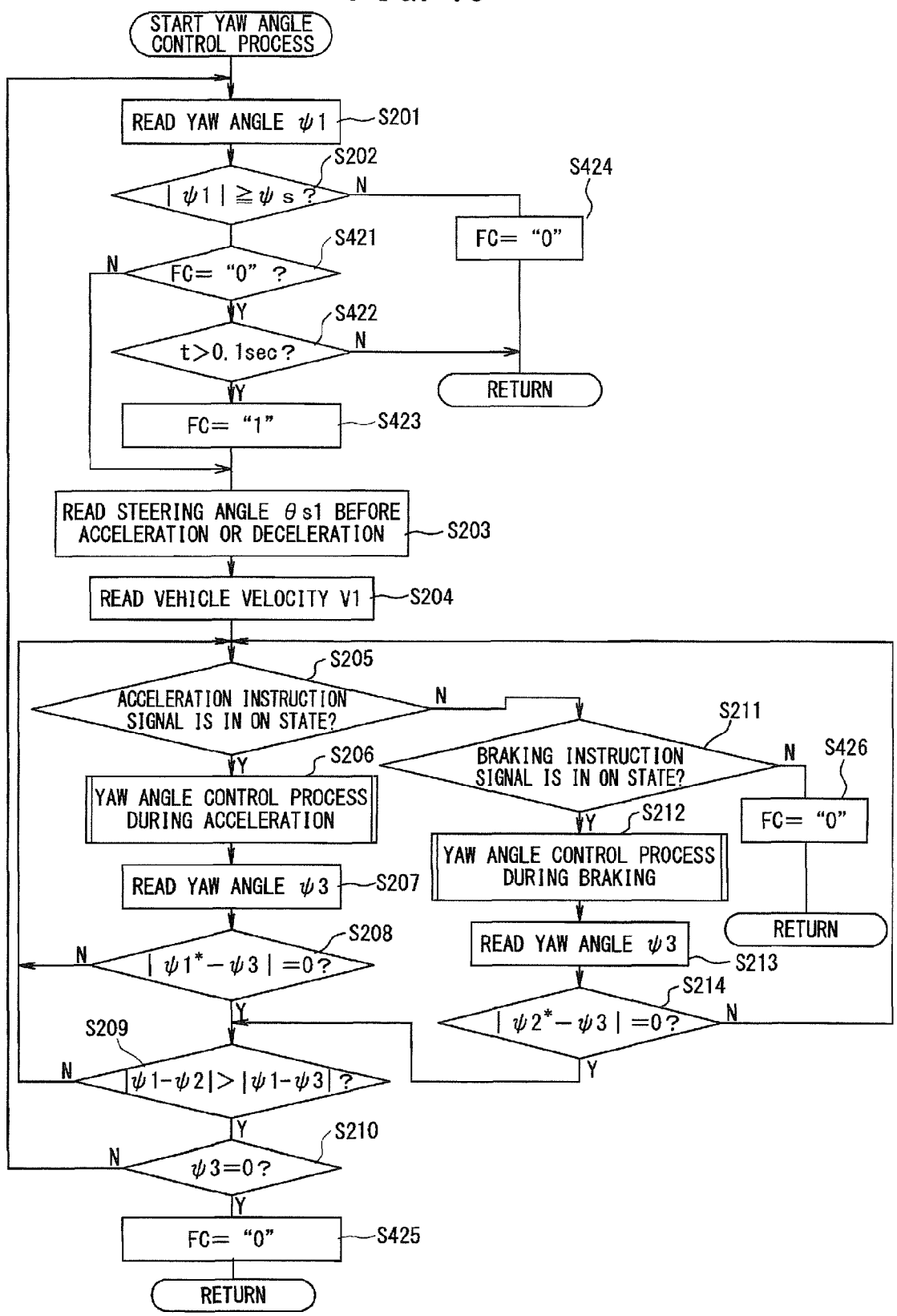
FIG. 46 is a flowchart illustrating a specific example of a procedure of a yaw angle control process in FIG. 45.

In the traveling oscillation control process, as shown in FIG. 45, first, the engine brake detecting signal Se input from the engine brake detector 90 is read in step S401, and it is determined whether the engine brake detecting signal Se is at a high level and indicates the engine braking state, for example.

When the determination result indicates the engine braking state, the procedure progresses to step S402 to read a current vehicle velocity V0, and then, the procedure progresses to step S403 to read a current steering angle θs0. Then, the procedure progresses to step S404.

In step S404, it is determined whether the steering angle θs0 read in step S403 is 0. When the determination result is θs0>0 or θs0<0, it is determined that the vehicle is in the turning state, and then, the procedure progresses to step S405.

In step S405, a hub lateral force Fyo on the outer turning wheel side among the hub lateral forces $Fy_R$ and $Fy_L$ input from the hub lateral force sensors 25R and 25L is read, and then, the procedure progresses to step S406.

Figure 47:
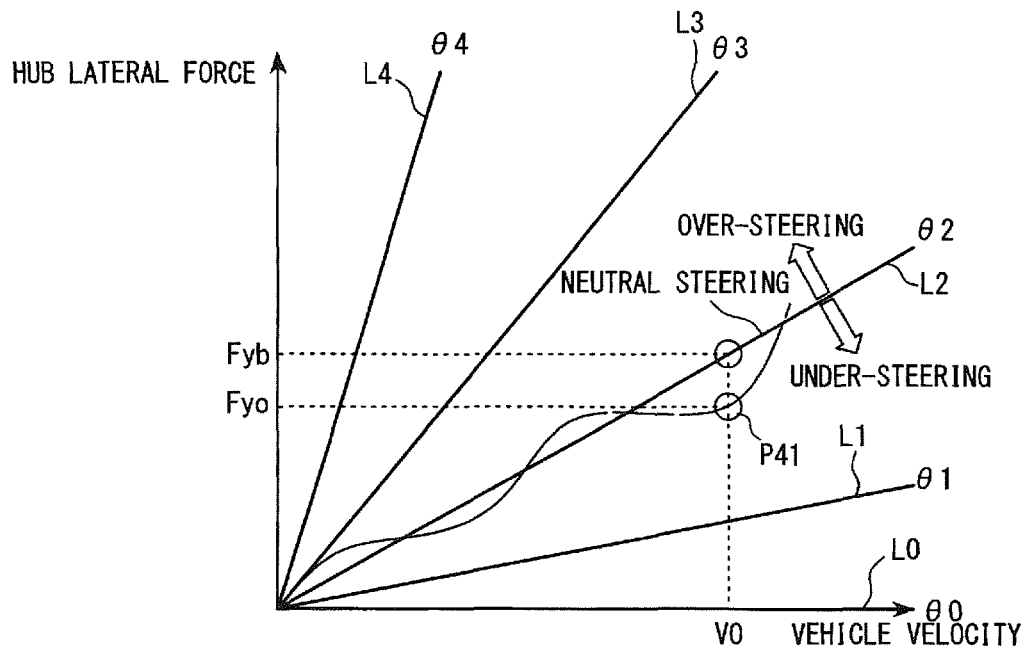
FIG. 47 is a characteristic line map illustrating a reference hub lateral force calculation map illustrating the relationship between a vehicle velocity and a hub lateral force, in which a steering angle is used as a parameter, which shows a case where neutral steering is performed during turning traveling of a vehicle.
Figure 48:
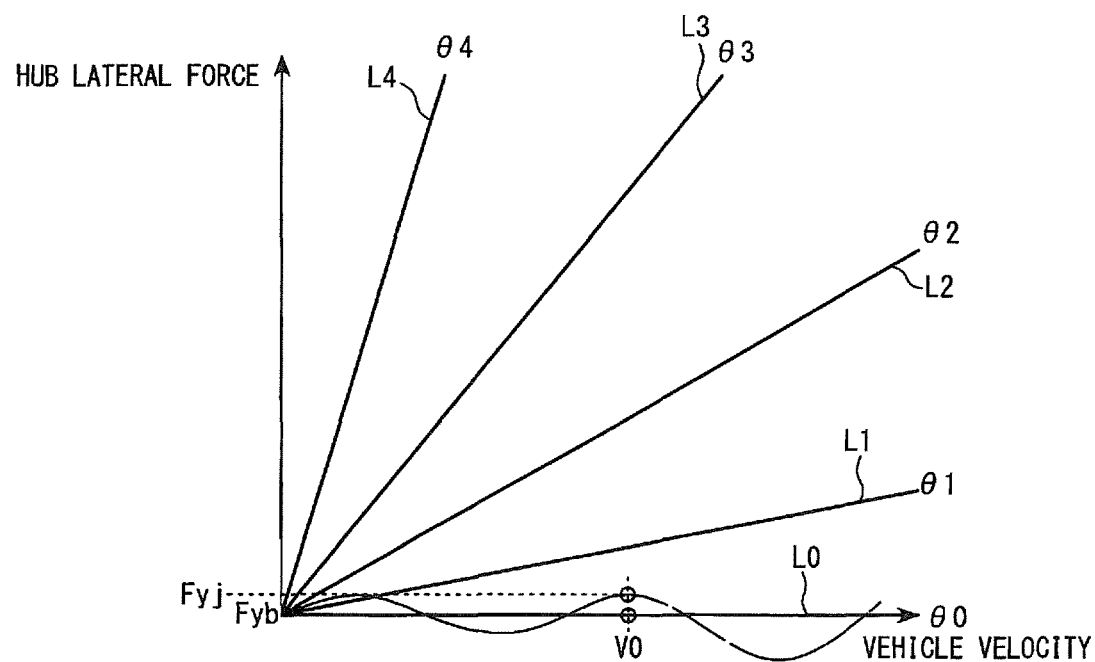
FIG. 48 is a characteristic line map which is similar to that shown in FIG. 47, which shows a case where traveling stabilization is achieved during straight traveling running of a vehicle.

In step S406, a reference hub lateral force Fyb is calculated based on the vehicle velocity V0 and the steering angle θs0 with reference to a reference hub lateral calculation map shown in FIG. 47. Here, in the reference hub lateral force calculation map, as shown in FIG. 47, a transverse axis represents the vehicle velocity V, and a longitudinal axis represents the hub lateral force Fy. Here, a configuration in which plural characteristic lines L1 to L5 where plural steering angles θ are used as parameters is shown. Here, the characteristic line L1 represents a state where the steering angle θ is zero, i.e., the straight traveling state.

Further, in order to calculate the reference hub lateral force Fyb, for example, a point P41 is calculated from a current vehicle velocity V0 and a current hub lateral force Fyo on the outer wheel side, the closest characteristic line L3 at the same vehicle velocity V0 is selected from the point P41, and the hub lateral force of the selected characteristic line L3 at the vehicle velocity V0 is calculated as the reference hub lateral force Fyb.

Then, the procedure progresses to step S407 to determine whether a value obtained by subtracting the hub lateral force Fyo on the outer wheel side from the reference hub lateral force Fyb is 0, i.e., whether the hub lateral force Fyo on the outer wheel side and the reference hub lateral force Fyb match each other. When Fyb−Fyo=0, it is determined that the hub lateral force Fyo on the outer wheel side and the reference hub lateral force Fyb match each other and the steering characteristic is the neutral steering characteristic, and then, the procedure returns to step S401.

Further, when the determination result of step S407 is Fyb−Fyo=0, the procedure progresses to step S408 to determine whether the value obtained by subtracting the hub lateral force Fyo on the outer wheel side from the reference hub lateral force Fyb is positive (Fyb−Fyo>0). When the determination result is Fyb−Fyo>0, it is determined that the hub lateral force Fyo on the outer wheel side is disposed in an under-steering area under a selected characteristic line Lk, and then, the procedure progresses to step S409. In step S409, a brake control on the inner wheel side is performed to modify the vehicle characteristic to the neutral steer side, and then, the procedure returns to step S402.

Contrarily, when the determination result of step S408 is Fyb−Fyo<0, it is determined that the hub lateral force Fyo on the outer wheel side is disposed on the over-steering side above the selected characteristic line Lk, and then, the procedure progresses to step S410. In step S410, the brake control on the inner wheel side is performed to modify the vehicle characteristic to the neutral steer side, and then, the procedure returns to step S402.

On the other hand, when the determination result of the above-described step S404 indicates that the current steering angle θs0 is zero, it is determined that the vehicle is in the straight traveling state, and then, the procedure progresses to step S411 to determine whether an elapsed time t after the steering angle θs0 is zero exceeds a predetermined delay time τ1 (for example, 0.1 seconds). When the determination result is t≤τ1=0.1, the procedure returns to step S402.

Further, when the determination result of step S411 is t>τ1=0.1, it is determined that the delay time τ1 elapses, and then, the procedure progresses to step S412. In step S412, the right and left hub lateral forces $Fy_R$ and $Fy_L$ are read, and then, the procedure progresses to step S413.

In step S413, for example, it is determined whether the value obtained by subtracting the hub lateral force $Fy_L$ on a left wheel side from the hub lateral force $Fy_R$ on a right wheel side is positive ($Fy_R - Fy_L > 0$).

When the determination result is $Fy_R - Fy_L > 0$, it is determined that the hub lateral force $Fy_R$ on the right wheel side is larger than the hub lateral force $Fy_L$ on the left wheel side, and that a turning force acts on the vehicle being the outer wheel side, and then, the procedure progresses to step S414.

In step S414, the brake control is performed with respect to the right wheel side to suppress the turning force, and then, the procedure returns to step S402.

Further, when the determination result of step S413 is $Fy_R-Fy_L \leq 0$, the procedure progresses to step S415 to determine whether the value obtained by subtracting the hub lateral force $Fy_R$ on the right wheel side from the hub lateral force $Fy_L$ on the left wheel side is positive ($Fy_L-Fy_R>0$). When the determination result is not $Fy_L-Fy_R>0$, it is determined that the hub lateral forces on the right and left wheels are "0" which shows balance, and that the turning force is not generated, and then, the procedure returns to step S401.

Further, when the determination result of step S415 is $Fy_L-Fy_R>0$, it is determined that the hub lateral force $Fy_L$ on the left wheel side is larger and the turning force is generated with the left wheel side being the outer wheel side, and then, the procedure progresses to step S416. In step S416, the brake control is performed with respect to the left wheel side to suppress the turning force, and then, the procedure returns to step S402.

Accordingly, in the turning traveling state in the engine braking state, the brake control is performed to control the steering characteristic of the vehicle to the neutral steer. Further, in the straight traveling state in the engine braking state, the brake control is performed with respect to a wheel side where the hub lateral force is larger among the right and left wheels to generate the turning force as the outer wheel, to suppress the turning of the vehicle to stabilize the behavior.

Here, when the vehicle is changed from the turning traveling state to the straight traveling state, the brake control with respect to one of the right and left wheels is delayed until the elapsed time t elapses the delay time τ1. Thus, when the vehicle is in the slalom traveling state, and when the steering angle θs0 temporarily becomes zero, it is possible to prevent the brake control for stabilizing the behavior in the straight traveling state, and to perform excellent slalom traveling.

Further, when the determination result of step S401 indicates that the vehicle is not in the engine braking state, the procedure progresses to step S420 to execute the yaw angle control. The yaw angle control process performs the same processes as in FIG. 35, except that a delay control process is inserted between step S202 and step S203 in the yaw angle control process of FIG. 35 in the above-described seventh embodiment, as shown in FIG. 46. Accordingly, in FIG. 46, the same step numbers are given to processes corresponding to the processes of FIG. 35, and detailed description thereof will not be repeated.

That is, when the determination result of step S202 is |ψ1|≥ψs, the procedure progresses to step S421 to determine whether an initial turning state flag FC is reset to "0" indicating an initial turning state. When the determination result is FC=0, it is determined that the vehicle is in the initial turning state, and then, the procedure progresses to step S422 to determine whether the elapsed time t exceeds a delay time τ2 (for example, 0.1 seconds) equal to the delay time τ set in the delay controller 56 of the above-described turning responsiveness setting section 52. When the determination result is t≤τ2=0.1, the yaw angle control process is terminated as it is, and the procedure returns to step S401 in FIG. 45.

When the determination result of step S422 is t>τ2=0.1, i.e., when the delay time T2 elapses after the turning starts, the procedure progresses to step S423 to set the initial turning state flag FC to "1", and then, progresses to step S203.

On the other hand, when the determination result of step S421 indicates that the initial turning state flag FC is set to "1", the procedure directly progresses to step S203.

Further, when the determination result of step S202 is |ψ1|≥ψs, the procedure progresses to step S424 to reset the initial turning state flag FC to "0", and then, returns to step S501 in FIG. 45.

Further, when the determination result of step S210 is ψ3=0, the procedure progresses to step S425 to reset the initial turning state flag FC to "0", and then, returns to step S501 in FIG. 45.

In addition, when the determination result of step S211 is in an OFF state, the procedure also progresses to step S426 to reset the initial turning state flag FC to "0", and then, returns to step S501 in FIG. 45.

Further, the yaw angle control process during acceleration executed in step S206 in FIG. 46 performs the same processes as in FIG. 36 in the above-described seventh embodiment, and the yaw angle control process during braking executed in step S212 performs the same processes as in FIG. 37 in the above-described seventh embodiment.

The processes of steps S401 to 416 in FIG. 45 correspond to the engine brake controller 53G, and the process of step S411 corresponds to the straight traveling control start delaying section 53H.

Further, the processes of step S421 to S216 in FIG. 46 correspond to the yaw angle control start delaying section 53E.

According to the eighth embodiment, if the engine brake detector 90 detects that the vehicle is in the engine braking state, in the traveling oscillation control process in FIG. 45, the procedure progresses to step S402 through step S400 to step S401 to read the current vehicle velocity V0, and then, to read the current steering angle θs0 (step S403).

Here, when the vehicle is in the turning traveling state and the steering angle θs0 is not "0" indicating the neutral position, the hub lateral force Fyo on the outer turning wheel side is red (step S405). That is, when the vehicle is in a rightward turning traveling state, the hub lateral force $Fy_L$ detected by the hub lateral force sensor 25L on the left wheel side is read, and when the vehicle is in a leftward turning traveling state, the hub lateral force $Fy_R$ detected by the hub lateral force sensor 25R on the right wheel side is read.

Then, the reference hub lateral force Fyb for securing the neutral steering characteristic is calculated with reference to the reference hub lateral force calculation map shown in FIG. 47 based on the steering angle θs0 and the vehicle velocity V0 (step S406). In this case, if it is assumed that the characteristic line L2 in FIG. 47 is selected based on the steering angle θs0, a point P40 which becomes the vehicle velocity V0 on the characteristic line L2 is set, and the hub lateral force at the point P40 is set as the reference hub lateral force Fyb.

Further, it is determined whether a value obtained by subtracting the detected hub lateral force Fyo on the outer wheel side from the set reference hub lateral force Fyb is 0 (step S407). When the determination result is Fyb−Fyo=0, it is determined that the vehicle maintains the neutral steering characteristic, and in this state, the procedure returns to step S400.

However, as shown in FIG. 47, when the hub lateral force Fyo on the outer wheel side is present in the under-steering area under the characteristic line L2, the relationship of Fyb−Fyo>0 is established. Thus, an inner wheel brake control for generating a predetermined braking force with respect to the wheel cylinder 19 on the inner wheel side is performed (step S409). Then, the steering characteristic control for returning the steering characteristic of the vehicle to the neutral steering characteristic control is performed, and then, the procedure returns to step S402 to continue the steering characteristic control.

Then, if the steering characteristic of the vehicle becomes the neutral steering characteristic, the relationship of Fyb−Fyo=0 established. Thus, the steering characteristic control is terminated, and then, the procedure progresses to step S400.

Contrarily, when the hub lateral force Fyo on the outer wheel side is present in the over-steering area above the characteristic line L2, the relationship of Fyb−Fyo<0 is established. Thus, an outer wheel brake control for generating a predetermined braking force with respect to the wheel cylinder 19 on the outer wheel side is performed (step S410). Then, the steering characteristic control for returning the steering characteristic of the vehicle to the neutral steering characteristic control is performed, and then, the procedure returns to step S402 to continue the steering characteristic control.

Then, if the steering characteristic of the vehicle becomes the neutral steering characteristic, the relationship of Fyb−Fyo=0 is established. Thus, the steering characteristic control is terminated, and then, the procedure returns to step S400.

Further, when the vehicle is in the engine braking state and is in the straight traveling state, since the steering angle θs0 becomes "0", when the vehicle is changed from the turning traveling state to the straight traveling state, the hub lateral forces Fy$_R$ and Fy$_L$ of the right and left wheels are read after a predetermined time (for example, 0.1 seconds) elapses (step S412).

In the straightness traveling state, when an external force from the road surface does not act, the right and left hub lateral forces Fy$_R$ and Fy$_L$ are "0". However, for example, if the hub lateral force Fy$_R$ on the right wheel is larger than the hub lateral force Fy$_L$ on the left wheel (Fy$_R$−Fy$_L$>0) as the vehicle travels on a rutted road or a unilateral inclined road surface, the procedure proceeds from step S413 to step S414 to perform the right wheel brake control for generating a predetermined braking force with respect to the wheel cylinder 19 on the right wheel side, to thereby make it possible to prevent occurrence of a turning force for causing the right wheel to serve as an outer turning wheel, thereby securing the straightness stability. If the relationship of Fy$_R$−Fy$_L$=0 is obtained by the right wheel brake control, the right wheel brake control process is terminated, and the procedure returns to step S400 through steps S423 to S425.

Contrarily, if the hub lateral force Fy$_L$ on the left wheel becomes larger than the hub lateral force Fy$_R$ on the right wheel (Fy$_R$−Fy$_L$<0), the procedure progresses to step S416 through step S413 to step S415 to perform the left wheel brake control for generating a predetermined braking force with respect to the wheel cylinder 19 on the left wheel side, to thereby make it possible to prevent occurrence of a turning force for causing the left wheel to serve as an outer turning wheel, thereby securing the straight stability.

If the relationship of Fy$_R$−Fy$_L$=0 is obtained by the left wheel brake control, the left wheel brake control process is terminated, and the procedure returns to step S400 from step S415.

In this way, when the vehicle is in the engine brake traveling state and is in the turning traveling state, since the steering characteristic of the vehicle is controlled so that the steering characteristic of the vehicle becomes the neutral steering characteristic, it is possible to stably perform the turning traveling of the vehicle.

On the other hand, when the vehicle is in the engine brake traveling state and continues the straight traveling state, the brake control is performed with respect to a vehicle wheel for generating a larger hub lateral force to prevent occurrence of the turning force, thereby securing the straight stability.

Further, when the vehicle is in the engine brake traveling state and is changed from the turning traveling state to the straight traveling state, the brake control is started after delay of the predetermined time τ1. Thus, for example, when the vehicle performs the slalom traveling, and when the steering angle θs0 temporarily becomes "0", the brake control of step S412 to step S416 is not performed, and thus, it is possible to reliably prevent the brake control during straight traveling from affecting the slalom traveling.

Further, when the vehicle is not in the engine brake traveling state, the procedure progresses to step S420 from step S400 to execute the yaw angle control process shown in FIG. 46.

In the yaw angle control process, as shown in FIG. 46, the same processes as in FIG. 35 are performed except that the delay control process of step S421 to step S423 is inserted between step S202 and step S203 in the yaw angle control process in FIG. 35 in the above-described sixth embodiment, and except that the processes of step S424 to S426 for resetting the initial turning state flag FC in the delay control process to "0" are inserted.

Thus, when the determination result of step S202 is |ψ1|>ψs and it is determined that the vehicle is in the turning traveling state, in the delay control process of steps S421 to step S423, the yaw angle control is started after delay of the delay time τ2 which is the same as the delay time τ in the delay controller 56 in the turning responsiveness setting section 52 of the above-described turning control unit 50.

In this way, in the eighth embodiment, when starting the yaw angle control, since the yaw angle control is started after delay of the delay time τ2, it is possible to perform excellent initial turning without the influence of the yaw angle control on the turning having high responsiveness due to the suspension device 1B in the initial response period T1 by the turning control unit 50.

Further, after the delay time τ2 elapses, the same control process during acceleration and the control process during braking as in the above-described seventh embodiment are executed. Thus, when the suspension device configured to provide the turning with a light turning force is applied, as the yaw angle controller calculates the target turning amount for eliminating the toe angle change of the suspension device generated during acceleration and braking in the turning traveling state of the vehicle and controls the turning actuator so that the turning amount becomes the target turning amount, it is possible to change the yaw angle so that the turning wheel has the over-steering tendency and the under-steering tendency necessary during acceleration and deceleration. Accordingly, it is possible to enhance the responsiveness for over-steering and under-steering compared with a case where the braking pressure or the hydraulic clutch pressure is controlled to obtain the over-steering characteristic and the under-steering characteristic. Further, as the braking force is applied to the drive wheels in the acceleration state and the braking state, it is possible to suppress reduction in the acceleration performance. Accordingly, it is possible to enhance the turning performance during turning acceleration and the turning braking of the vehicle, and to enhance the handling stability, thereby making it possible to obtain the effects of the seventh embodiment.

(Effects of Eighth Embodiment)

(1) A steering control device includes a steer-by-wire system that controls an actuator that detects displacement of a steering angle when a steering wheel is steered and operates a turning mechanism that turns a turning wheel separated from the steering wheel based on a detection result; a yaw angle detector that detects a yaw angle of a vehicle; a steering angle detector that detects the steering angle of the steering wheel; a turning state detector that detects a turning state of the vehicle; a traveling state detector that detects a braking state or an acceleration state of the vehicle; and a yaw angle controller that controls the actuator to suppress a yaw angle deviation before and after braking or acceleration when the turning state of the vehicle is detected by the turning state detector and when the braking state or the acceleration state of the vehicle is detected by the traveling state detector, in which the yaw angle controller includes a yaw angle control start delaying unit that delays control start of the yaw angle controller by a predetermined time when a change from a straight traveling state of the vehicle to the turning state of the vehicle is detected by the turning state detector.

Accordingly, it is possible to control the actuator capable of controlling the yaw angle of the vehicle with high responsiveness compared with the hydraulic pressure control by the yaw angle controller so as to suppress the yaw angle deviation before and after braking during braking in the turning traveling state of the vehicle. Further, when the turning state is detected by the turning state detector, since the control start of the yaw angle controller is delayed for the predetermined time by the yaw angle control start delaying unit, when the turning response characteristic of the suspension device is used in the initial turning by delaying the start of the turning control when the turning is started in the turning control in the steer-by-wire system, it is possible to prevent the yaw angle control from affecting the turning response characteristic of the suspension device.

(2) Further, the steering control device includes an engine brake detector that detects an engine braking state of the vehicle; an engine brake controller that adjusts a braking force of right and left wheels to control a steering characteristic of the vehicle to a neutral steering characteristic; and a straight traveling stability control start delaying unit that delays start of a straight traveling stability control in the engine brake controller for a predetermined time when the engine braking state is detected by the engine brake detector and the change from the straight traveling state to the turning state is detected by the turning state detector.

Accordingly, in the engine braking state, when the change from the turning state to the straight traveling state is detected, since the start of the straight traveling stability control is delayed for the predetermined time, for example, when the vehicle temporarily enters the straight traveling state from the turning traveling state and transitions to the turning state again during slalom traveling, it is possible to cause the vehicle to transition to the turning state without performing the straight traveling stability control, and to stably perform the slalom traveling.

(3) The steering control device includes lateral force detectors that individually detect lateral forces acting on the right and left turning wheels, and a vehicle velocity detector that detects a vehicle velocity of the vehicle, in which the engine brake controller includes a braking force controller that selects a corresponding steering angle characteristic line from plural steering angle characteristic lines indicating the relationship between the vehicle velocity and the lateral forces, in which a target steering angle is used as a parameter, based on the vehicle velocity and the lateral forces, calculates a reference lateral force based on the selected steering angle characteristic line, and controls a braking force with respect to the right and left wheels so that the calculated reference lateral force and the lateral forces match each other.

Accordingly, since the lateral forces acting on the right and left wheels is detected and the steering angle characteristic line is selected based on the steering angle and the vehicle velocity in the engine braking state to calculate the reference lateral force, the reference lateral force is adjusted to match the neutral steering characteristic, and thus, it is possible to control the steering characteristic during turning to the neutral steering.

(Application Example of Eighth Embodiment)

In the eighth embodiment, a case where the engine brake control and the yaw angle delay control are applied to the above-described seventh embodiment is described, but the invention is not limited thereto. The traveling turning angle control process in FIG. 45 and the delay control process in steps S421 to S426 in FIG. 46 may be applied to the above-described first to fifth embodiments.

(Application Example of Actuator of Eighth Embodiment)

In the above-described embodiment, a case where the turning actuator 8 that drives the rack shaft 14 is used as the actuator is described. However, the invention is not limited to this configuration, and as shown in FIG. 25, when the in-wheel motors 70FR and 70FL that directly drive the front wheels 17FR and 17FL as the drive wheels are provided, the in-wheel motors 70FR and 70FL are used as a yaw angle control actuator for performing the steering by the speed difference of the right and left wheels.

Further, with respect to the drive unit 71 that rotationally drives the in-wheel motors 70FR and 70FL, the target yaw angle $\psi^*$ is calculated by the yaw angle controller 72 during turning acceleration, similar to the above-described yaw angle controller 53C. In addition, the speed correction values RAFR and RAFL for increasing the speed of the in-wheel motor 70FR (or 70FL) on the outer turning wheel side and decreasing the speed of the in-wheel motor (70FL (or 70FR)) on the inner turning wheel side so that the current yaw angle $\psi 3$ reaches the calculated target yaw angle $\psi^*$ are calculated. The speed correction values RAFR and RAFL are supplied to the drive unit 71, and the drive unit 71 corrects rotation instruction values. Further, inverter drive signals based on the corrected rotation instruction values are supplied to inverters 74FR and 74FL that are supplied with electric power from the DC power source 73. The yaw angle control for steering is performed by causing the speeds of the in-wheel motors 70FR and 70FL to increase on the outer turning wheel side and to decrease on the inner turning wheel side using the inverters 74FR and 74FL, so that the steering characteristic of the vehicle may show the over-steering tendency.

(Effects of Application Example)

In this way, by applying the yaw angle control actuator based on the in-wheel motors that directly drive the drive wheels as the actuator, it is possible to suppress the response delay caused when using the hydraulic pressure, and to eliminate the toe-angle change toward the outside of the turning during turning acceleration by controlling the yaw angle without controlling the turning angle.

(Modification Example of Turning Mechanism)

As the turning mechanism that turns the turning wheels, a ball screw mechanism may be applied instead of the rack-and-pinion mechanism. In this case, a ball nut may be rotationally driven by the turning actuator 8. In this way, by applying the ball screw mechanism, it is possible to control the turning angle with high accuracy. Further, as the turning mechanism, a turning mechanism of a different type may be applied instead of the pinion-and-rack mechanism or the ball screw mechanism.

(Application Example of Yaw Angle Controller of the Invention)

In the above-described embodiment, a case where the target rack stroke and the target yaw angle are calculated with reference to the target yaw angle calculation map is described. However, the invention is not limited thereto, and instead of the reference to the target yaw angle calculation map, plural steering angle characteristic lines where the steering angle is used as a parameter may be expressed as a function of the vehicle velocity and the yaw angle, and a steering angle characteristic line where the yaw angle becomes larger than a yaw angle after acceleration at a vehicle velocity after acceleration may be selected based on the vehicle velocity after acceleration and the yaw angle after acceleration.

In this way, by expressing the steering characteristic line as the function of the vehicle velocity and the yaw angle, it is possible to select the steering angle characteristic line through an operation without using the target yaw angle calculation map.

In the above-described embodiment, the number of steering angle characteristic lines is not limited to four, and may be set to an arbitrary number.

(Application Example of Suspension of Eighth Embodiment)

In the eighth embodiment, a case where the lower link of the suspension device is configured by the first link 37 and the second link 38 that do not intersect each other is described. However, the suspension device is not limited to such a configuration, and any configuration in which the king pin axis is set to pass through the inside of the tire contact surface so that the turning force can be reduced may be used. Thus, the lower link structure may be configured by the transverse link 81 and the compression link 82 that intersect each other, as schematically shown in FIG. 26. Further, the lower link structure may be also configured by the transverse link 81 and the tension link 83 that intersect each other, as schematically shown in FIG. 27.

(Effects of Application Example)

In this way, by configuring the lower link structure using the first link and the second link that intersect each other in a planar view, the lower pivot point that forms the king pin axis may be set at an intersection position of both the links. Thus, it is possible to make the position of the lower pivot point close to the inside of the vehicle body of the turning wheels. Accordingly, it is easy to set the king pin axis to pass through the inside of the tire contact surface.

(Modification Examples)

Further, the suspension device 1B is not limited to the above-described configuration, and suspension devices having various different configurations may be applied.

In addition, the turning responsiveness setting section 52 may not be provided according to the configuration of the suspension device 1B.

The invention claimed is:

1. A steering control device comprising:
    a steer-by-wire system configured to control an actuator configured to detect displacement of a steering angle when a steering wheel is steered and to operate a turning mechanism that turns a turning wheel separated from the steering wheel based on a detection result;
    a yaw angle detector configured to detect a yaw angle of a vehicle;
    a steering angle detector configured to detect the steering angle of the steering wheel;
    a turning state detector configured to detect a turning state of the vehicle;
    a traveling state detector configured to detect a braking state or an acceleration state of the vehicle; and
    a yaw angle controller configured to control the actuator to suppress a yaw angle deviation before and after braking or acceleration in a state where the steering wheel maintains steering, when the turning state of the vehicle is detected by the turning state detector and when the braking state or the acceleration state of the vehicle is detected by the traveling state detector,
    wherein the yaw angle controller including a target turning amount calculator configured to select, when the turning state of the vehicle is detected by the turning state detector and when the state change due to the acceleration state or braking state is detected, a corresponding target turning amount characteristic line from among a plurality of target turning amount characteristic lines indicating the relationship between the vehicle velocity and the yaw angle where a target turning amount of the actuator is used as a parameter, based on the vehicle velocity after state change and the yaw angle after state change after detecting the state change, and calculates the target turning amount depending on the state change based on the selected target turning amount characteristic line, and to control the actuator so that a turning amount of the turning wheel due to the actuator becomes the target turning amount.

2. The steering control device according to claim 1, further comprising:
    a vehicle velocity detector configured to detect the vehicle velocity of the vehicle,
    wherein the yaw angle controller is operated when the vehicle velocity is equal to or greater than a setting vehicle velocity.

3. The steering control device according to claim 1,
    wherein the yaw angle controller comprises the target yaw angle calculator configured to calculate a target yaw angle depending on the state change based on the vehicle velocity and the yaw angle after the state change due to the acceleration state or the brake state is detected,
    wherein the yaw angle controller continues the control of the actuator for causing the control amount to become the target control amount until the yaw angle of the vehicle detected by the vehicle yaw angle detector becomes a value close to the target yaw angle.

4. The steering control device according to claim 1,
    wherein the yaw angle controller stops the control of the actuator when the acceleration state of the vehicle is detected by the travel state detector, and when a steering angle deviation before and after acceleration state detected by the steering angle detector is equal to or greater than a predetermined value.

5. A steering control device according to claim 1 comprising:
    wherein the yaw angle controller includes a yaw angle control start delaying section configured to delay control start of the yaw angle controller by a predetermined time when a change from a straight traveling state of the vehicle to the turning state of the vehicle is detected by the turning state detector.

6. The steering control device according to claim 1, wherein a suspension device configured to support the turning wheel, includes a plurality of link members configured to support the turning wheel to a vehicle body, and a king pin axis configured to pass through an upper pivot point and a lower pivot point of the link members is set to pass through the inside of a tire contact surface at a neutral position of the steering wheel.

7. The steering control device according to claim 1, wherein the actuator is a turning actuator configured to drive a rack mechanism of the steer-by-wire system, and the target turning amount is a target rack stroke.

8. The steering control device according to claim 1, wherein the actuator is a yaw angle control actuator for giving a speed difference to the right and left turning wheels for steering.

* * * * *